US010116366B2

(12) United States Patent
Moon et al.

(10) Patent No.: US 10,116,366 B2
(45) Date of Patent: *Oct. 30, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Sangchul Moon, Seoul (KR); Woosuk Ko, Seoul (KR); Sungryong Hong, Seoul (KR); Jinwoo Kim, Seoul (KR); Jongwoong Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,480

(22) Filed: Oct. 31, 2017

(65) Prior Publication Data

US 2018/0123663 A1 May 3, 2018

Related U.S. Application Data

(63) Continuation of application No. 14/908,410, filed as application No. PCT/KR2014/007120 on Aug. 1, 2014, now Pat. No. 9,866,297.

(Continued)

(51) Int. Cl.

*H04B 7/02* (2018.01)
*H04B 7/0456* (2017.01)

(Continued)

(52) U.S. Cl.

CPC ......... *H04B 7/0478* (2013.01); *H04L 1/0041* (2013.01); *H04L 1/0047* (2013.01);

(Continued)

(58) Field of Classification Search

CPC .. H04B 7/0478; H05K 999/99; H04L 1/0047; H04L 1/0041; H04L 1/0057;

(Continued)

(56) References Cited

U.S. PATENT DOCUMENTS 9,106,493 B2 8/2015 Hong et al.
9,325,438 B2 4/2016 Ko et al.

(Continued)

FOREIGN PATENT DOCUMENTS

CN 1930825 A 3/2007
CN 100382472 C 4/2008

(Continued)

OTHER PUBLICATIONS

Written Opinion and International Search Report from PCT/KR2014/007126, dated Nov. 19, 2014.

*Primary Examiner* — Phuc Tran

(74) *Attorney, Agent, or Firm* — Dentons US LLP

(57) ABSTRACT

The present invention provides a method of transmitting broadcast signals. The method includes, encoding Data Pipe, DP, data according to a code rate, wherein the encoding further includes Low-Density Parity-Check, LDPC, encoding the DP data, Bit interleaving the LDPC encoded DP data, and mapping the bit interleaved DP data onto constellations; building at least one signal frame by mapping the encoded DP data; and modulating data in the built signal frame by an Orthogonal Frequency Division Multiplexing, OFDM, method and transmitting the broadcast signals having the modulated data.

6 Claims, 109 Drawing Sheets

Related U.S. Application Data

(60) Provisional application No. 61/882,021, filed on Sep. 25, 2013, provisional application No. 61/882,019, filed on Sep. 25, 2013, provisional application No. 61/882,022, filed on Sep. 25, 2013, provisional application No. 61/882,023, filed on Sep. 25, 2013, provisional application No. 61/882,020, filed on Sep. 25, 2013, provisional application No. 61/881,418, filed on Sep. 23, 2013, provisional application No. 61/876,713, filed on Sep. 11, 2013, provisional application No. 61/861,400, filed on Aug. 1, 2013, provisional application No. 61/861,399, filed on Aug. 1, 2013, provisional application No. 61/861,398, filed on Aug. 1, 2013, provisional application No. 61/861,396, filed on Aug. 1, 2013, provisional application No. 61/861,395, filed on Aug. 1, 2013, provisional application No. 61/861,394, filed on Aug. 1, 2013, provisional application No. 61/861,393, filed on Aug. 1, 2013, provisional application No. 61/861,390, filed on Aug. 1, 2013, provisional application No. 61/861,392, filed on Aug. 1, 2013, provisional application No. 61/883,957, filed on Sep. 27, 2013.

(51) Int. Cl.

| | |
|---|---|
| ***H04N 7/08*** | (2006.01) |
| ***H04L 27/26*** | (2006.01) |
| ***H04N 21/236*** | (2011.01) |
| ***H04N 21/2362*** | (2011.01) |
| ***H04N 21/2381*** | (2011.01) |
| ***H04N 21/2383*** | (2011.01) |
| ***H04N 21/414*** | (2011.01) |
| ***H04N 21/434*** | (2011.01) |
| ***H04N 21/438*** | (2011.01) |
| ***H04N 21/61*** | (2011.01) |
| ***H04L 1/00*** | (2006.01) |
| *H04B 7/0413* | (2017.01) |
| *H04L 5/00* | (2006.01) |

(52) U.S. Cl.
CPC .......... *H04L 1/0057* (2013.01); *H04L 1/0063* (2013.01); *H04L 5/0023* (2013.01); *H04L 27/2601* (2013.01); *H04L 27/2637* (2013.01); *H04L 27/2646* (2013.01); *H04N 7/08* (2013.01); *H04N 21/2362* (2013.01); *H04N 21/2381* (2013.01); *H04N 21/2383* (2013.01); *H04N 21/23614* (2013.01); *H04N 21/41407* (2013.01); *H04N 21/4345* (2013.01); *H04N 21/4381* (2013.01); *H04N 21/4382* (2013.01); *H04N 21/6131* (2013.01); *H05K 999/99* (2013.01); *H04B 7/0413* (2013.01); *H04L 5/0053* (2013.01); *H04L 5/0091* (2013.01)

(58) Field of Classification Search
CPC ............... H04L 27/2646; H04L 1/0063; H04L 27/2637; H04L 5/0023; H04N 21/2383; H04N 21/4382; H04N 21/4381; H04N 21/2362; H04N 21/2381
See application file for complete search history.

(56) References Cited

U.S. PATENT DOCUMENTS

| | | | | |
|---|---|---|---|---|
| 9,484,957 | B2 | 11/2016 | Jeong et al. | |
| 9,595,978 | B2 | 3/2017 | Myung et al. | |
| 9,866,297 | B2 * | 1/2018 | Moon | H04B 7/0478 |
| 2009/0201997 | A1 | 8/2009 | Kim et al. | |
| 2010/0290425 | A1 | 11/2010 | Hadad | |
| 2011/0013718 | A1 | 1/2011 | Ko et al. | |
| 2011/0235721 | A1 | 9/2011 | Chen et al. | |
| 2012/0320994 | A1 | 12/2012 | Loghin et al. | |
| 2012/0327879 | A1 | 12/2012 | Stadelmeier et al. | |
| 2013/0064314 | A1 | 3/2013 | Ko et al. | |
| 2013/0235952 | A1 | 9/2013 | Ko et al. | |
| 2014/0064223 | A1 | 3/2014 | Stephens et al. | |
| 2014/0082452 | A1 | 3/2014 | Shinohara et al. | |
| 2014/0143639 | A1 | 5/2014 | Loghin et al. | |
| 2015/0039973 | A1 | 2/2015 | Jeong et al. | |
| 2015/0188734 | A1 | 7/2015 | Petrov | |
| 2016/0173181 | A1 | 6/2016 | Moon et al. | |

FOREIGN PATENT DOCUMENTS

| | | | |
|---|---|---|---|
| CN | 103181085 | A | 6/2013 |
| EP | 2541920 | A2 | 1/2013 |
| EP | 2560310 | A1 | 2/2013 |
| KR | 10-2008-0025222 | A | 3/2008 |
| KR | 10-2011-0114204 | A | 10/2011 |
| WO | 2004/006443 | A1 | 1/2004 |
| WO | 2011/082834 | A1 | 7/2011 |
| WO | 2011/098427 | A2 | 8/2011 |
| WO | 2012/052734 | A1 | 4/2012 |
| WO | 2012/081870 | A2 | 6/2012 |
| WO | 2014/006443 | A2 | 1/2014 |

* cited by examiner

【Figure 1】
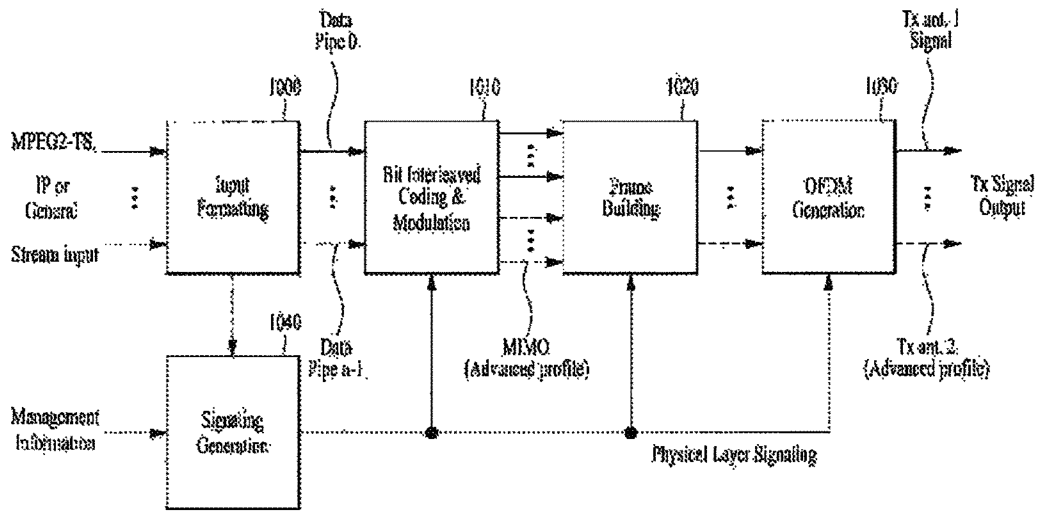
【Figure 2】
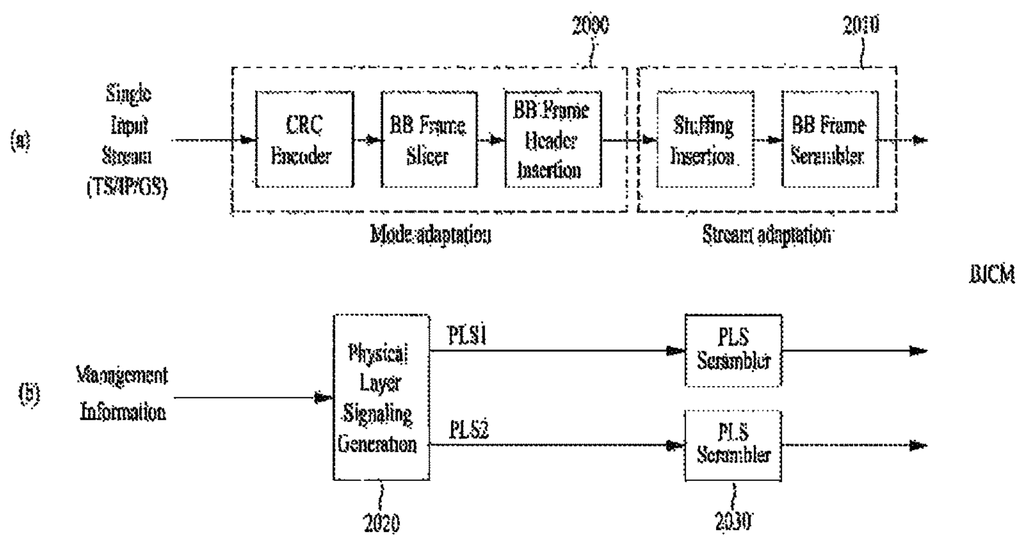
【Figure 3】
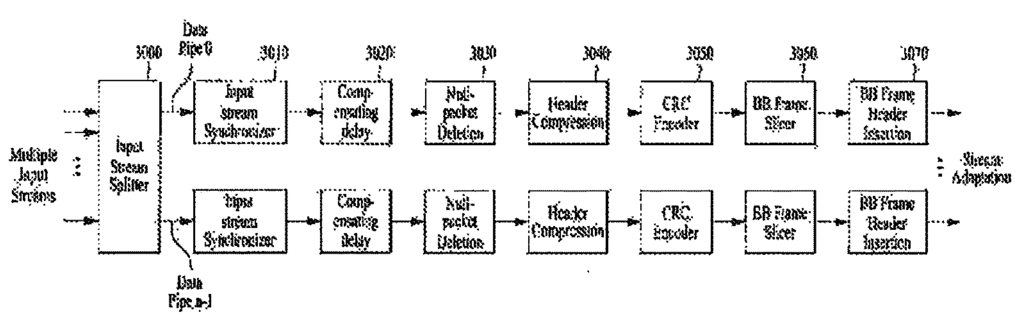

【Figure 4】
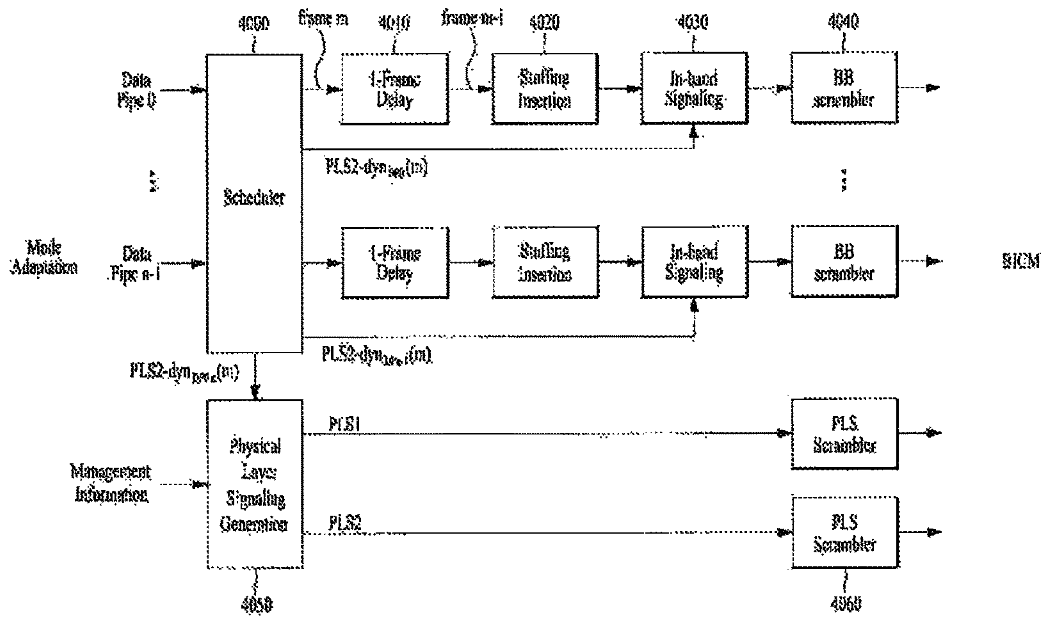
【Figure 5】
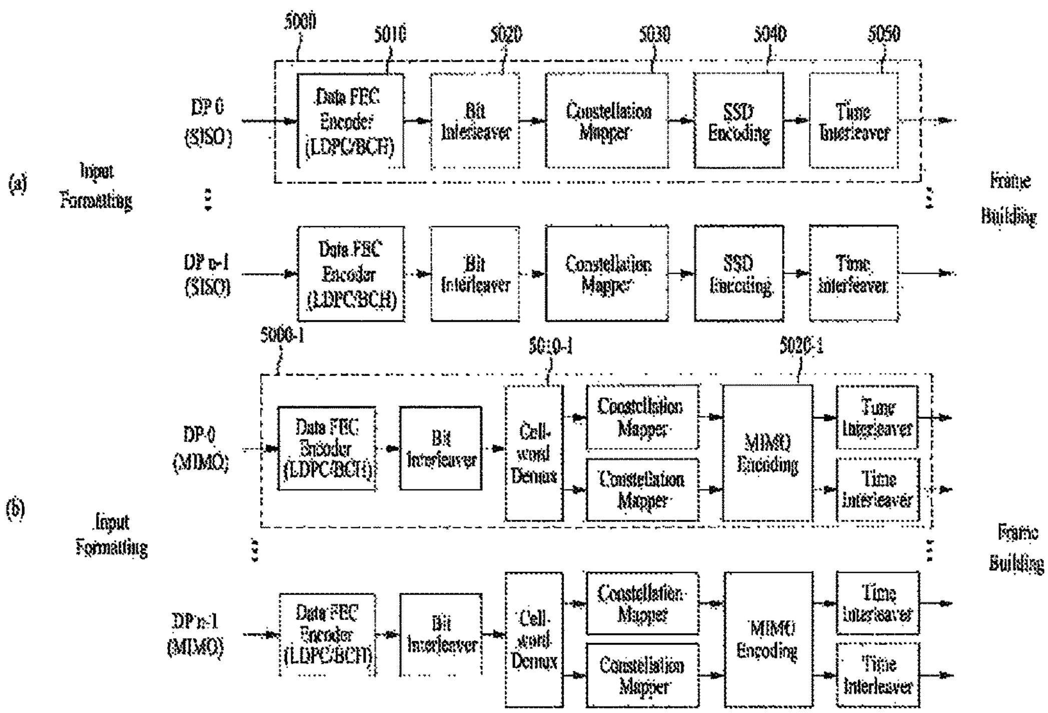

【Figure 6】
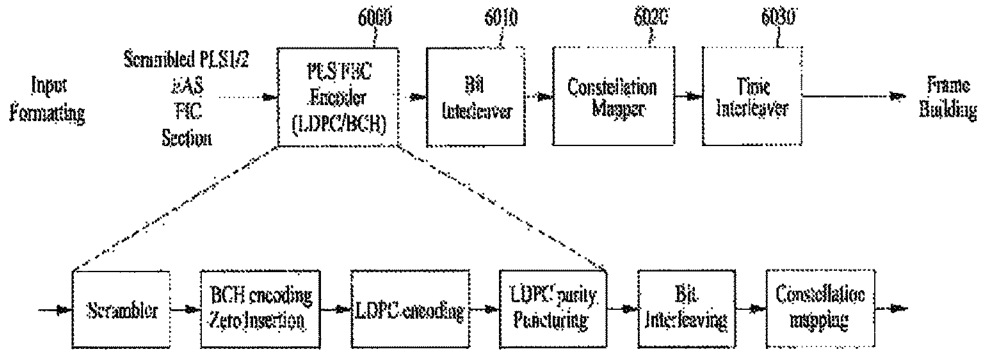
【Figure 7】
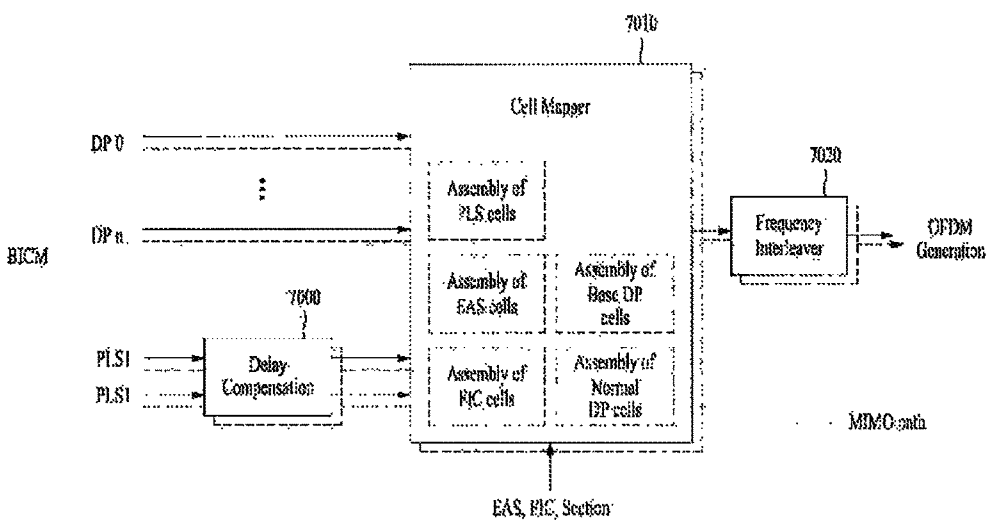
【Figure 8】
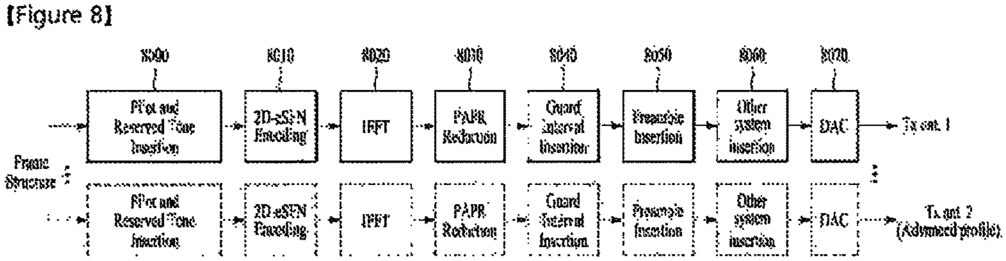

[Figure 9]
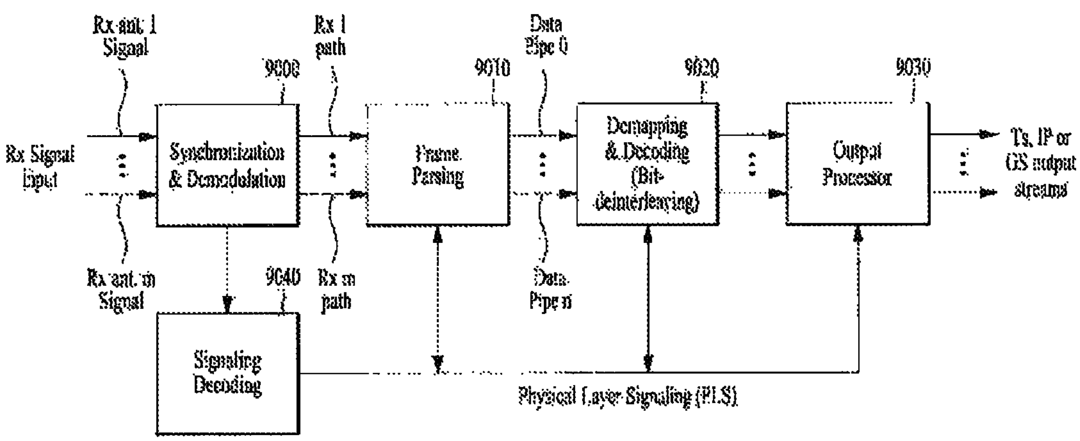

【Figure 10】
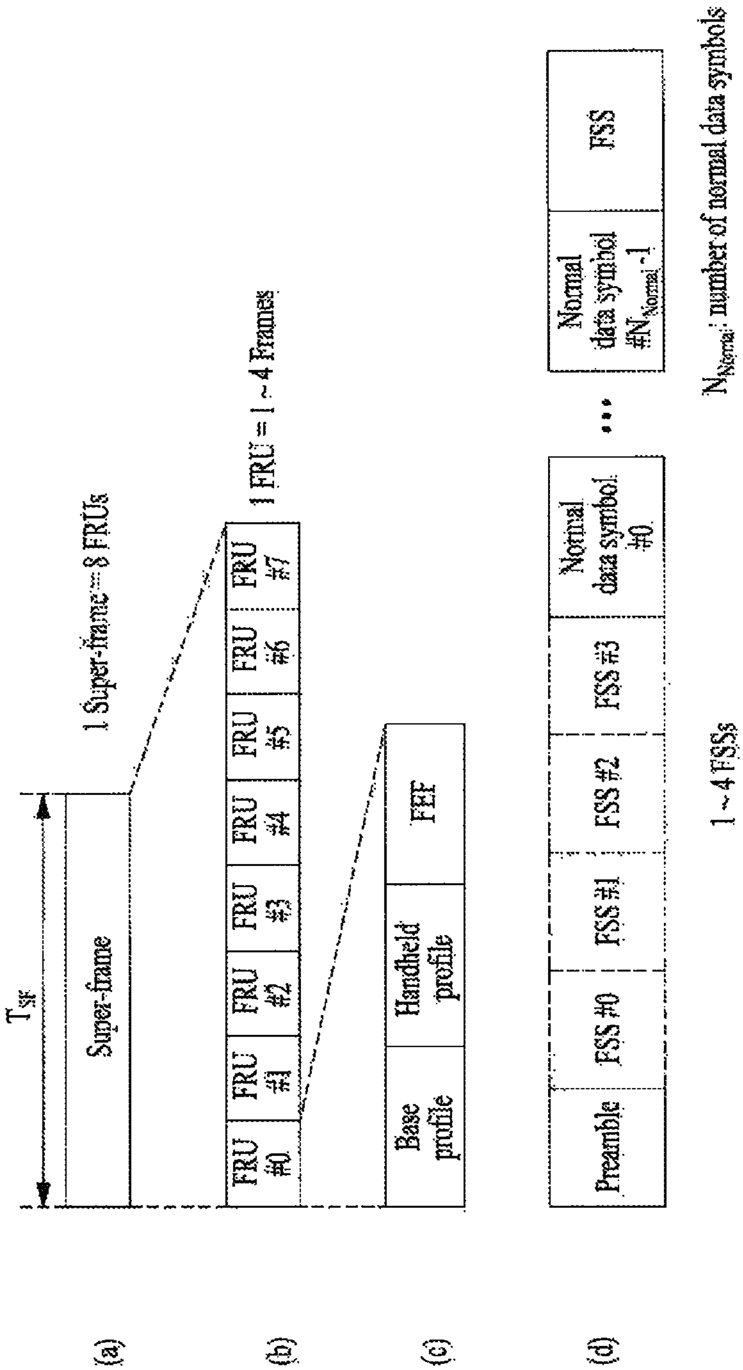

[Figure 11]
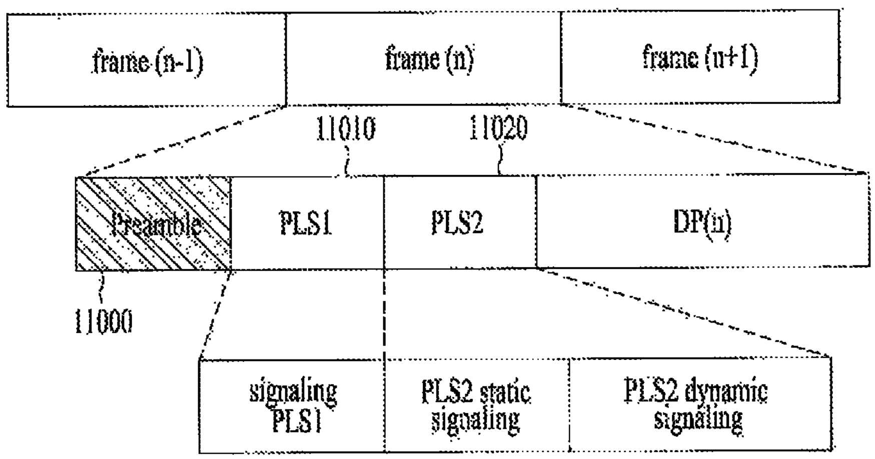
[Figure 12]
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Figure 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
| FRU_PHY_PROFILE | 3 |
| FRU_FRAME_LENGTH | 2 |
| FRU_GI_FRACTION | 3 |
| RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Figure 14]

| Content | Bits |
|---|---|
| FIC_FLAG | 1 |
| AUX_FLAG | 1 |
| NUM_DP | 6 |
| for i = 1: NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |
| if DP_PAYLOAD_TYPE = = TS('00') | |
| DNP_MODE | 2 |
| ISSY_MODE | 2 |
| HC_MODE_TS | 2 |
| if HC_MODE_TS = = '01' or '10' | |
| PID | 13 |
| end | |
| if DP_PAYLOAD_TYPE = = IP('01') | |
| HC_MODE_IP | 2 |
| end | |
| RESERVED | 8 |
| end | |
| if FIC_FLAG = = 1 | |
| FIC_VERSION | 8 |
| FIC_LENGTH_BYTE | 13 |
| RESERVED | 8 |
| end | |
| if AUX_FLAG = = 1 | |
| NUM_AUX | 4 |
| AUX_CONFIG_RFU | 8 |
| for - 1 : NUM_AUX | |
| AUX_STREAM_TYPE | 4 |
| AUX_PRIVATE_CONF | 28 |
| end | |
| end | |

【Figure 15】
| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID<br>DP_START | 6<br>15 (or 13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |
【Figure 16】
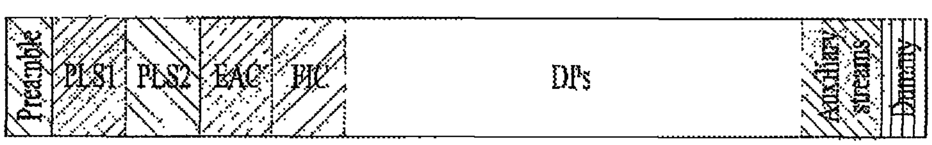

【Figure 17】
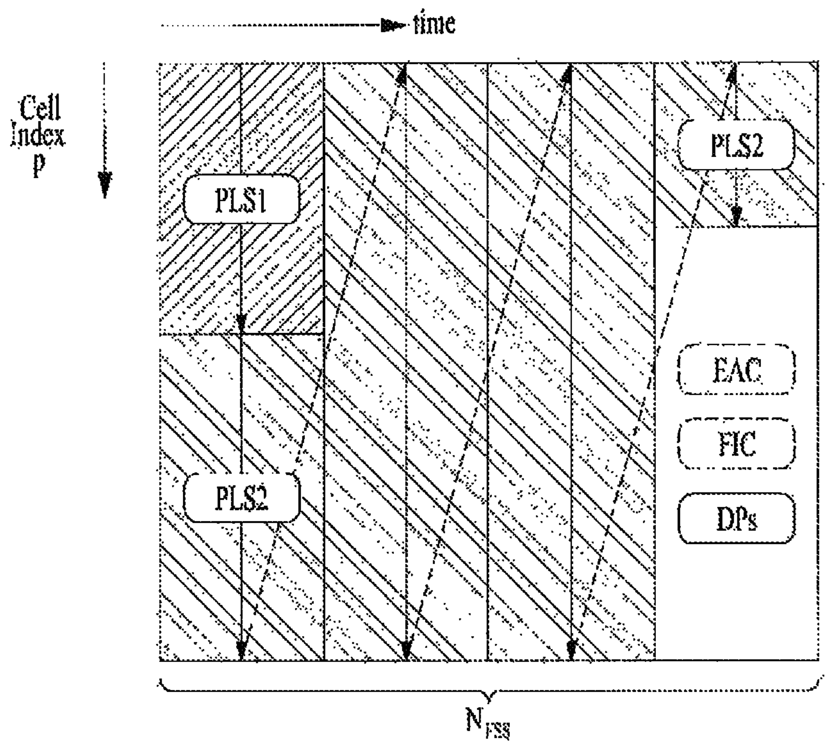

【Figure 18】
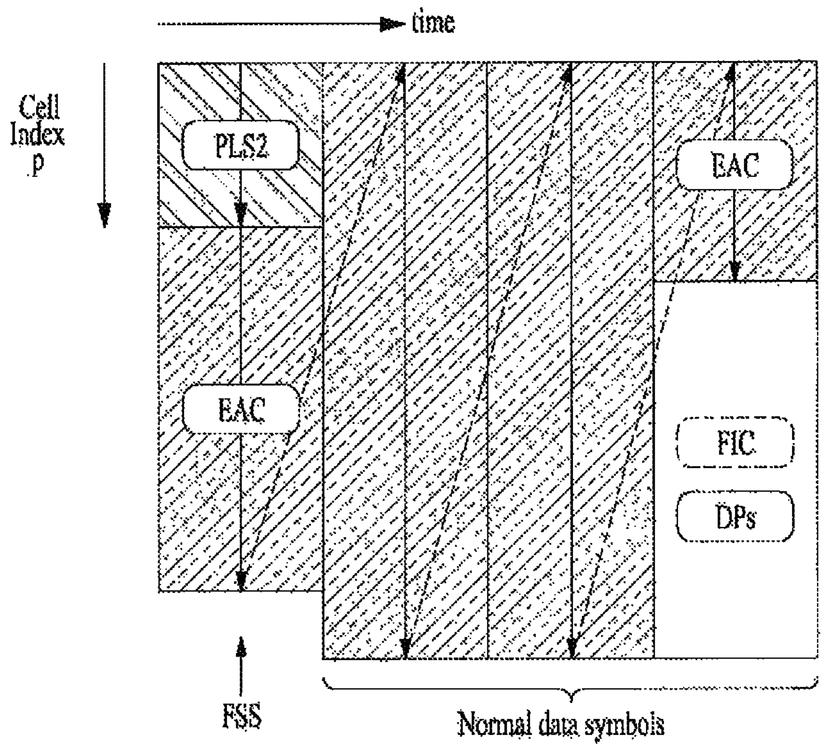

【Figure 19】
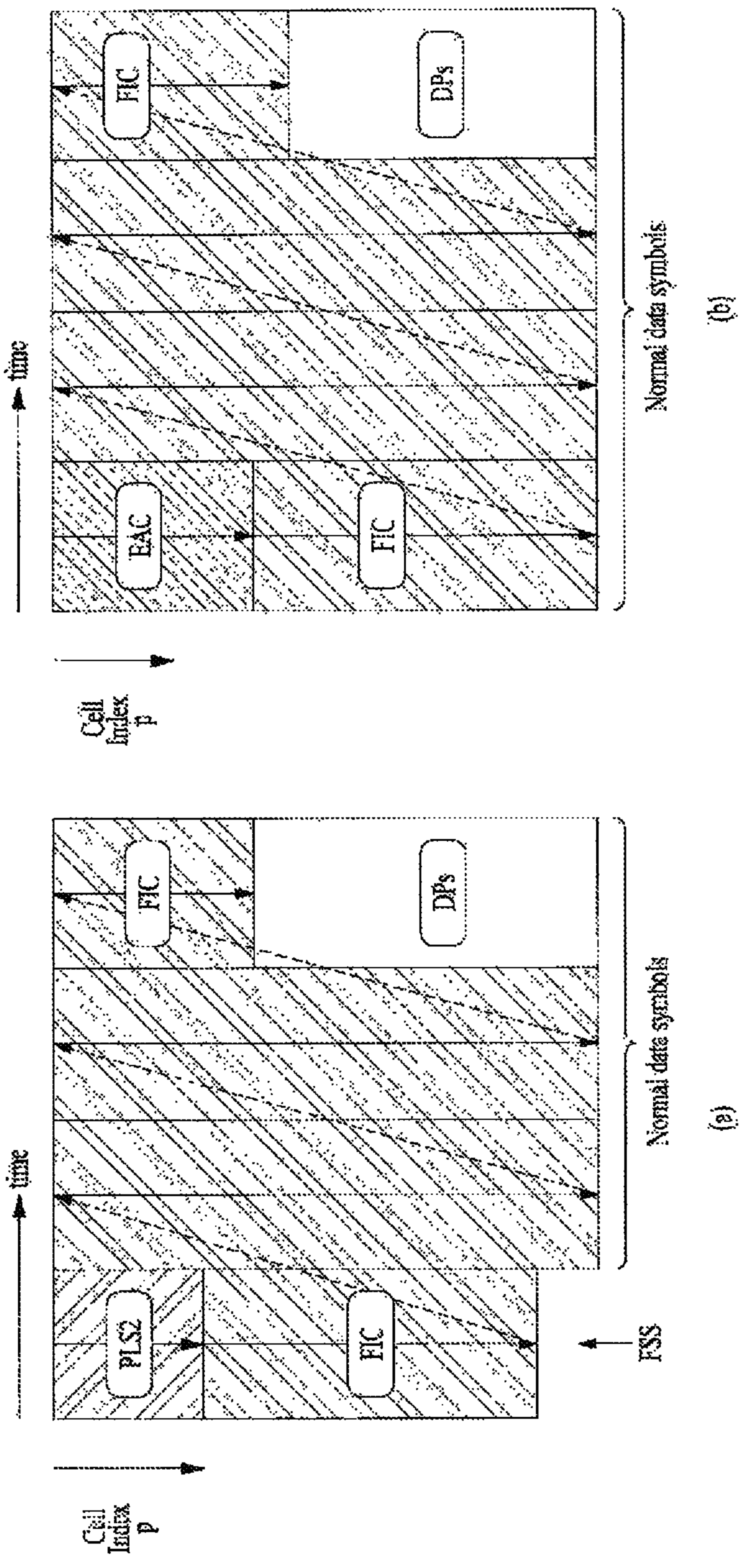

【Figure 20】
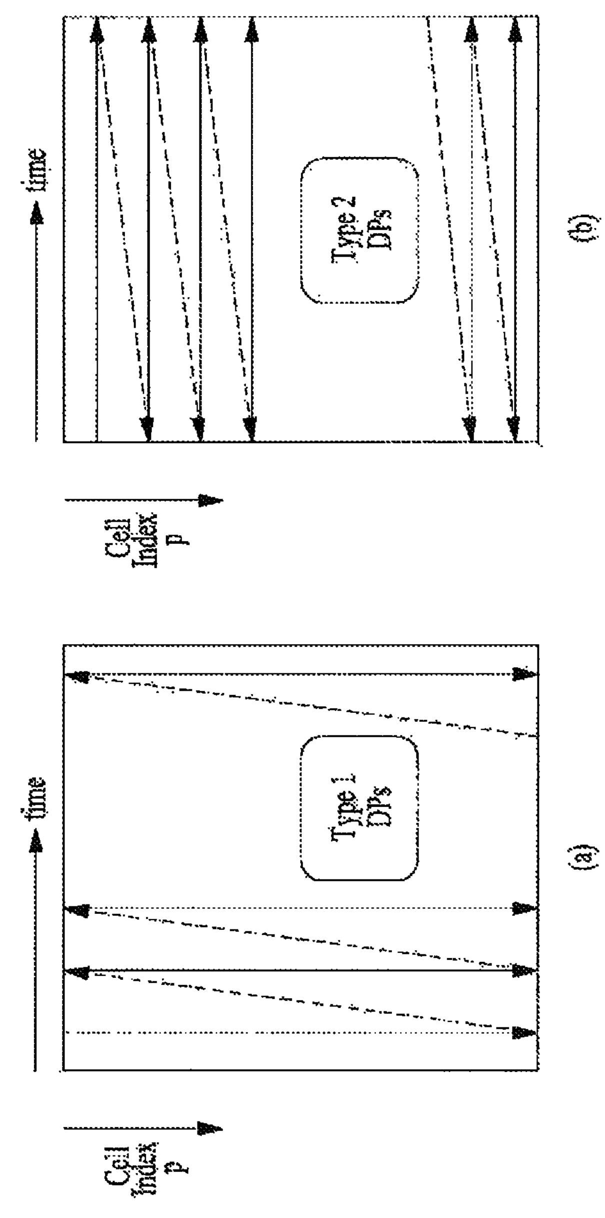

【Figure 21】
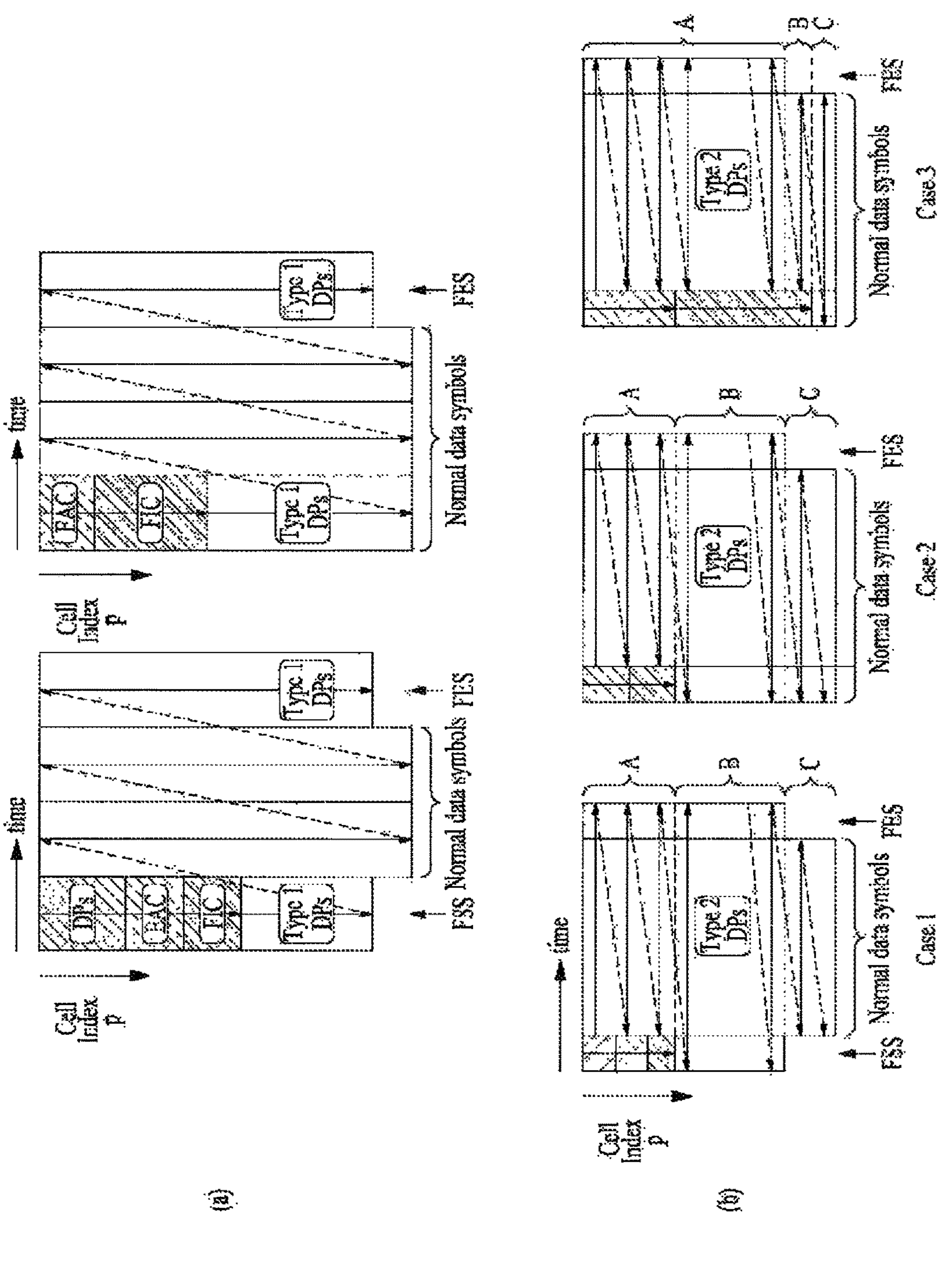

【Figure 22】
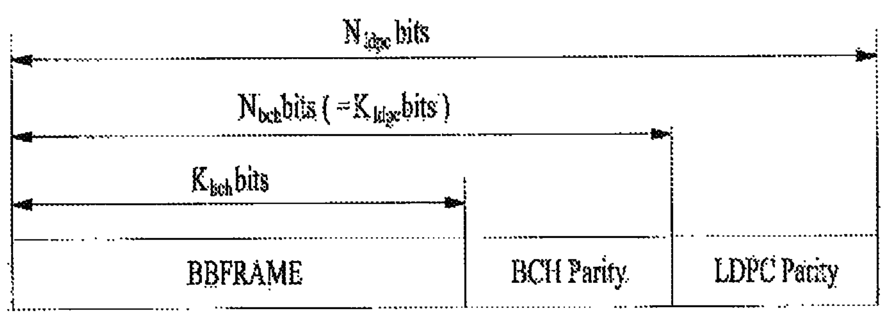

【Figure 23】
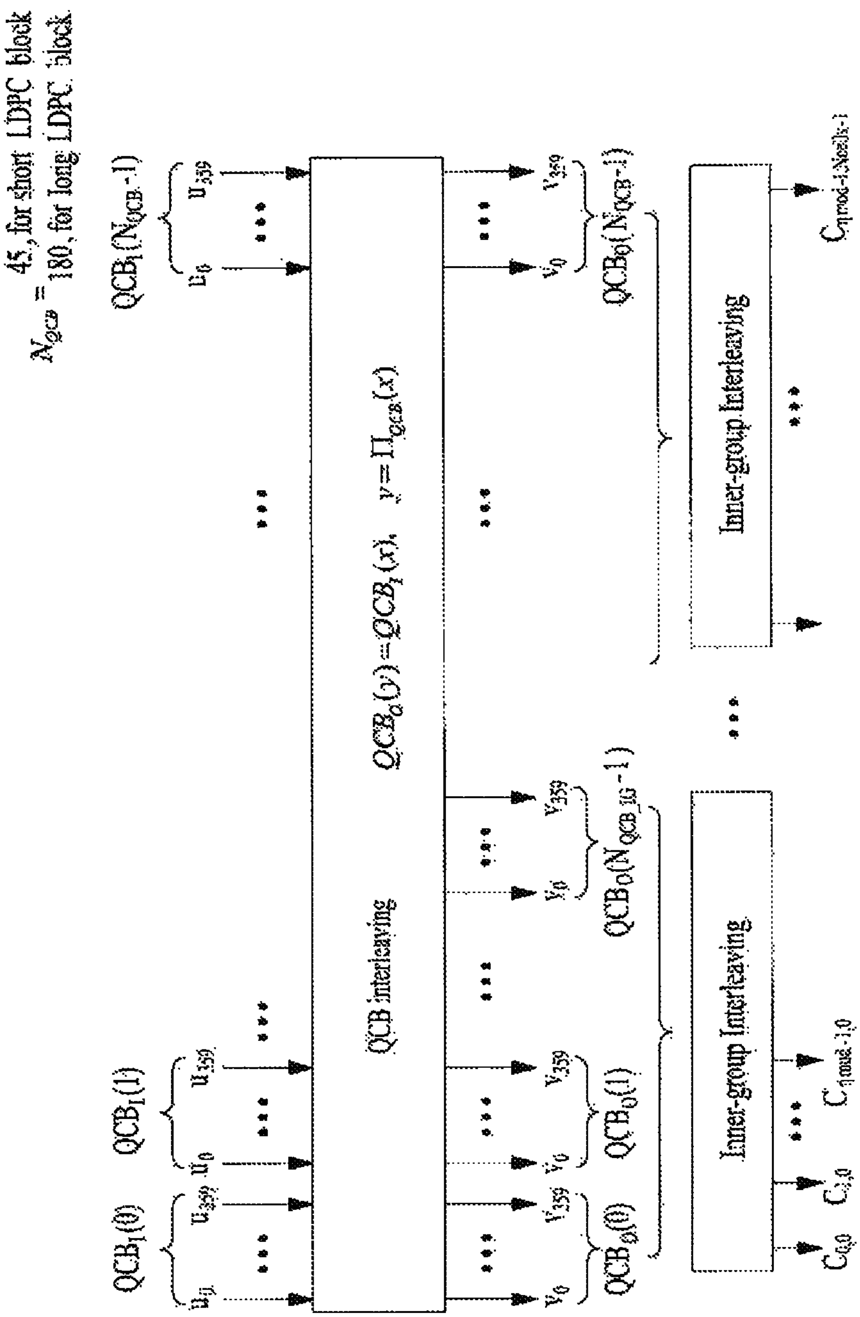

【Figure 24】
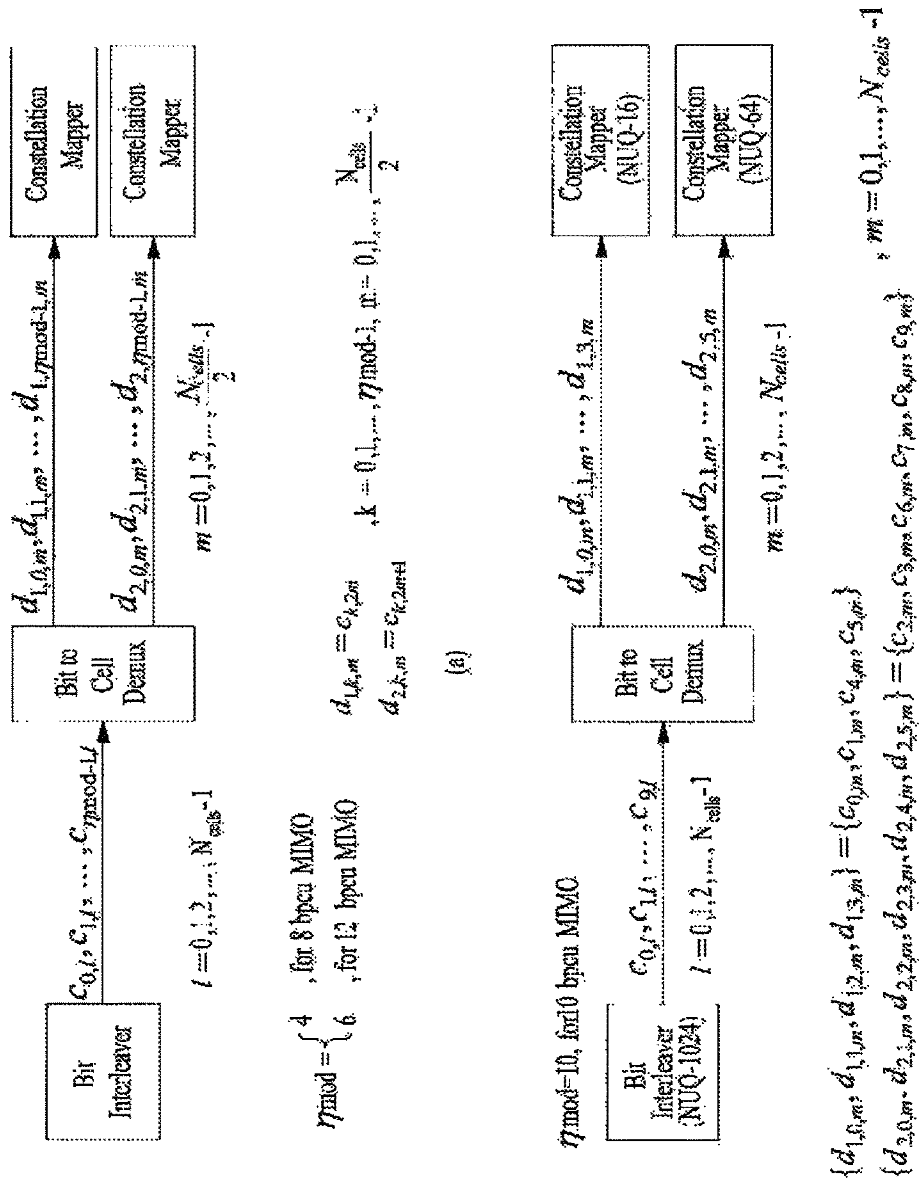

【Figure 25】
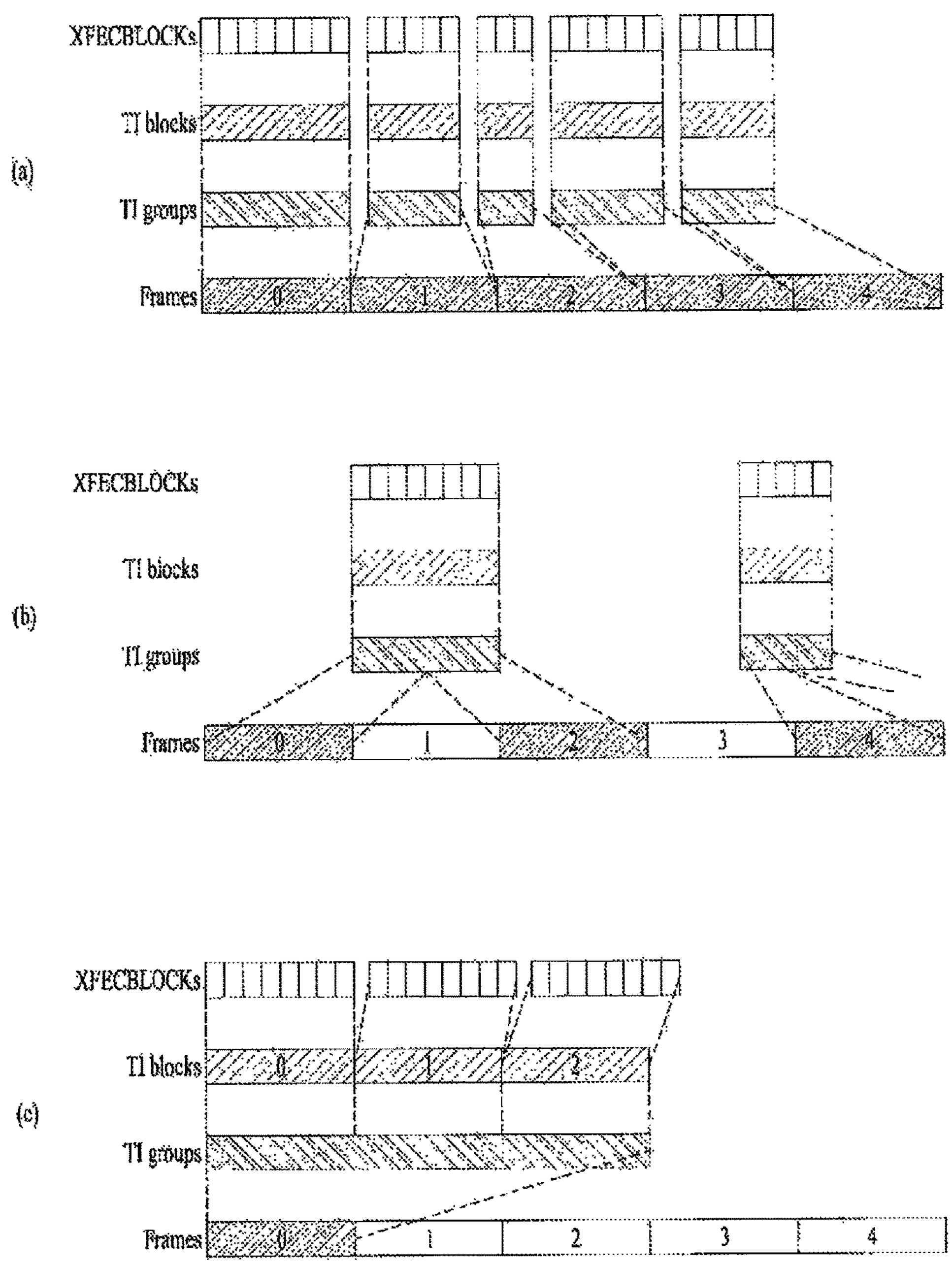

【Figure 26】
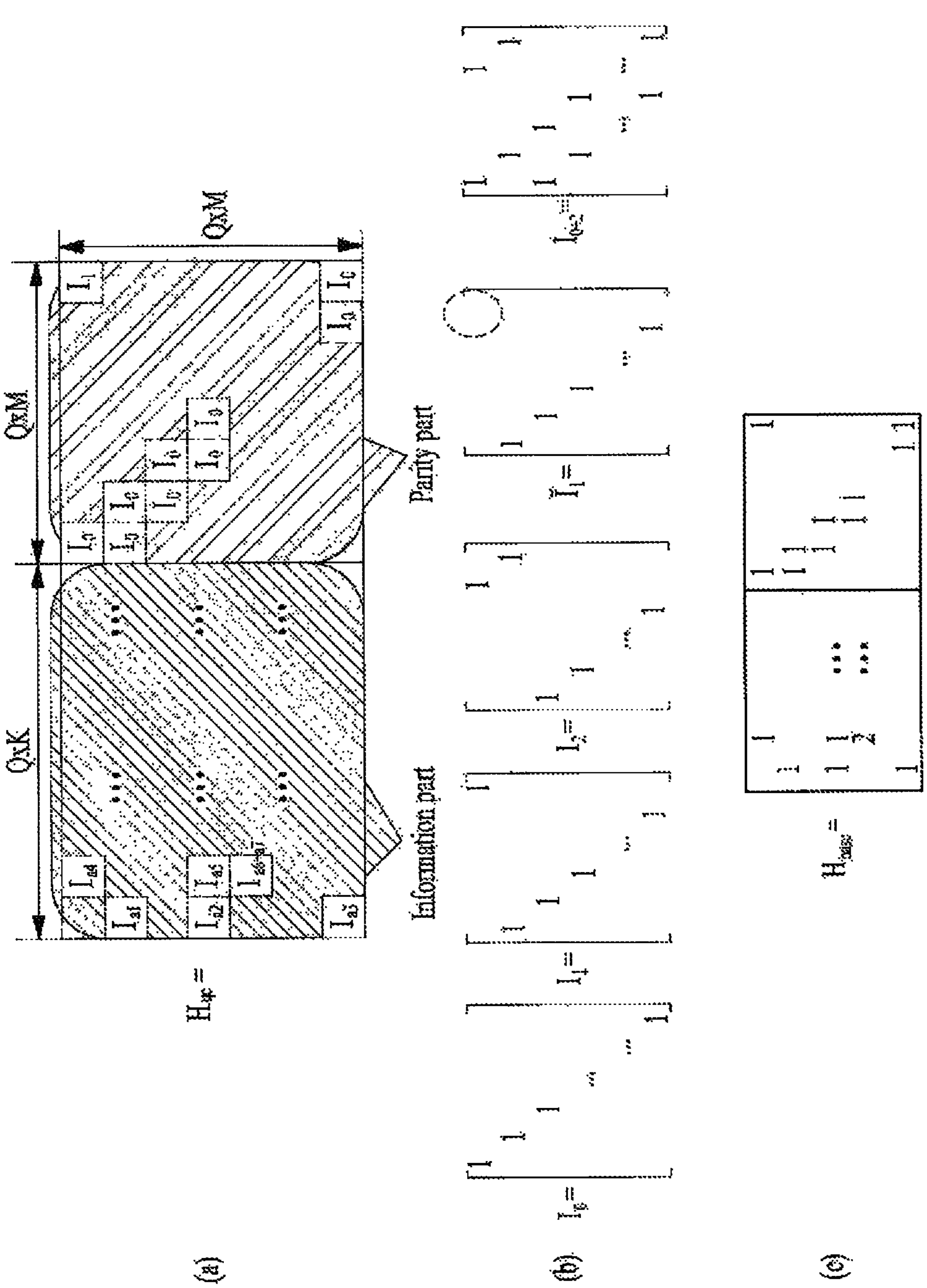

[Figure 27]
(a)
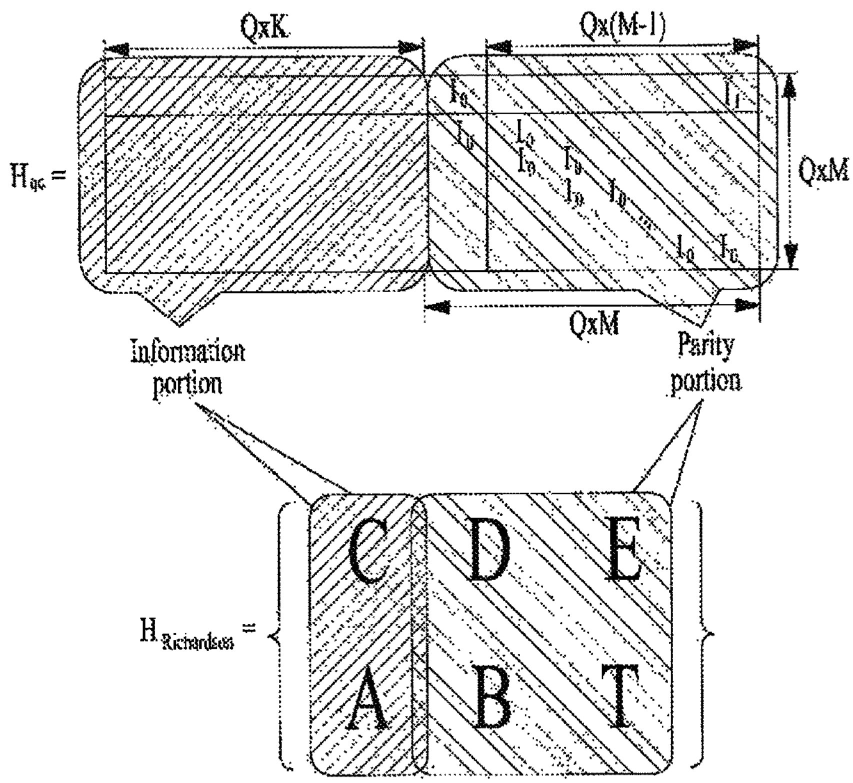
(b)
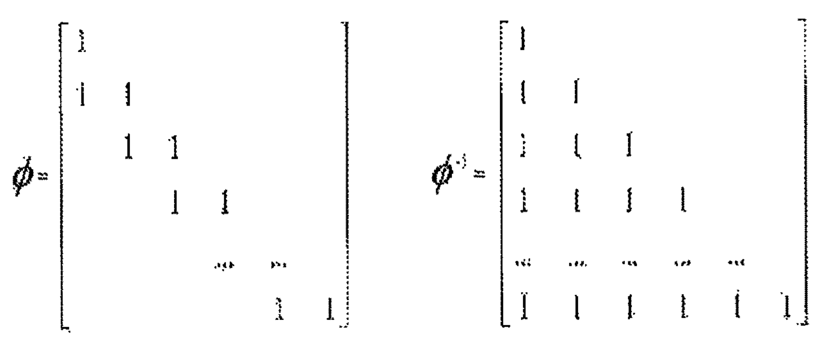

【Figure 28】
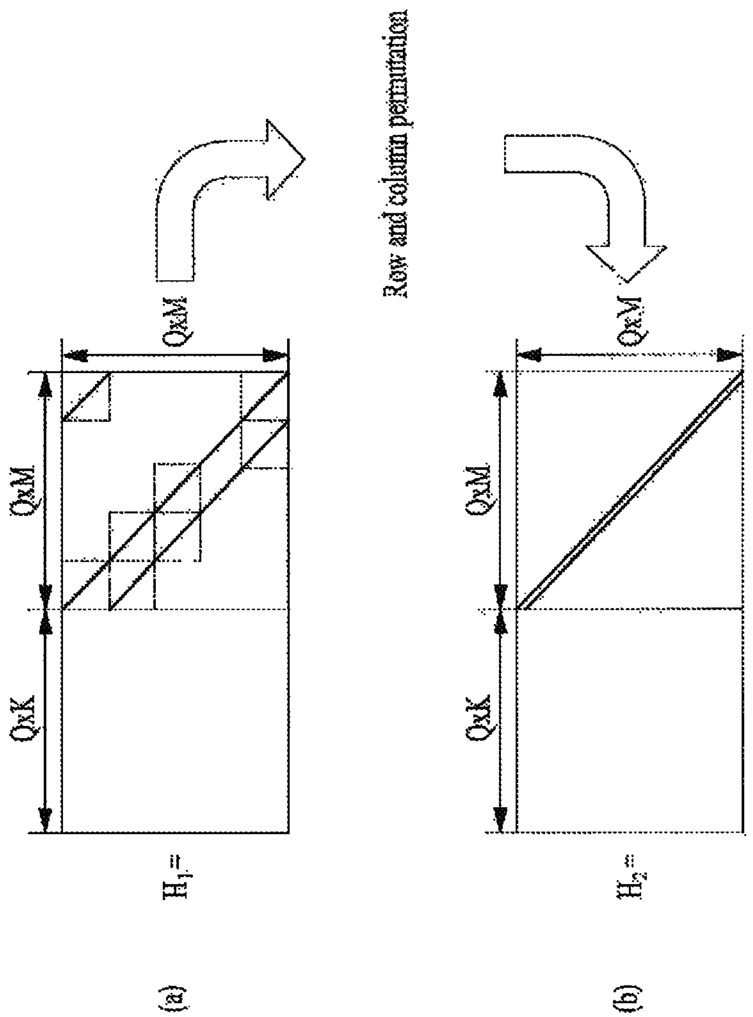

[Figure 29]

| (a) | (b) |
|---|---|
| i= 0, | 3454 3981 5558 5765 6762 9922 10398 11581 13671 15461 16137 17528 18637 20151 |
| i= 1, | 399 1124 3100 8405 13405 14082 14516 15010 15613 16247 18448 20206 20699 21413 |
| i= 2, | 2690 3429 6594 7104 7765 8089 8542 9966 13052 13886 18985 19401 20647 21587 |
| i= 3, | 277 765 2314 3615 4516 4929 6657 10411 11889 12343 17160 17645 19235 19500 |
| i= 4, | 1204 2568 3623 5891 8643 11331 13141 14632 16894 17224 18103 19188 19863 21394 |
| i= 5, | 369 1222 1559 3189 4600 5241 6527 7498 9176 10480 12424 15382 18174 20663 |
| i= 6, | 898 2474 3397 4692 6348 8051 8988 10046 11846 14067 15568 16296 17921 20943 |
| i= 7, | 316 2055 4037 6410 8618 9554 10347 10973 11957 12995 13406 13758 19458 20409 |
| i= 8, | 1037 3859 5052 5665 7895 8301 13129 14122 14776 18323 18560 19262 20326 21072 |
| i= 9, | 2028 3423 4187 4975 5979 7060 9012 11382 12416 12697 13387 16364 16899 20762 |
| i= 10, | 1575 2184 2583 2896 6620 10835 11571 13846 14954 15161 15568 17215 17938 18952 |
| i= 11, | 660 1279 6184 6945 7250 8154 9456 10223 12187 16125 18681 19015 19796 19887 |
| i= 12, | 3490 4458 6497 7596 8816 9732 10798 12162 12944 13574 14488 16072 17651 21420 |
| i= 13, | 96 2574 5689 6365 8363 9532 11099 11766 12852 14522 15507 16679 17548 18596 |
| i= 14, | 2022 4542 6119 8269 9678 9822 10661 12430 12968 13689 17465 19471 20840 21396 |
| i= 15, | 537 1996 3544 3757 10523 12153 13303 13949 16724 17872 18301 18468 18813 21585 |
| i= 16, | 108 880 6535 8884 10427 11371 13327 13777 14493 16604 17356 18123 19055 20832 |
| i= 17, | 1019 1777 3058 4074 5184 10032 10739 11475 11880 15016 15748 17051 19528 20567 |
| i= 18, | 698 3899 4531 5887 8424 9190 9721 12893 14276 17247 17484 19395 20073 20534 |
| i= 19, | 1318 2569 3344 4381 5225 6461 6885 7937 9042 11550 13786 14461 19193 19734 |
| i= 20, | 48 673 868 2888 3290 6209 7964 8833 9365 11477 12479 13637 17029 17621 |
| i= 21, | 532 4471 5054 6707 7689 8799 9642 11567 12261 13000 14358 15561 16667 21140 |
| i= 22, | 2920 5043 5905 8568 9406 10198 10796 11188 14174 16164 17989 18449 19270 21254 |
| i= 23, | 412 1006 3730 3987 7898 8950 9083 9943 10616 10947 12306 13992 18681 19971 |
| i= 24, | 310 3706 5772 7293 8680 12147 12879 14927 18799 |
| i= 25, | 1216 2763 4263 5686 7762 13472 16475 19460 20307 |
| i= 26, | 6361 9280 10086 11446 12389 13138 14706 14870 17096 |
| i= 27, | 910 1929 3087 5544 8021 9194 14522 15953 20972 |
| i= 28, | 1140 8504 10065 10585 11053 11838 18325 19070 21124 |
| i= 29, | 4311 8177 9063 14399 17280 17921 18748 19770 20965 |
| i= 30, | 2715 12473 18718 |
| i= 31, | 1882 15145 19148 |
| i= 32, | 1248 2025 6833 |
| i= 33, | 4599 7438 16462 |
| i= 34, | 13340 19986 20892 |
| i= 35, | 1822 5282 6893 |
| i= 36, | 7183 9753 18241 |
| i= 37, | 458 5793 17913 |
| i= 38, | 4045 6730 7466 |
| i= 39, | 538 3323 11013 |
| i= 40, | 5675 12778 15542 |
| i= 41, | 168 14077 15380 |
| i= 42, | 2155 11670 14228 |
| i= 43, | 1788 5465 12133 |
| i= 44, | 8170 15096 18185 |
| i= 45, | 2127 2539 10552 |
| i= 46, | 7042 11114 14255 |
| i= 47, | 64 5117 16010 |
| i= 48, | 7495 11330 20896 |
| i= 49, | 2925 4903 13177 |
| i= 50, | 3073 7656 17594 |
| i= 51, | 9022 11607 20193 |
| i= 52, | 7812 10178 15615 |
| i= 53, | 1470 4908 14710 |

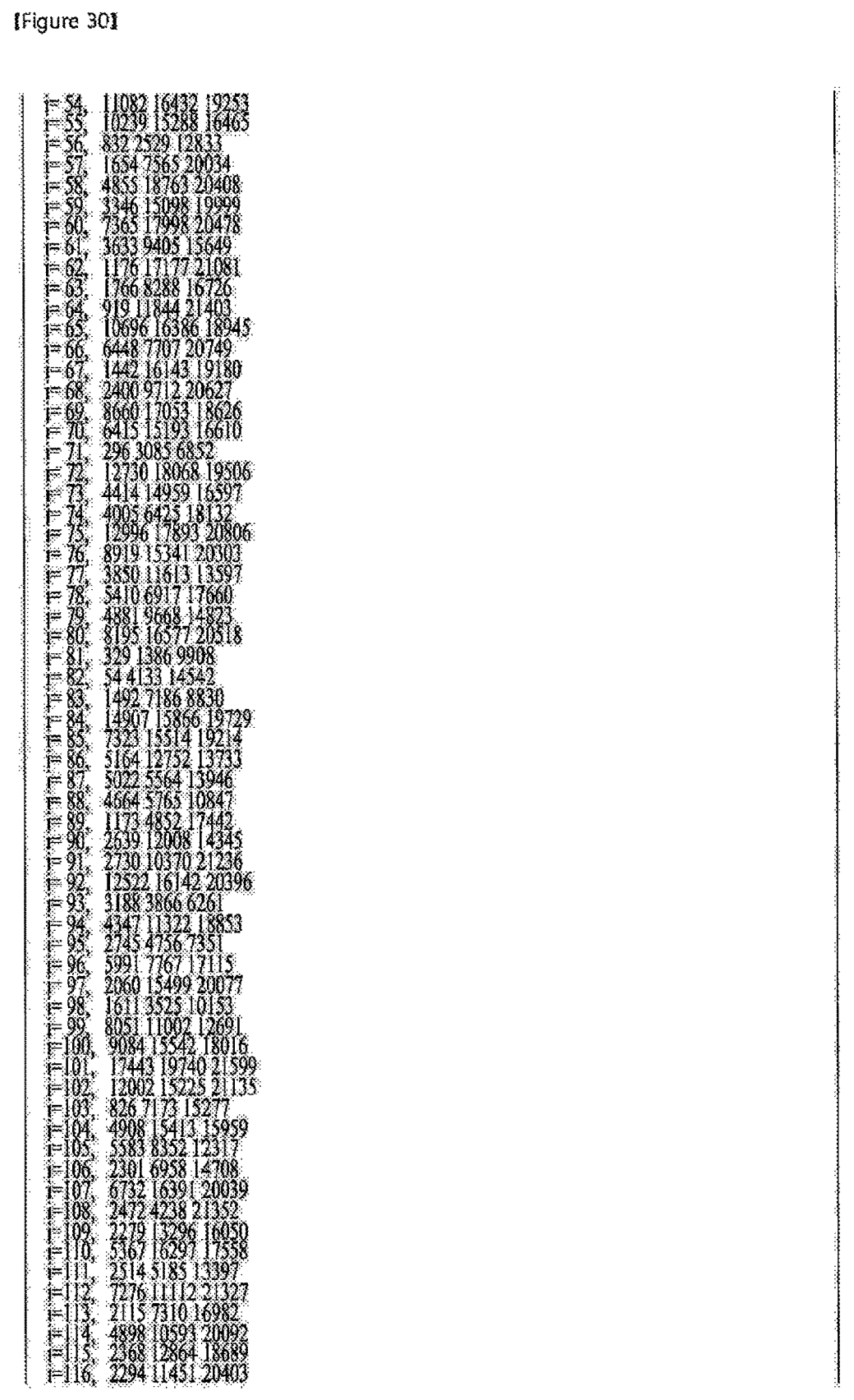

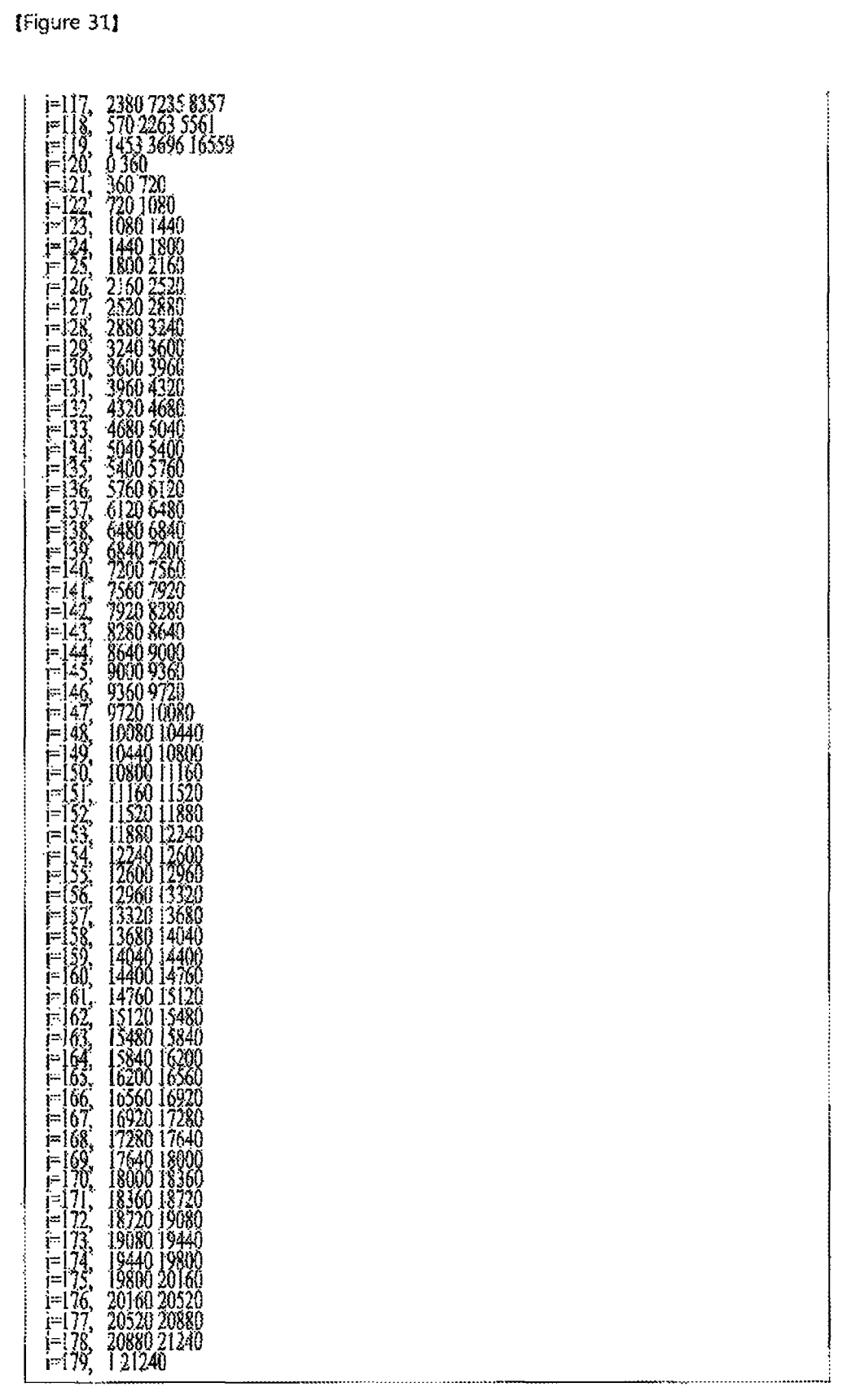

[Figure 34]
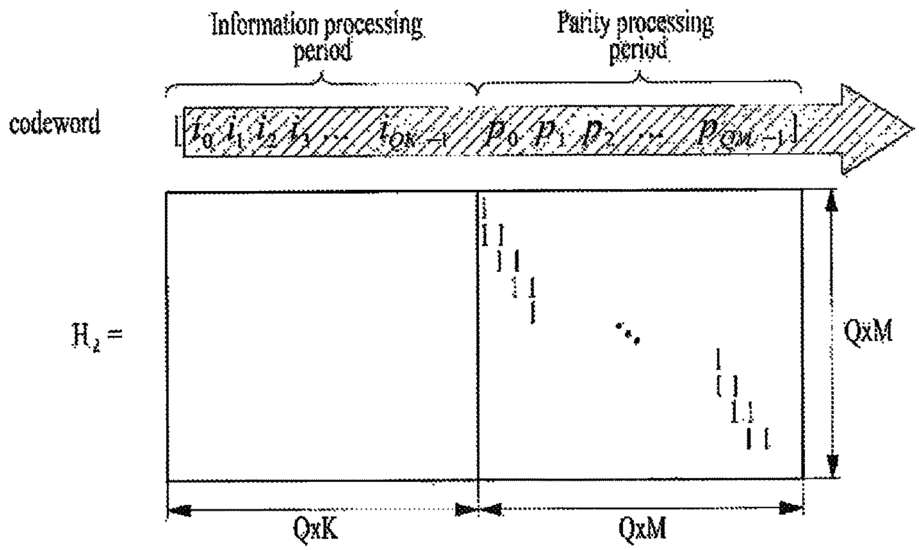
[Figure 35]
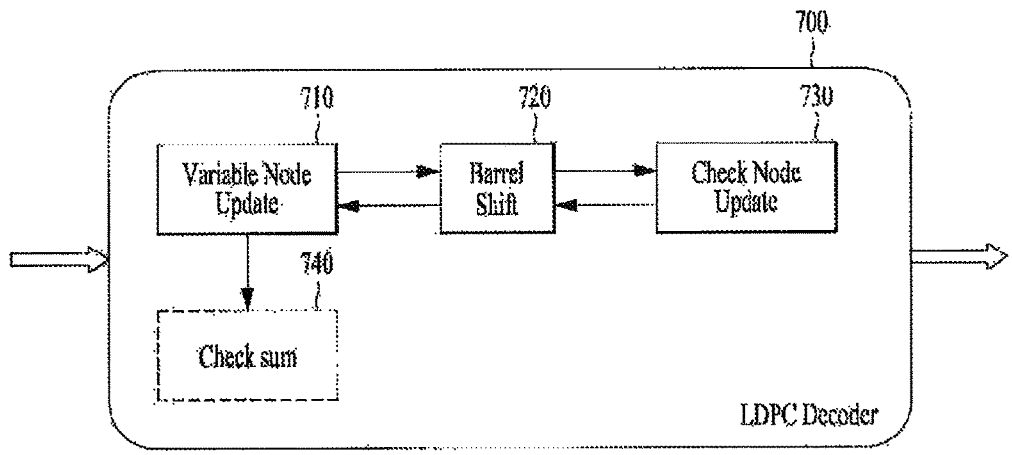
[Figure 36]
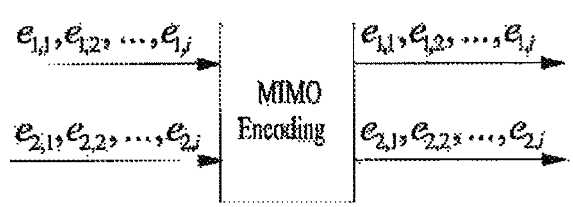
$$i = 0, \ldots, \frac{N_{cells}}{2} - 1$$

【Figure 37】

| Code rate | 8 bpcu | | 12 bpcu | |
|---|---|---|---|---|
| | Constellation | a | Constellation | a |
| 5/15 | QAM-16 | 0 | NUQ-64 for CR=5/15 | 0.1571 |
| 6/15 | QAM-16 | 0.0035 | NUQ-64 for CR=5/15 | 0.1396 |
| 7/15 | QAM-16 | 0.1222 | NUQ-64 for CR=6/15 | 0.2129 |
| 8/15 | QAM-16 | 0.1571 | NUQ-64 for CR=8/15 | 0.2548 |
| 9/15 | QAM-16 | 0.1710 | NUQ-64 for CR=11/15 | 0.2653 |
| 10/15 | QAM-16 | 0.1780 | NUQ-64 for CR=12/15 | 0.2566 |
| 11/15 | QAM-16 | 0.1798 | NUQ-64 for CR=12/15 | 0.2548 |
| 12/15 | QAM-16 | 0.1815 | NUQ-64 for CR=13/15 | 0.2583 |
| 13/15 | QAM-16 | 0.1815 | NUQ-64 for CR=13/15 | 0.2583 |

[Figure 38]
| Code rate | 10 bpcu | |
|---|---|---|
| | Constellation | a |
| 5/15 | QAM-16 / NUQ-64 for CR=5/15 | 0 |
| 6/15 | QAM-16 / NUQ-64 for CR=5/15 | 0 |
| 7/15 | QAM-16 / NUQ-64 for CR=6/15 | 0 |
| 8/15 | QAM-16 / NUQ-64 for CR=8/15 | 0 |
| 9/15 | QAM-16 / NUQ-64 for CR=11/15 | 0 |
| 10/15 | QAM-16 / NUQ-64 for CR=12/15 | 0 |
| 11/15 | QAM-16 / NUQ-64 for CR=12/15 | 0 |
| 12/15 | QAM-16 / NUQ-64 for CR=13/15 | 0 |
| 13/15 | QAM-16 / NUQ-64 for CR=13/15 | 0 |
[Figure 39]
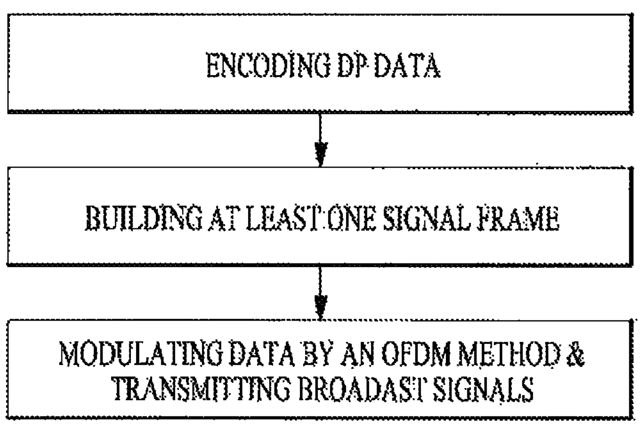

【Figure 40】
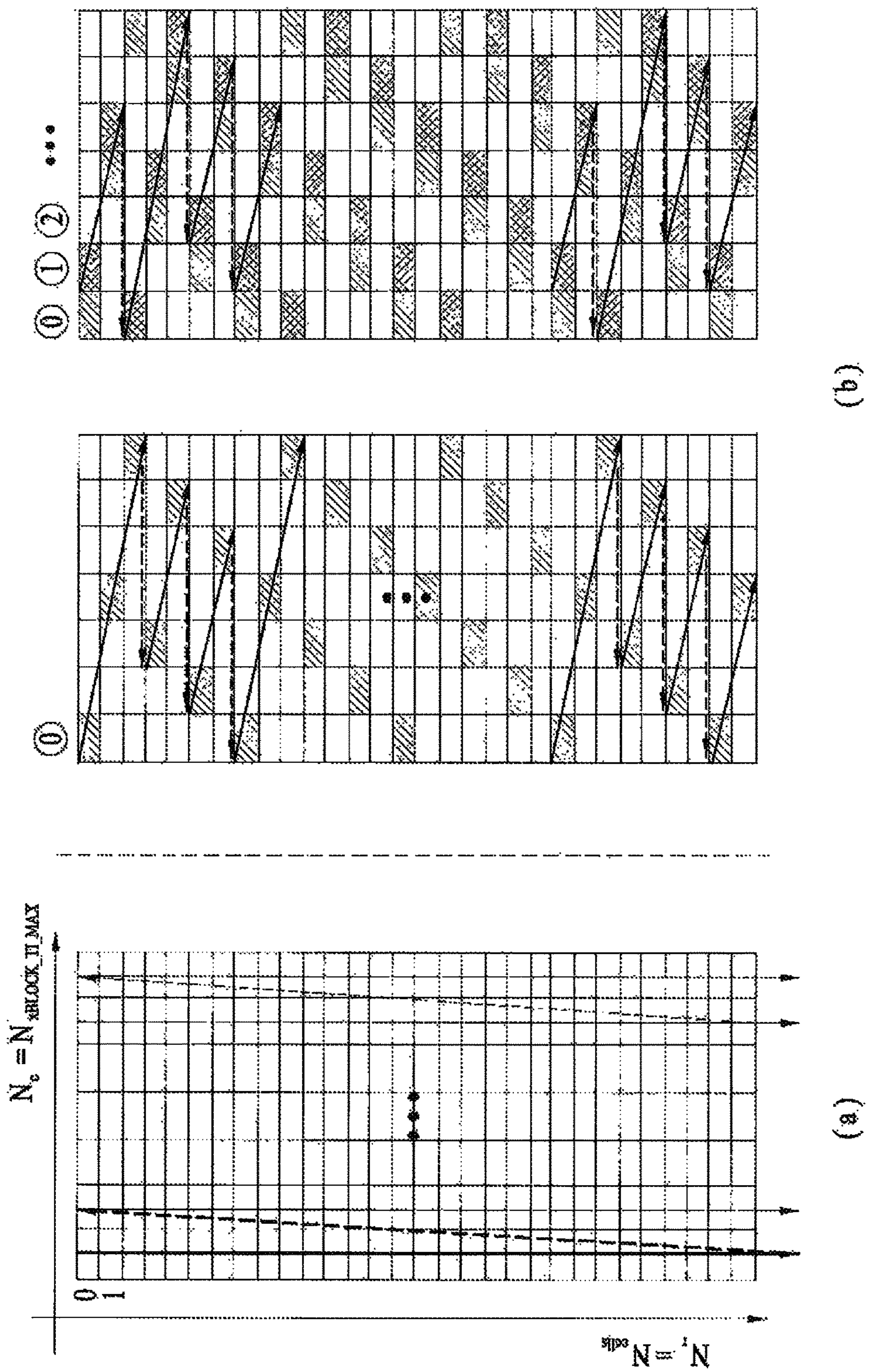

[Figure 41]
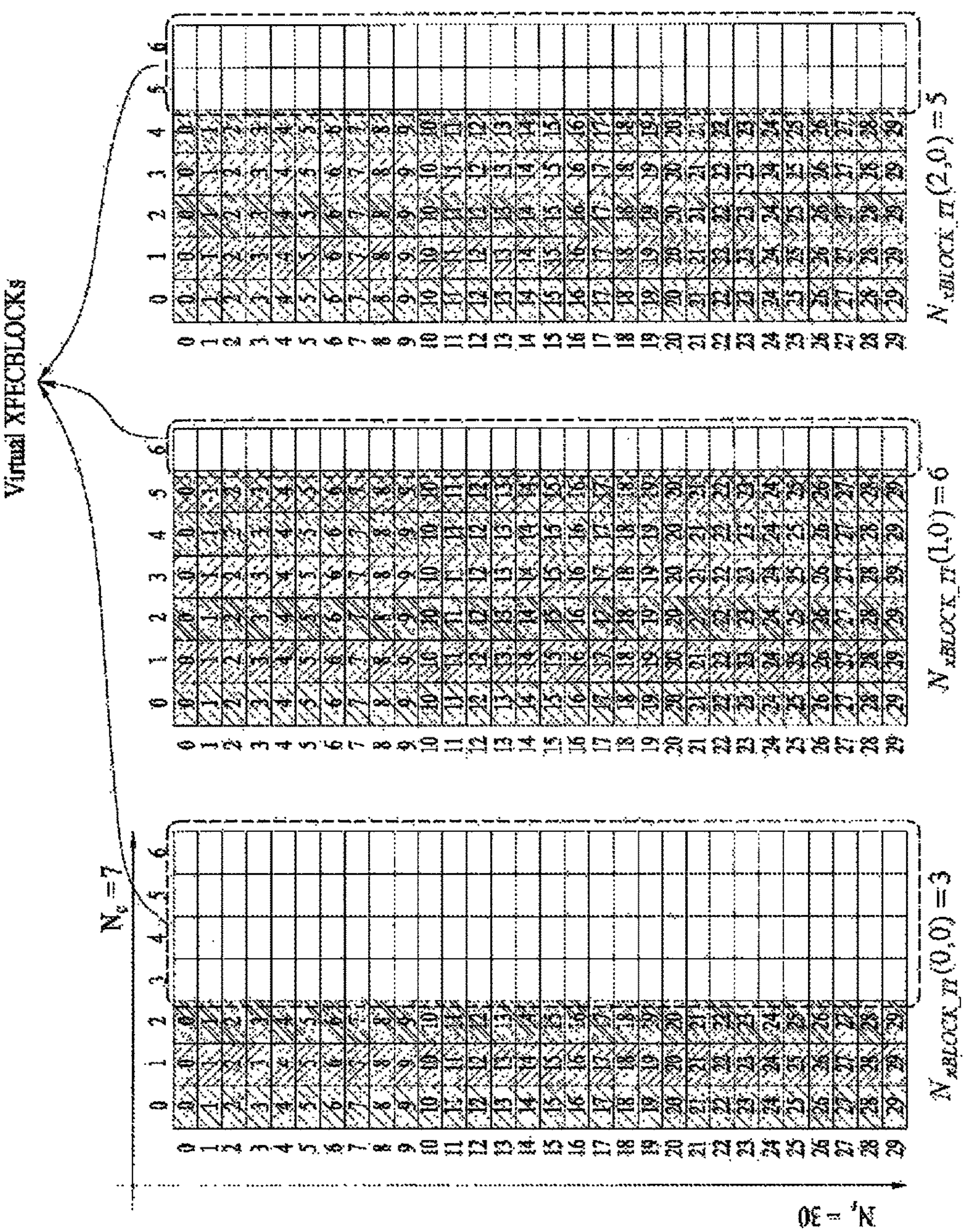

【Figure 42】
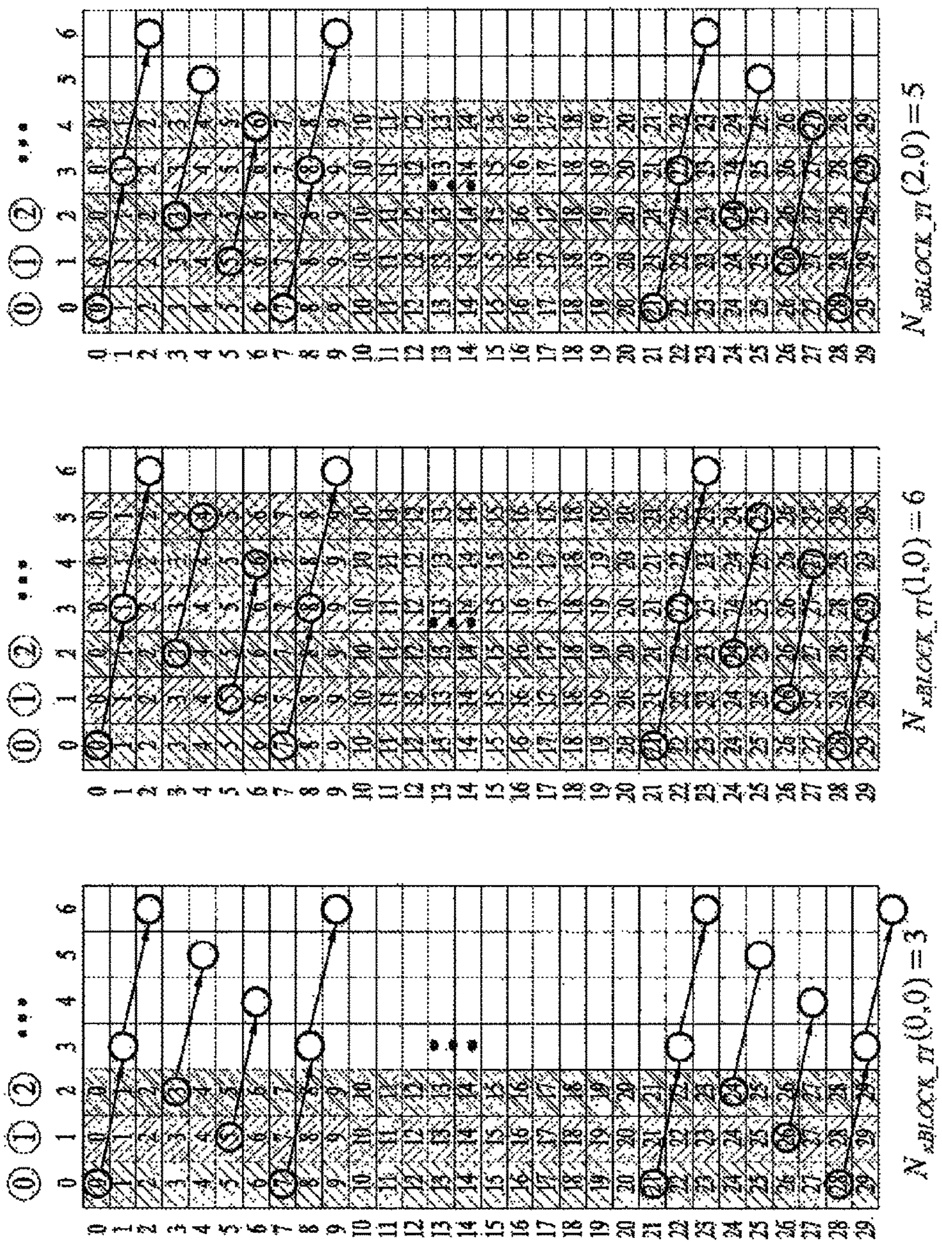

[Figure 43]
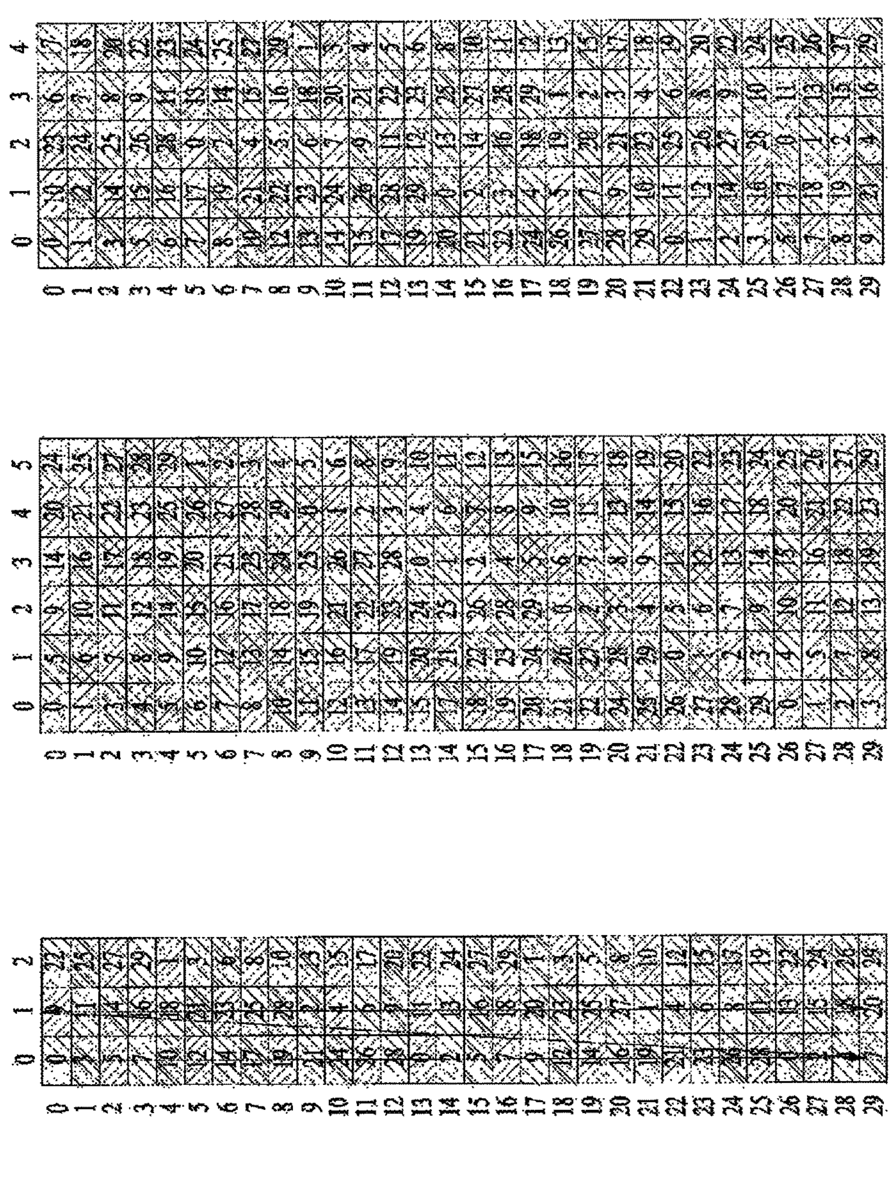
$N_{xBLOCK\_TI}(0,0)=3$
$N_{xBLOCK\_TI}(1,0)=6$
$N_{xBLOCK\_TI}(2,0)=5$

| Variable node degree | 14 | 9 | 3 | 2 |
|---|---|---|---|---|
| (# of variable node) / Q | 24 | 6 | 90 | 60 |

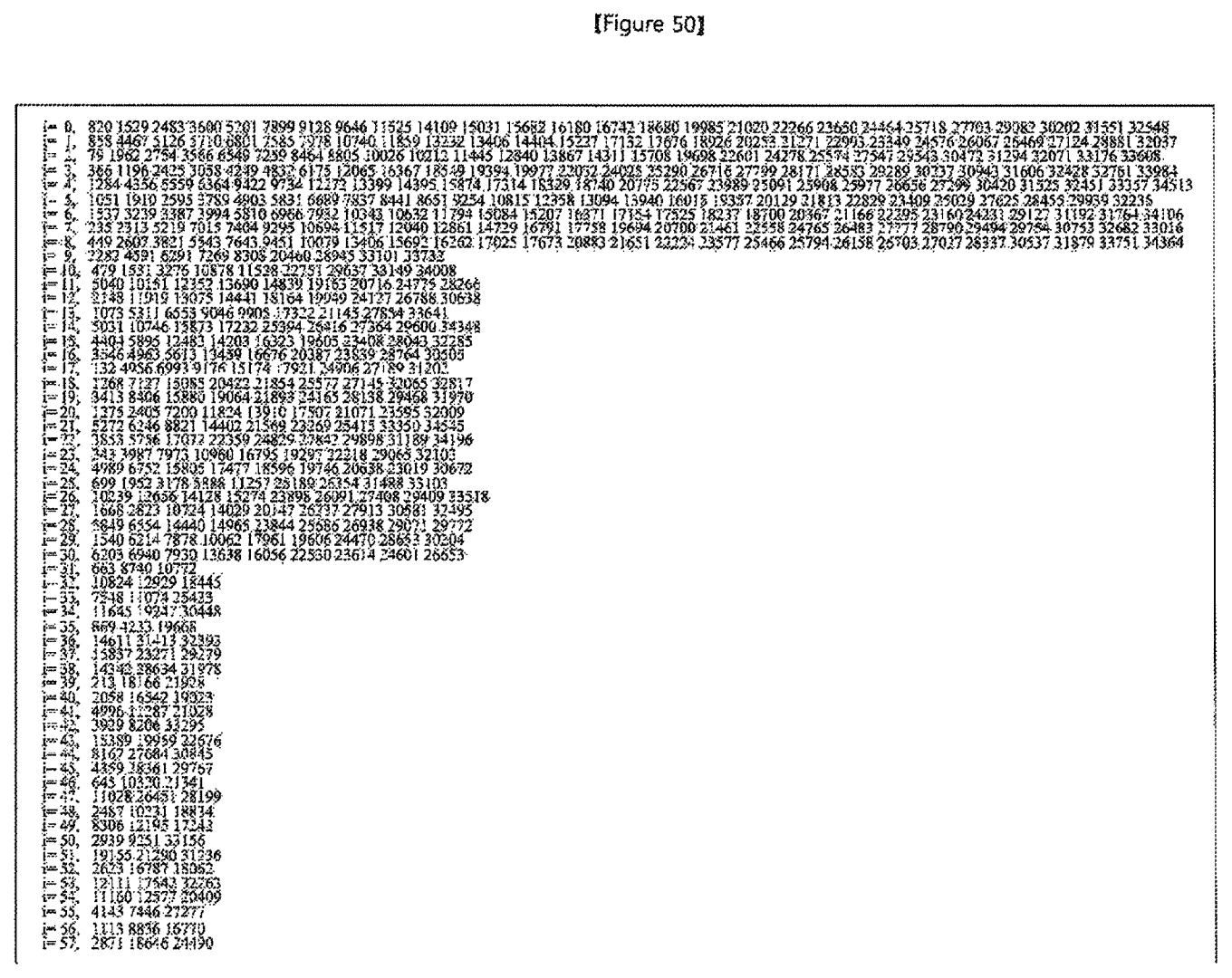

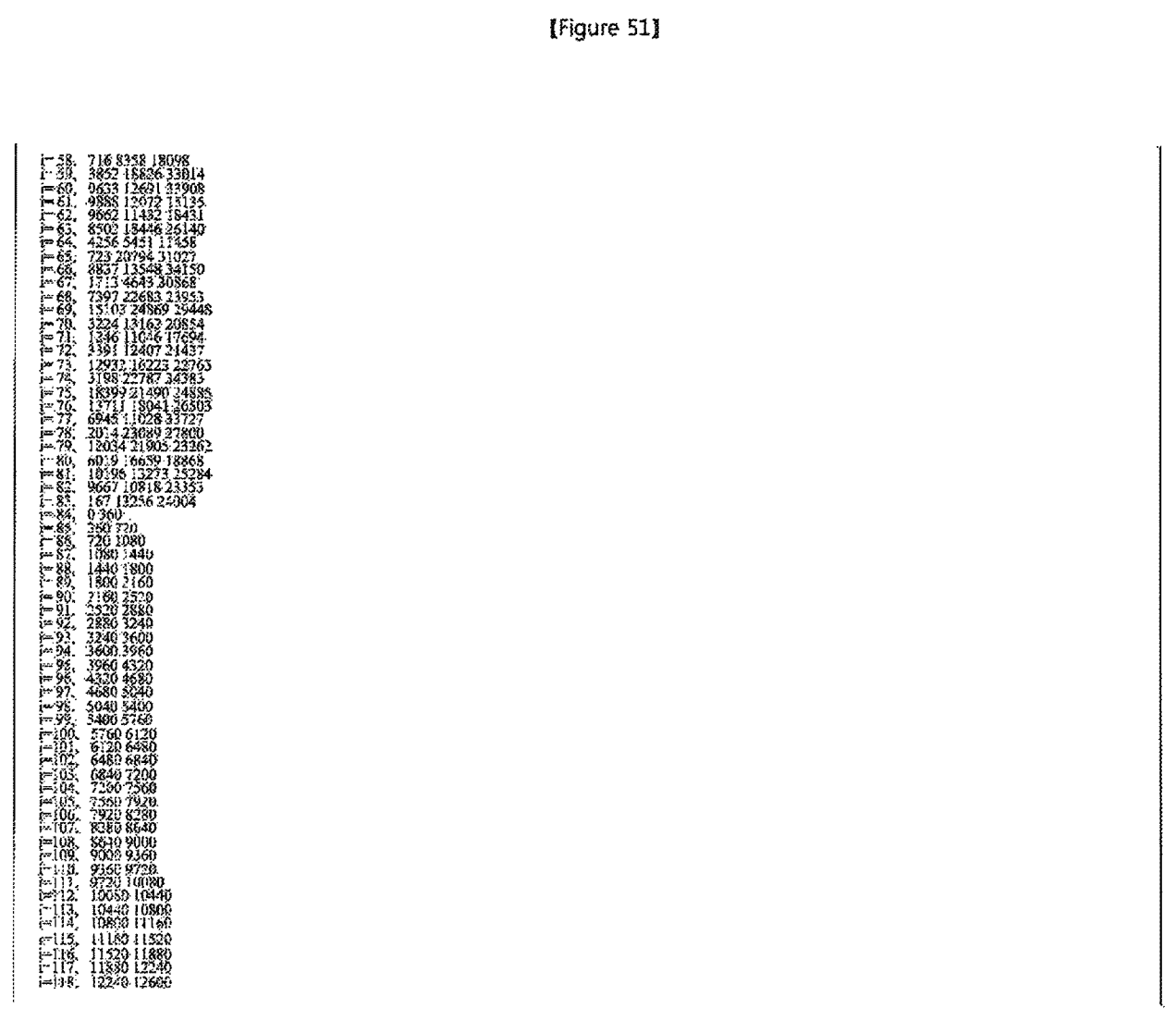

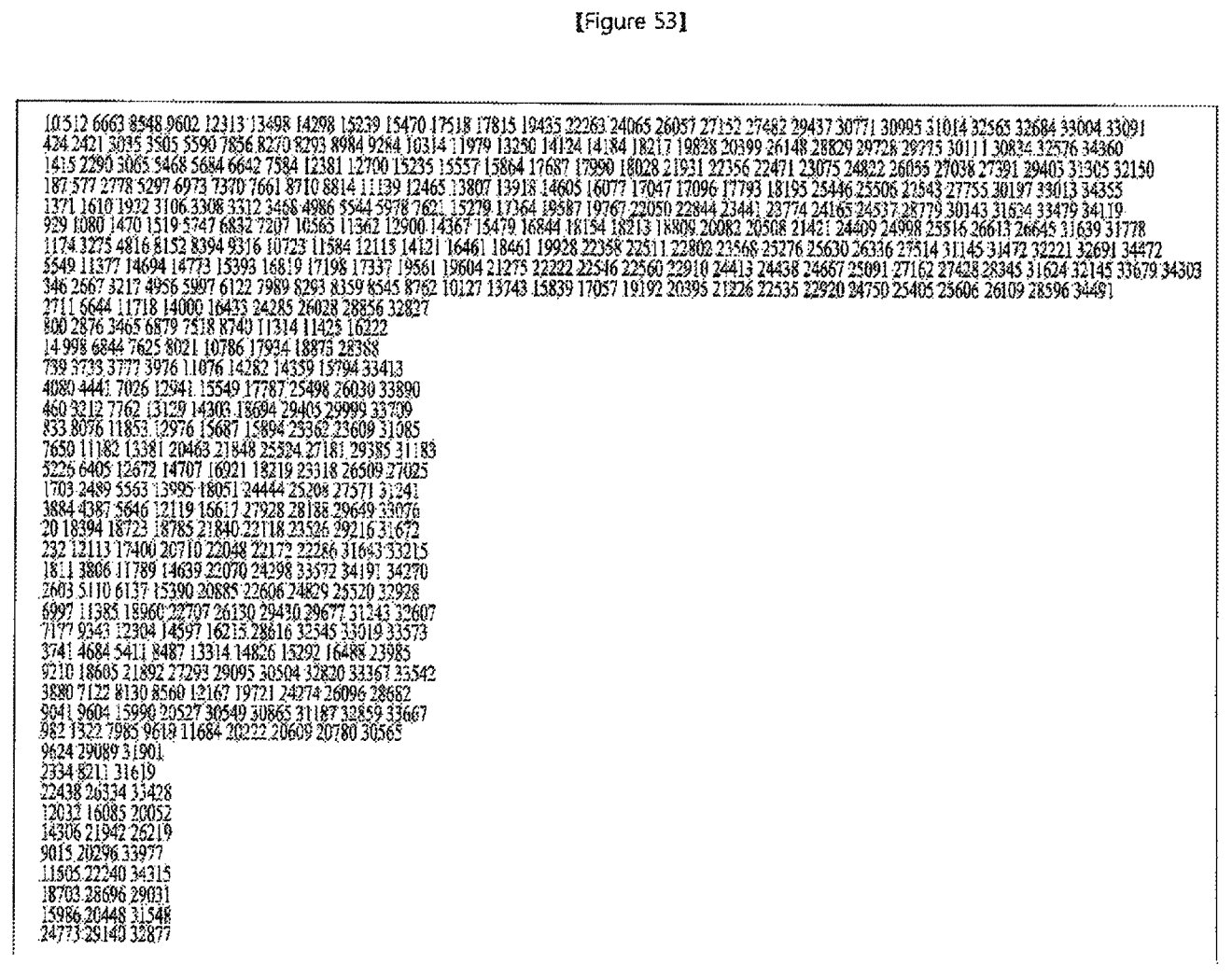

| | | |
|---|---|---|
| 12223 | 14266 | 30349 |
| 16892 | 27478 | 31594 |
| 15319 | 25866 | 34238 |
| 23605 | 23734 | 31180 |
| 3756 | 23794 | 27054 |
| 9755 | 23068 | 27361 |
| 11502 | 16489 | 21918 |
| 10996 | 14524 | 31398 |
| 2519 | 30273 | 30959 |
| 3548 | 5672 | 24121 |
| 4859 | 7253 | 26582 |
| 6002 | 9895 | 21838 |
| 21497 | 22209 | 25200 |
| 31 | 23960 | 32386 |
| 17579 | 23636 | 26667 |
| 3171 | 18840 | 20206 |
| 1028 | 27507 | 33703 |
| 7511 | 9458 | 34177 |
| 10228 | 24202 | 24475 |
| 6622 | 8771 | 26234 |
| 1482 | 16155 | 18465 |
| 6867 | 26143 | 29018 |
| 8307 | 21192 | 21335 |
| 4911 | 28427 | 28639 |
| 290 | 6518 | 26361 |
| 18936 | 21925 | 29854 |
| 25813 | 26212 | 31020 |
| 351 | 18594 | 18932 |
| 2853 | 27729 | 32969 |
| 19428 | 32121 | 33032 |
| 5235 | 13939 | 23646 |
| 14505 | 16066 | 18971 |
| 2253 | 8031 | 31907 |
| 10335 | 17663 | 30636 |
| 3795 | 4389 | 24059 |
| 3014 | 3986 | 21481 |
| 10099 | 21918 | 23805 |
| 4768 | 7757 | 20549 |
| 14817 | 21376 | 29340 |
| 9550 | 14260 | 24880 |
| 8134 | 11164 | 30084 |
| 1758 | 29498 | 30112 |
| 16032 | 23490 | 28452 |

【Figure 55】

| Variable node degree | 26 | 9 | 3 | 2 |
|---|---|---|---|---|
| (# of variable node) / Q | 9 | 22 | 53 | 96 |

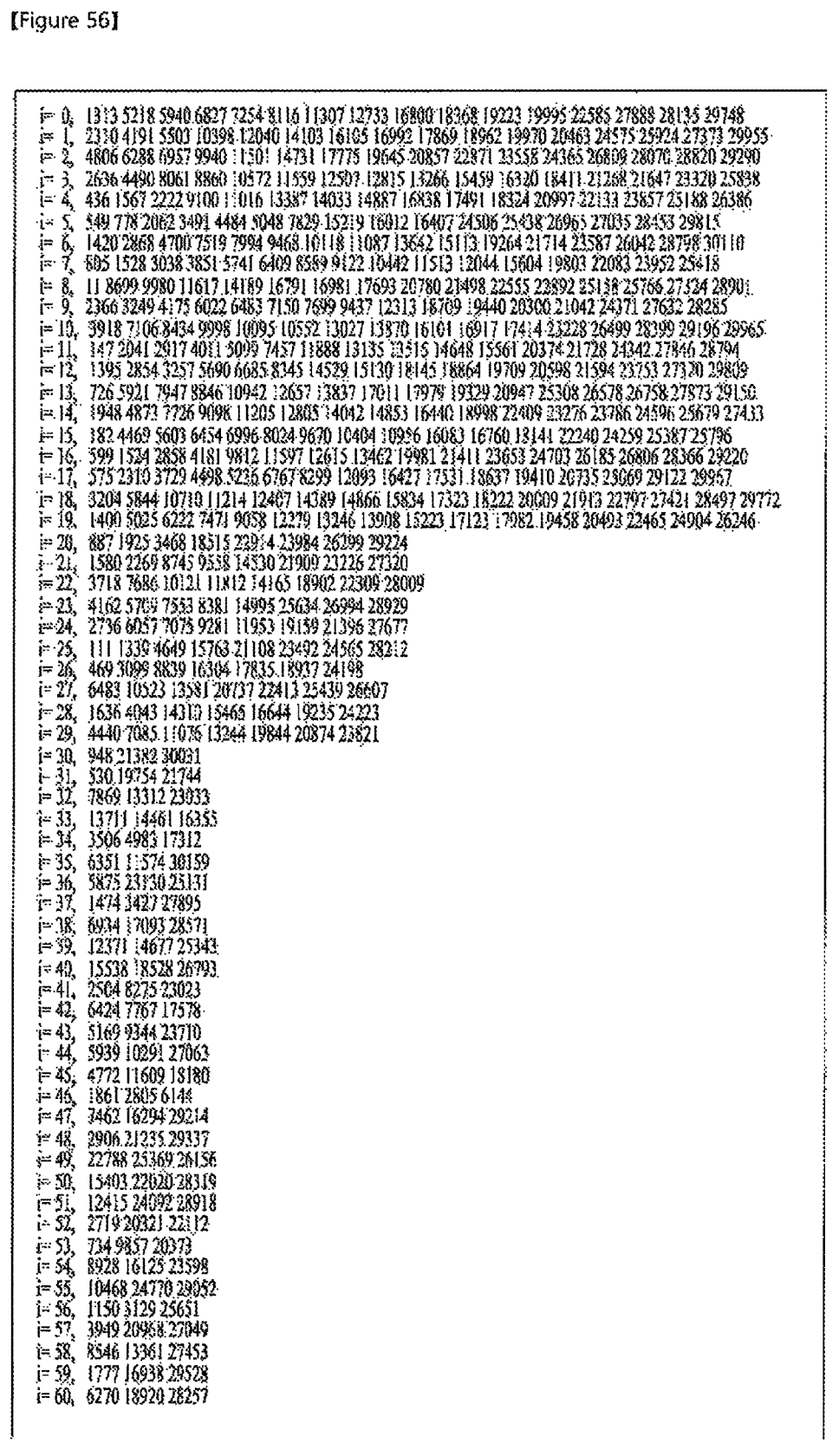

| Variable node degree | 16 | 8 | 7 | 3 | 2 |
|---|---|---|---|---|---|
| (# of variable node) / Q | 20 | 6 | 4 | 66 | 84 |

```
i=121,  4680 5040
i=122,  5040 5400
i=123,  5400 5760
i=124,  5760 6120
i=125,  6120 6480
i=126,  6480 6840
i=127,  6840 7200
i=128,  7200 7560
i=129,  7560 7920
i=130,  7920 8280
i=131,  8280 8640
i=132,  8640 9000
i=133,  9000 9360
i=134,  9360 9720
i=135,  9720 10080
i=136,  10080 10440
i=137,  10440 10800
i=138,  10800 11160
i=139,  11160 11520
i=140,  11520 11880
i=141,  11880 12240
i=142,  12240 12600
i=143,  12600 12960
i=144,  12960 13320
i=145,  13320 13680
i=146,  13680 14040
i=147,  14040 14400
i=148,  14400 14760
i=149,  14760 15120
i=150,  15120 15480
i=151,  15480 15840
i=152,  15840 16200
i=153,  16200 16560
i=154,  16560 16920
i=155,  16920 17280
i=156,  17280 17640
i=157,  17640 18000
i=158,  18000 18360
i=159,  18360 18720
i=160,  18720 19080
i=161,  19080 19440
i=162,  19440 19800
i=163,  19800 20160
i=164,  20160 20520
i=165,  20520 20880
i=166,  20880 21240
i=167,  21240 21600
i=168,  21600 21960
i=169,  21960 22320
i=170,  22320 22680
i=171,  22680 23040
i=172,  23040 23400
i=173,  23400 23760
i=174,  23760 24120
i=175,  24120 24480
i=176,  24480 24840
i=177,  24840 25200
i=178,  25200 25560
i=179,  1 25560
```

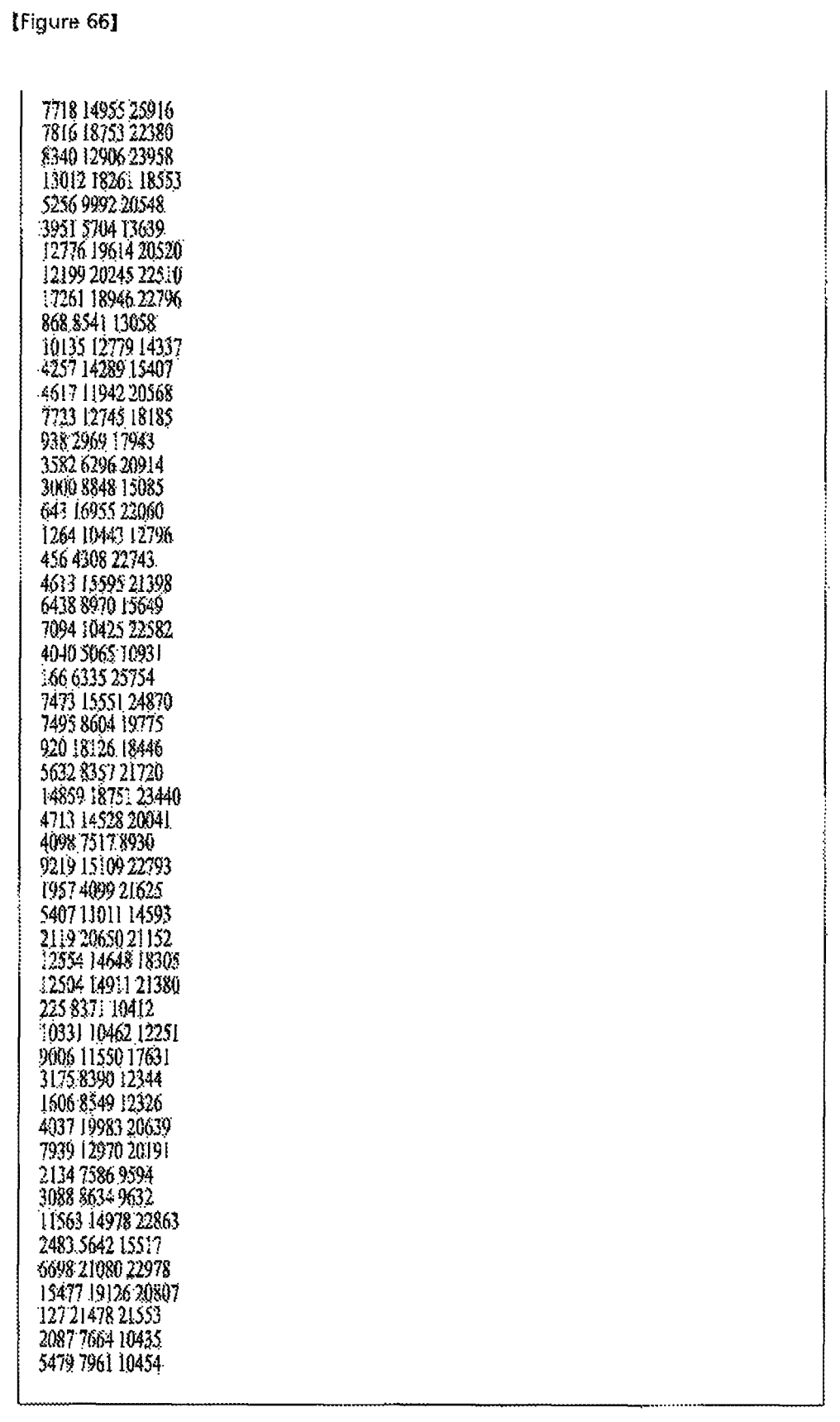

| Variable node degree | 16 | 8 | 7 | 3 | 2 |
|---|---|---|---|---|---|
| (# of variable node) / Q | 21 | 7 | 3 | 77 | 72 |

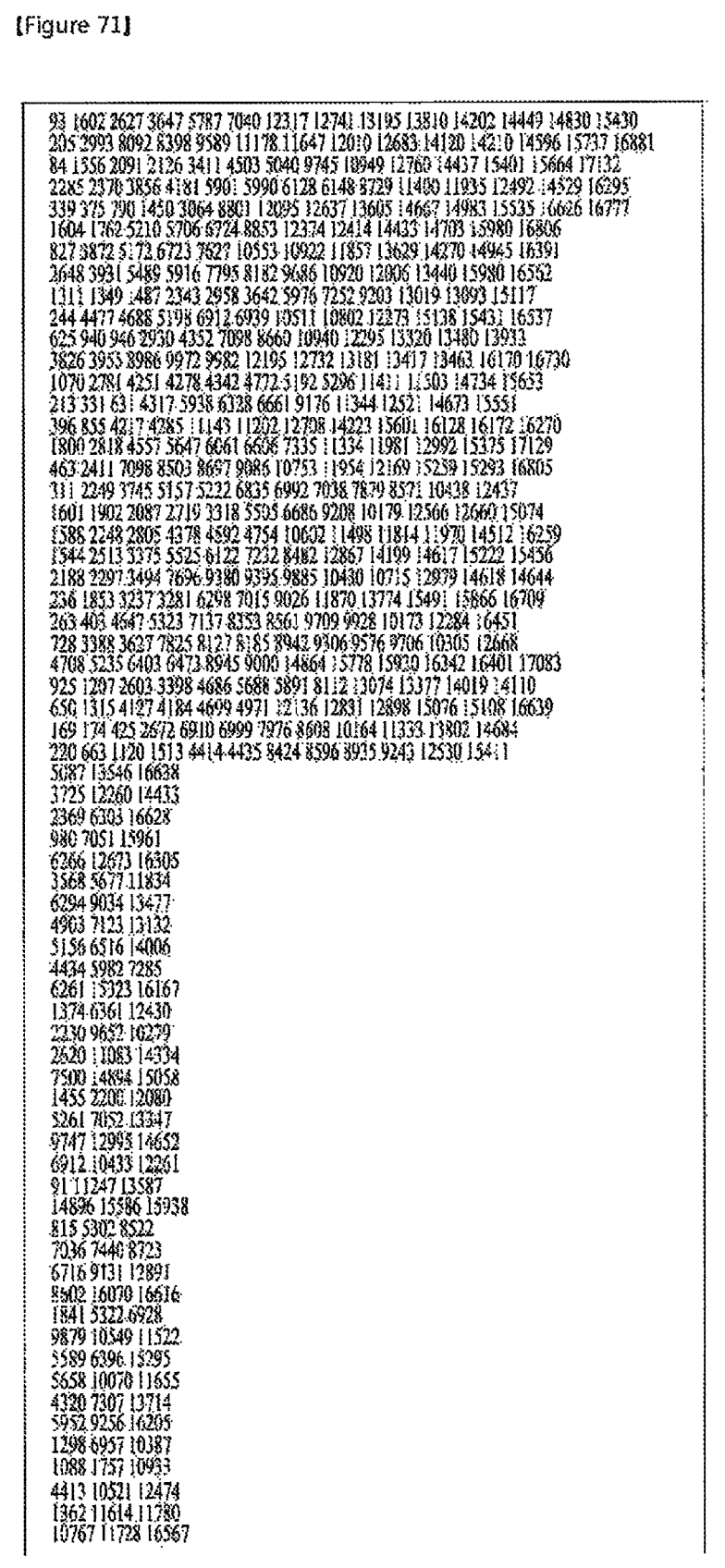

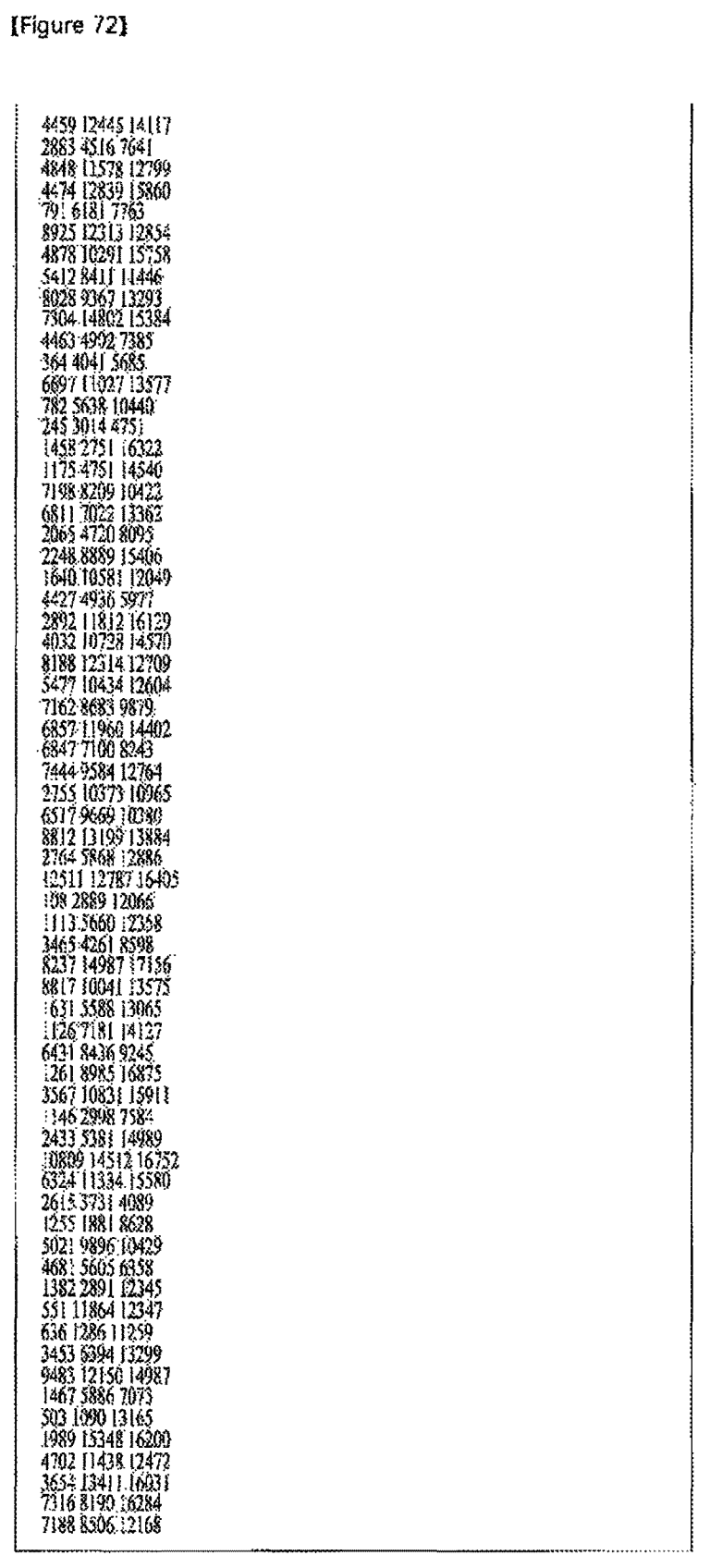

| Variable node degree | 14 | 12 | 3 | 2 |
|---|---|---|---|---|
| (# of variable node) / Q | 5 | 25 | 102 | 48 |

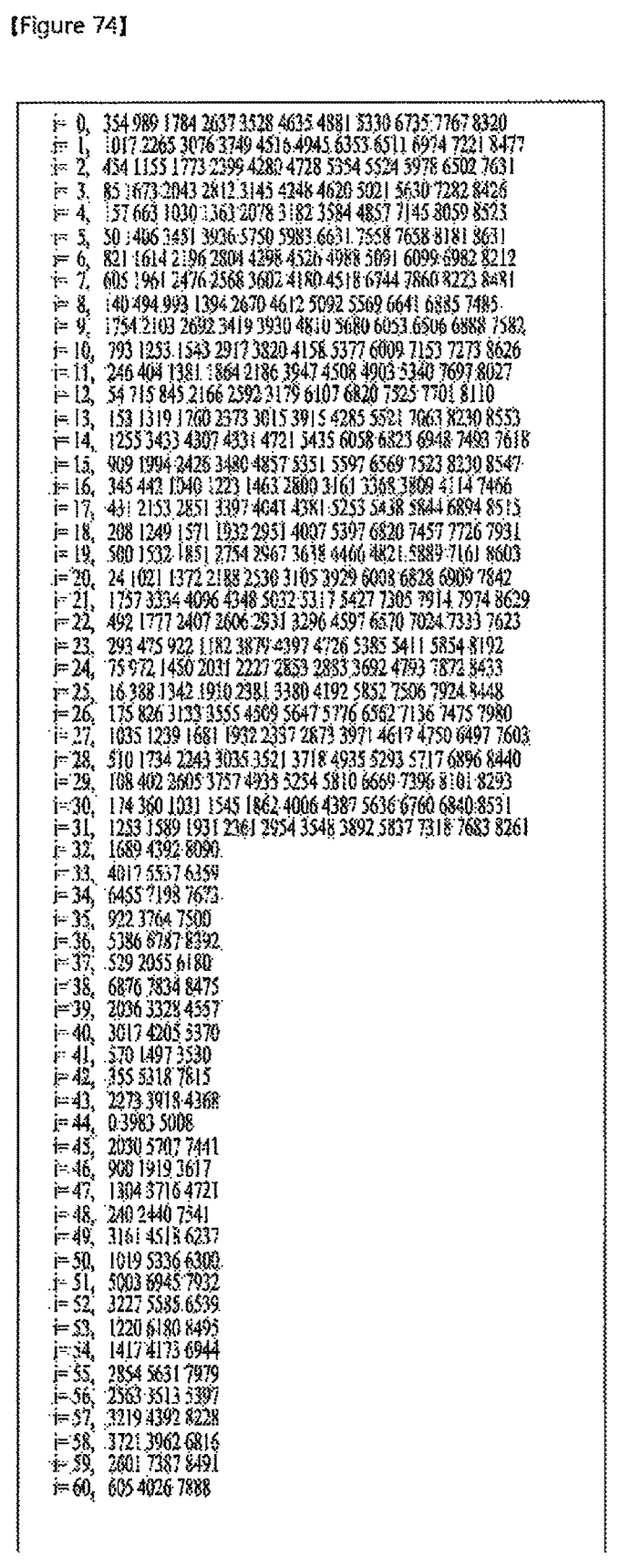

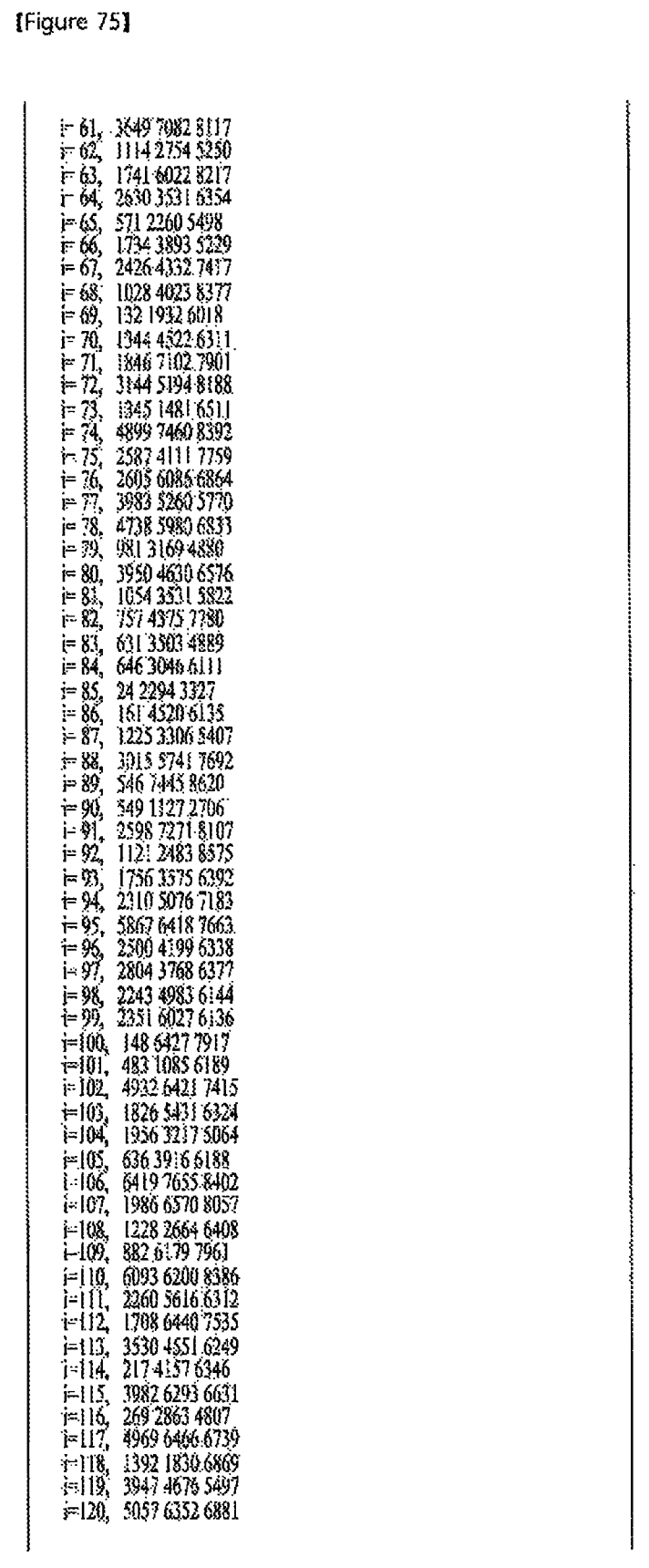

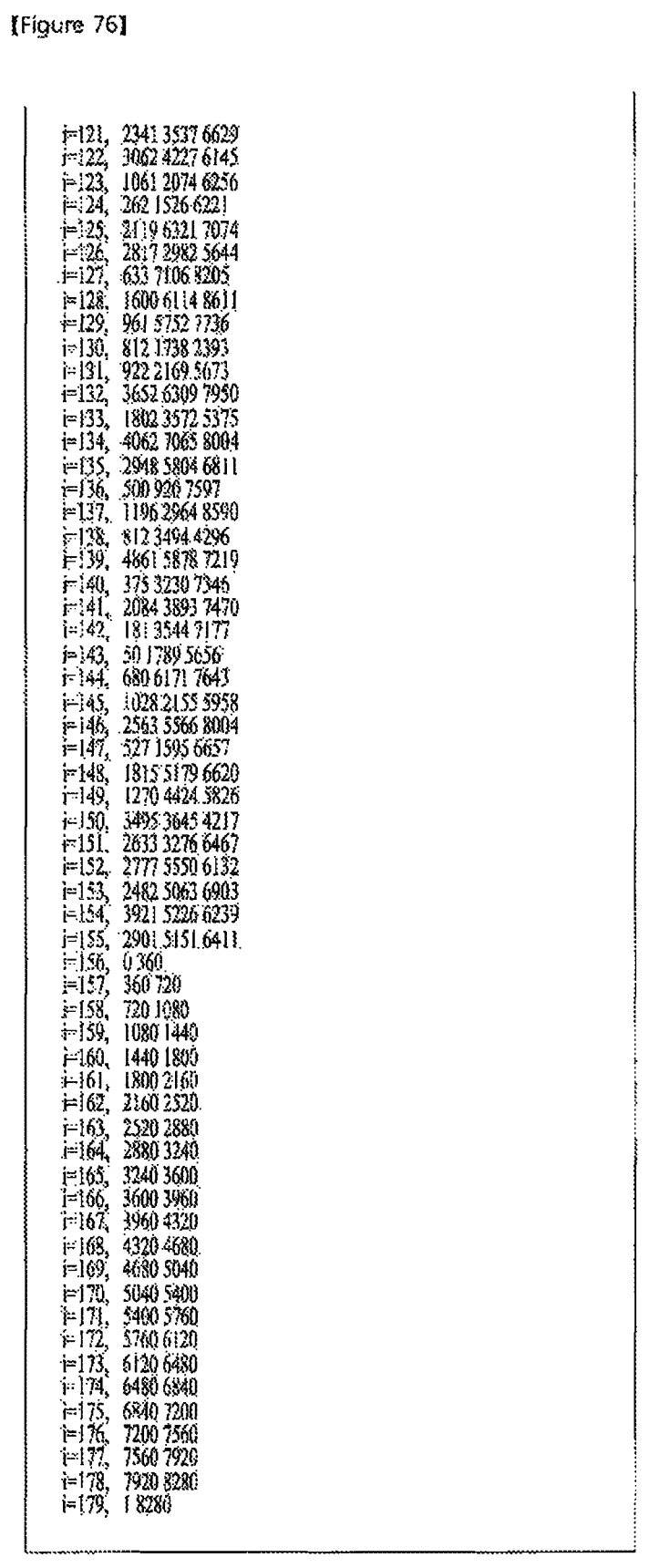

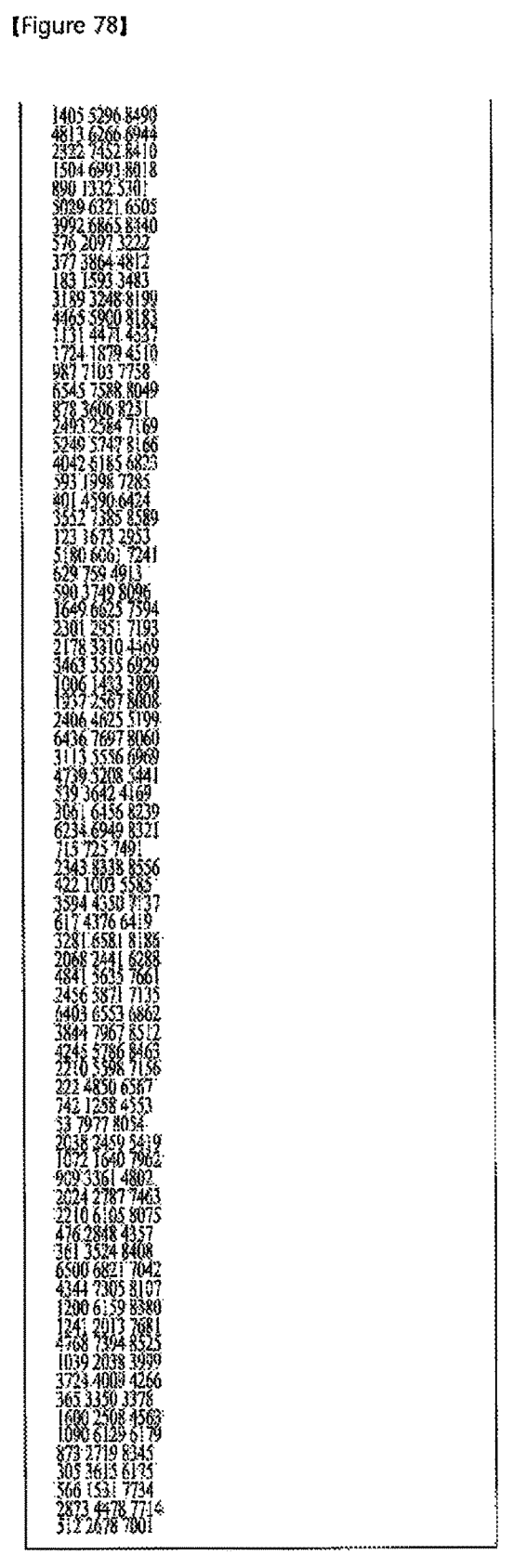

| Variable node degree | 11 | 3 | 2 |
|---|---|---|---|
| (# of variable node) / Q | 32 | 124 | 24 |

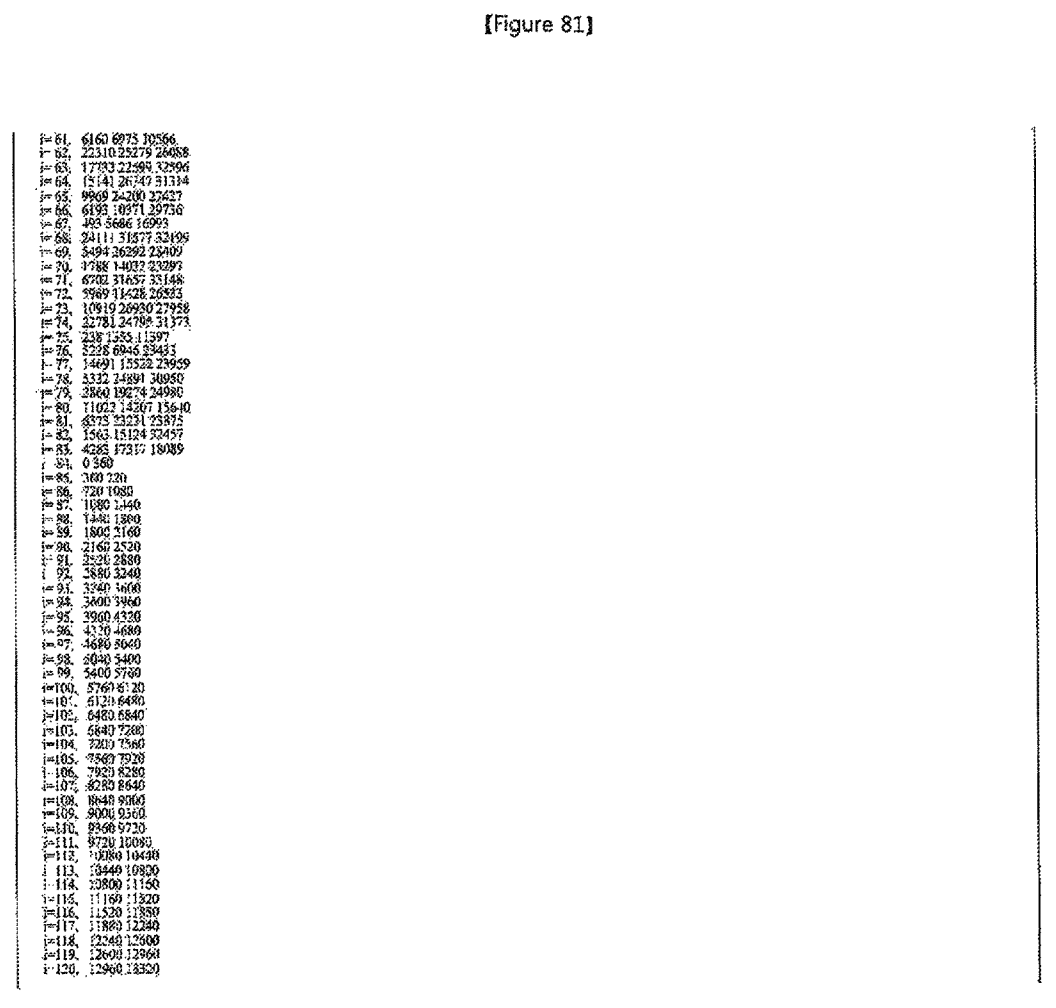

| | |
|---|---|
| i=121, | 13320 13680 |
| i=122, | 13680 14040 |
| i=123, | 14040 14400 |
| i=124, | 14400 14760 |
| i=125, | 14760 15120 |
| i=126, | 15120 15480 |
| i=127, | 15480 15840 |
| i=128, | 15840 16200 |
| i=129, | 16200 16560 |
| i=130, | 16560 16920 |
| i=131, | 16920 17280 |
| i=132, | 17280 17640 |
| i=133, | 17640 18000 |
| i=134, | 18000 18360 |
| i=135, | 18360 18720 |
| i=136, | 18720 19080 |
| i=137, | 19080 19440 |
| i=138, | 19440 19800 |
| i=139, | 19800 20160 |
| i=140, | 20160 20520 |
| i=141, | 20520 20880 |
| i=142, | 20880 21240 |
| i=143, | 21240 21600 |
| i=144, | 21600 21960 |
| i=145, | 21960 22320 |
| i=146, | 22320 22680 |
| i=147, | 22680 23040 |
| i=148, | 23040 23400 |
| i=149, | 23400 23760 |
| i=150, | 23760 24120 |
| i=151, | 24120 24480 |
| i=152, | 24480 24840 |
| i=153, | 24840 25200 |
| i=154, | 25200 25560 |
| i=155, | 25560 25920 |
| i=156, | 25920 26280 |
| i=157, | 26280 26640 |
| i=158, | 26640 27000 |
| i=159, | 27000 27360 |
| i=160, | 27360 27720 |
| i=161, | 27720 28080 |
| i=162, | 28080 28440 |
| i=163, | 28440 28800 |
| i=164, | 28800 29160 |
| i=165, | 29160 29520 |
| i=166, | 29520 29880 |
| i=167, | 29880 30240 |
| i=168, | 30240 30600 |
| i=169, | 30600 30960 |
| i=170, | 30960 31320 |
| i=171, | 31320 31680 |
| i=172, | 31680 32040 |
| i=173, | 32040 32400 |
| i=174, | 32400 32760 |
| i=175, | 32760 33120 |
| i=176, | 33120 33480 |
| i=177, | 33480 33840 |
| i=178, | 33840 34200 |
| i=179, | 34200 |

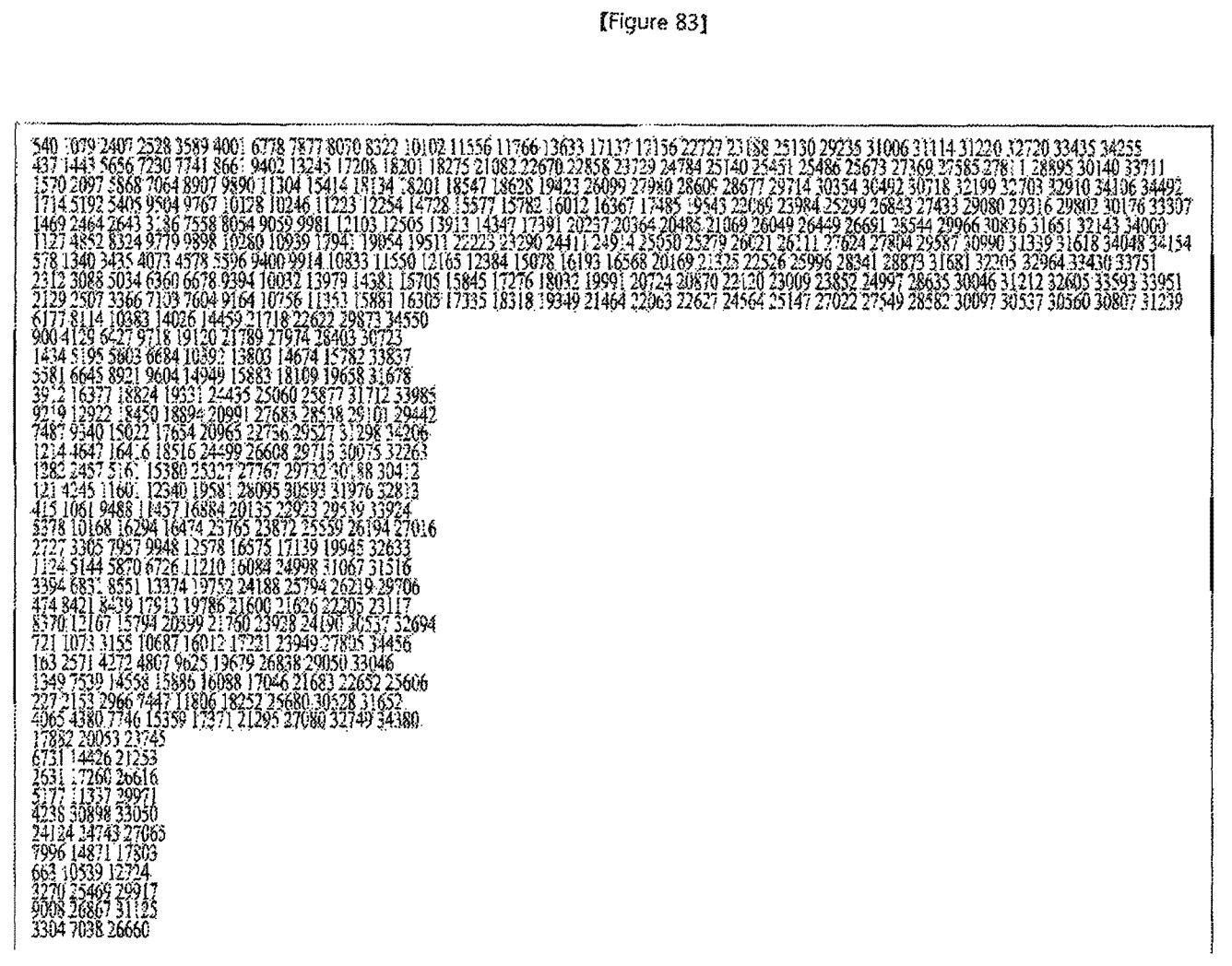

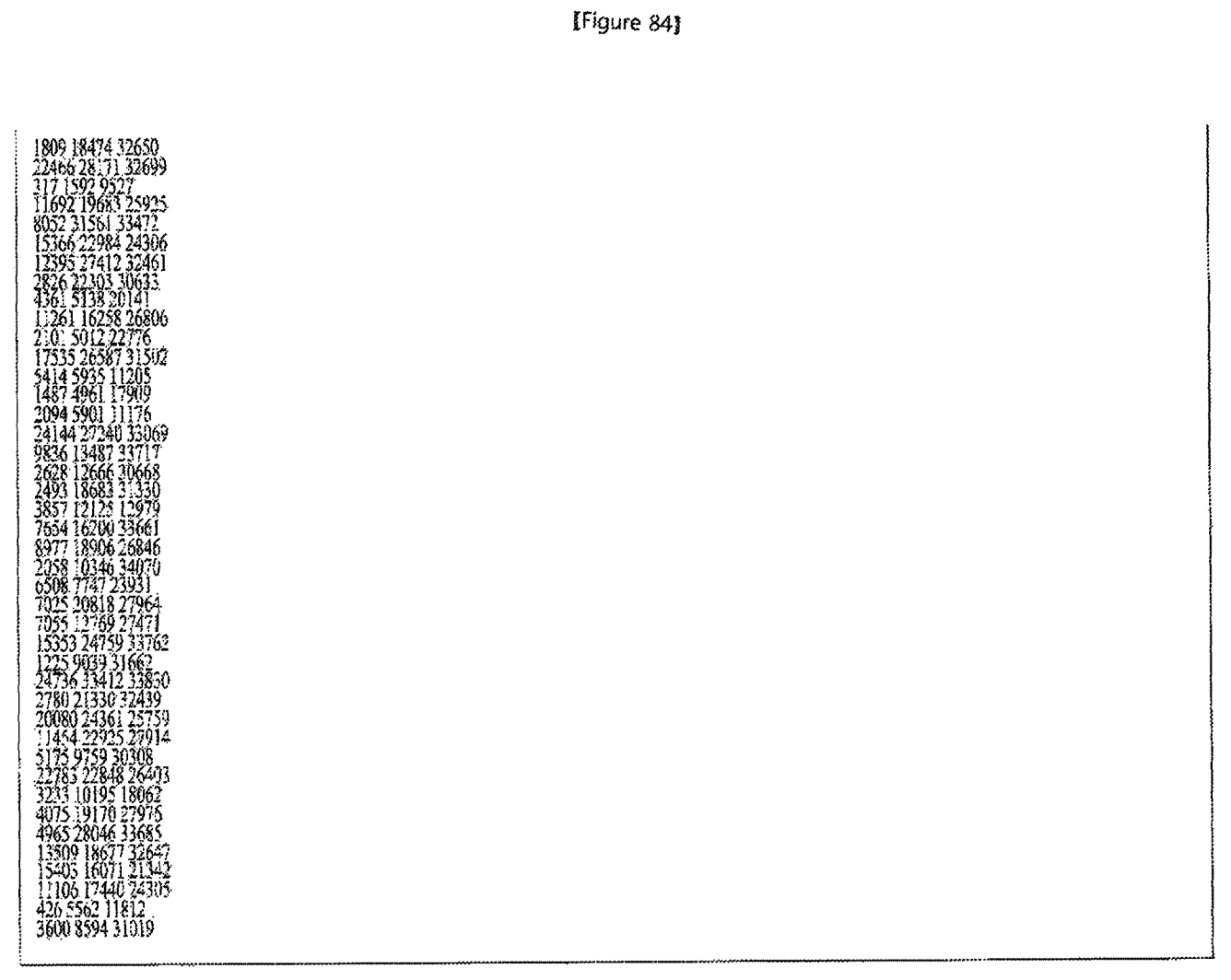

| Variable node degree | 26 | 9 | 3 | 2 |
|---|---|---|---|---|
| (# of variable node) / Q | 9 | 22 | 53 | 96 |

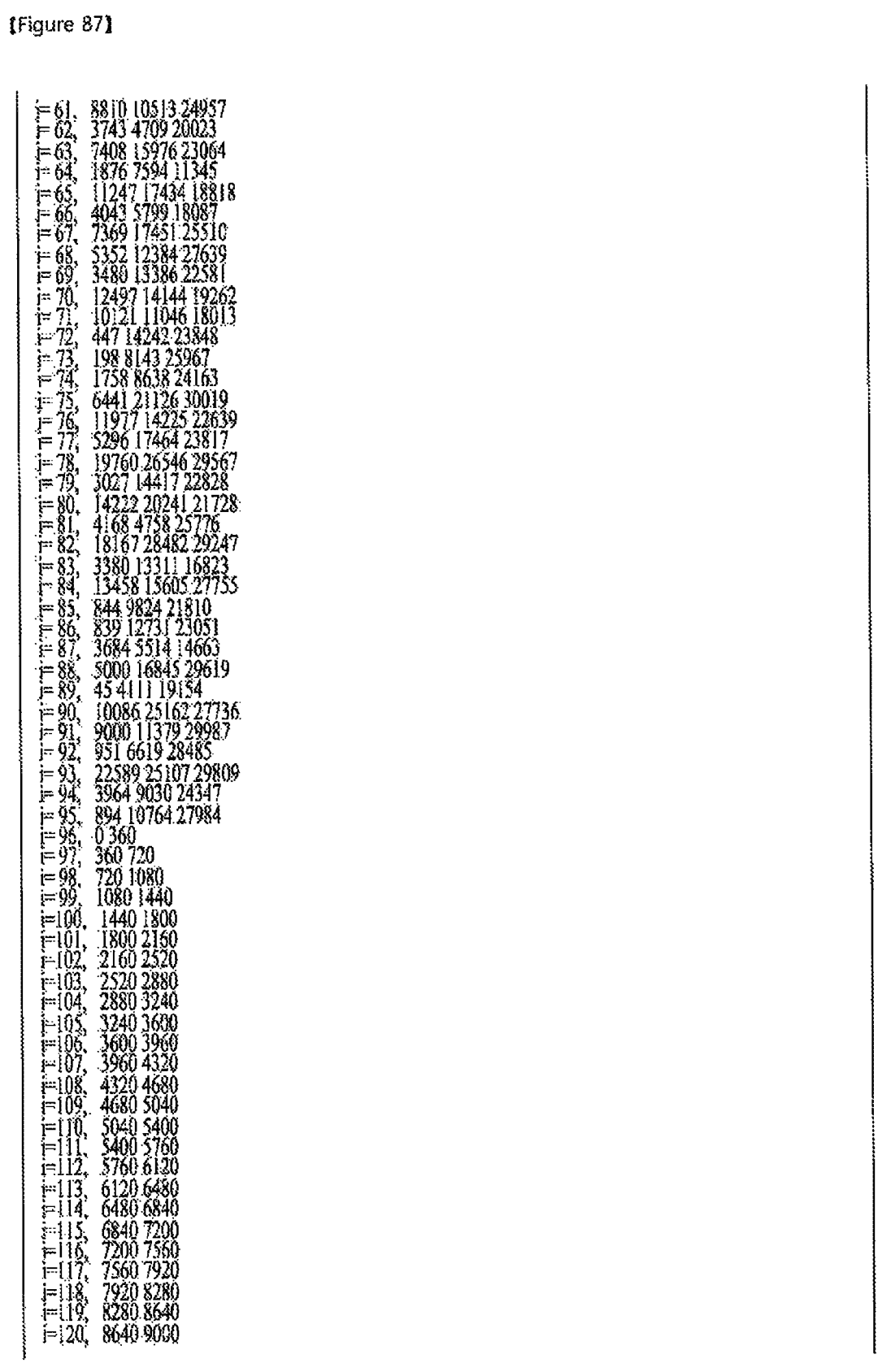

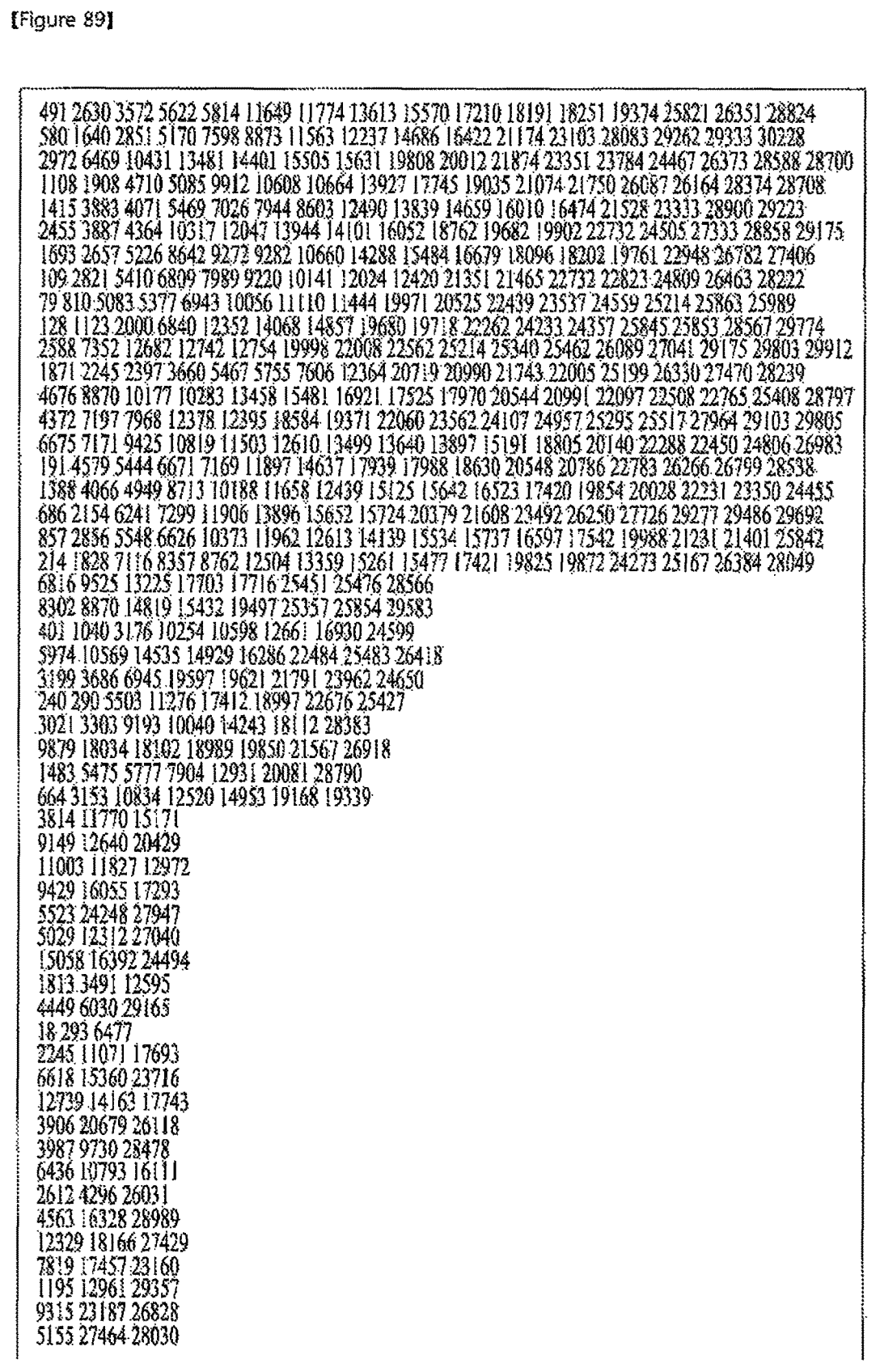

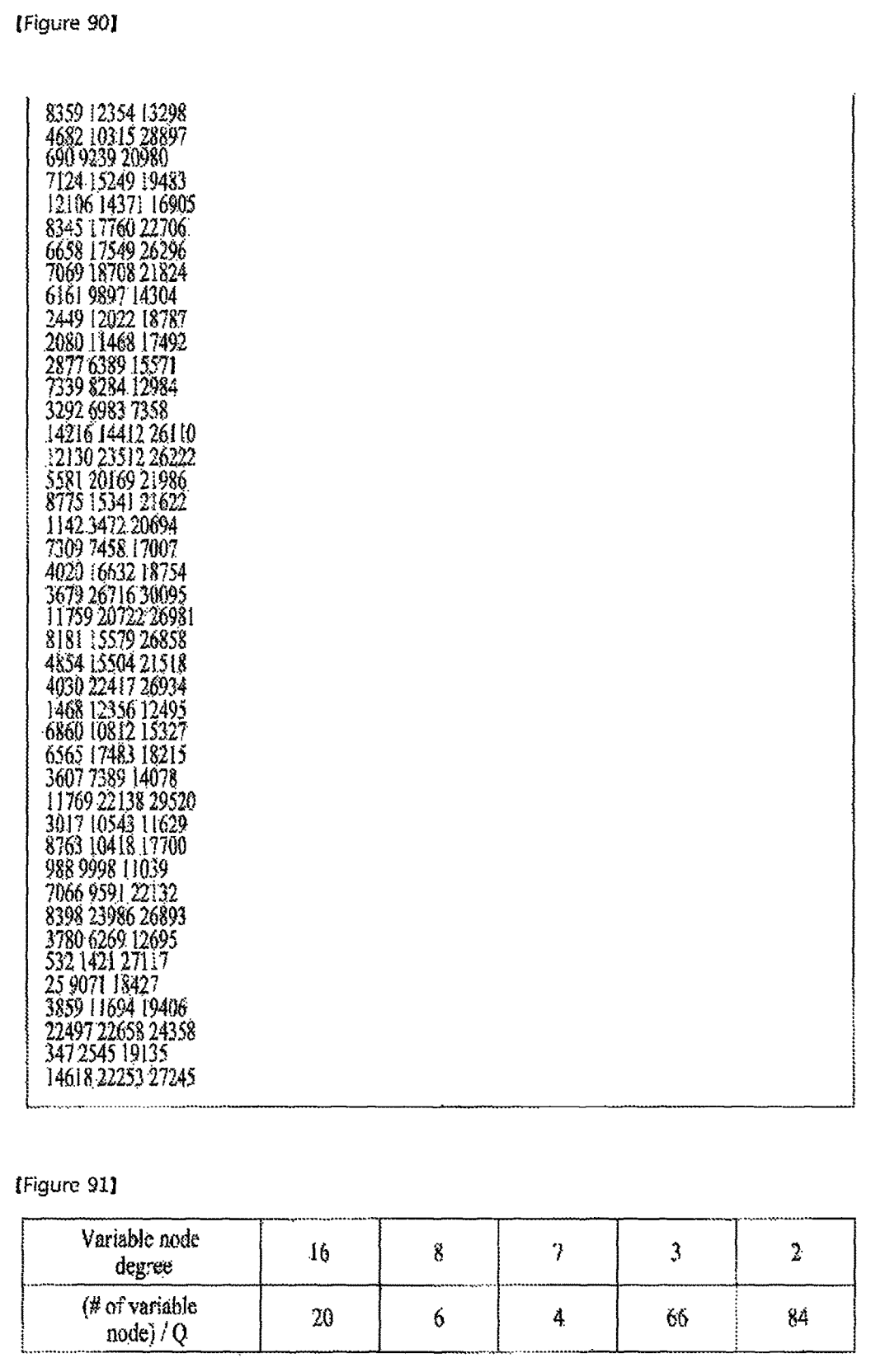

| Variable node degree | 16 | 8 | 7 | 3 | 2 |
|---|---|---|---|---|---|
| (# of variable node) / Q | 20 | 6 | 4 | 66 | 84 |

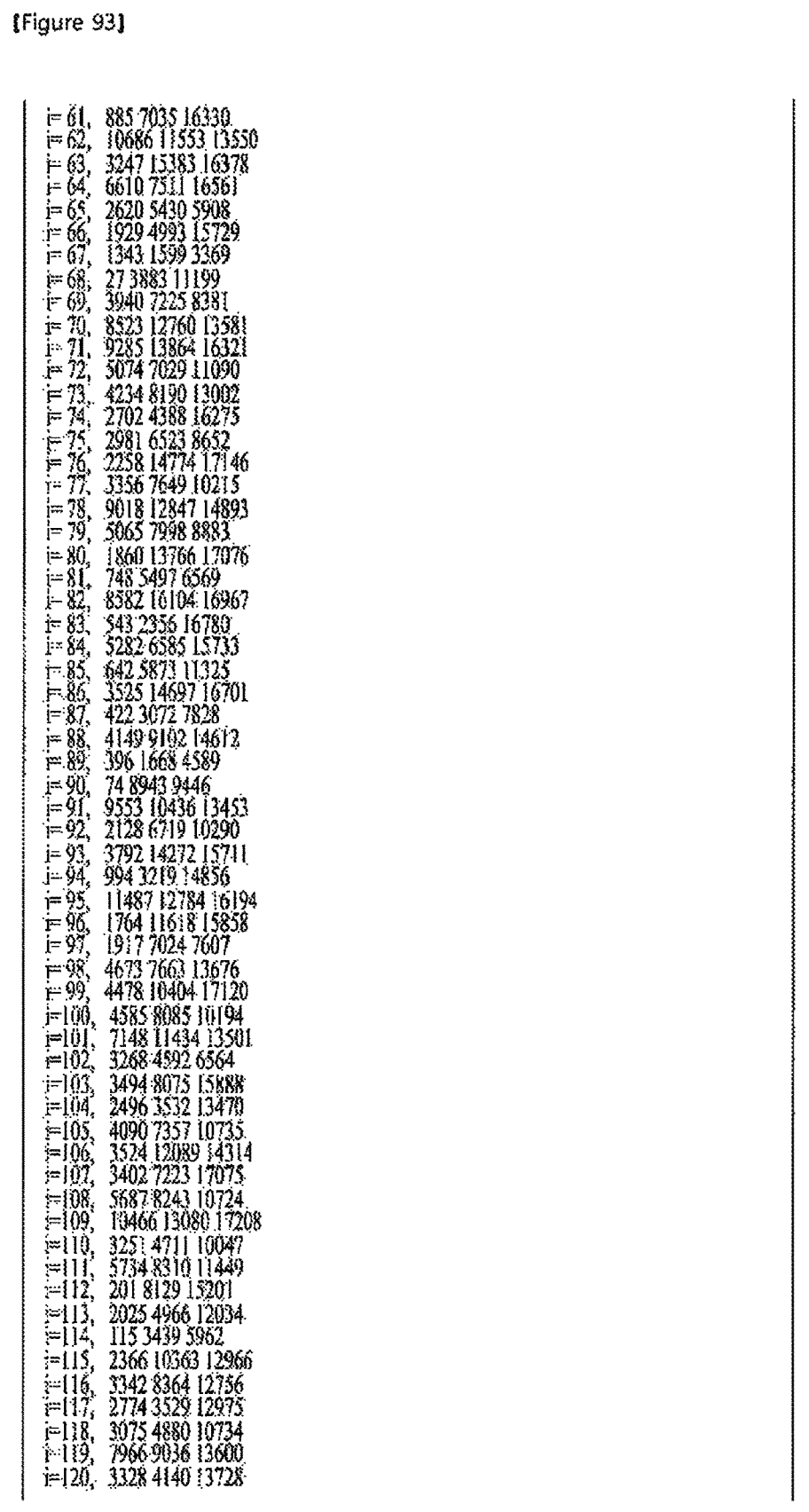

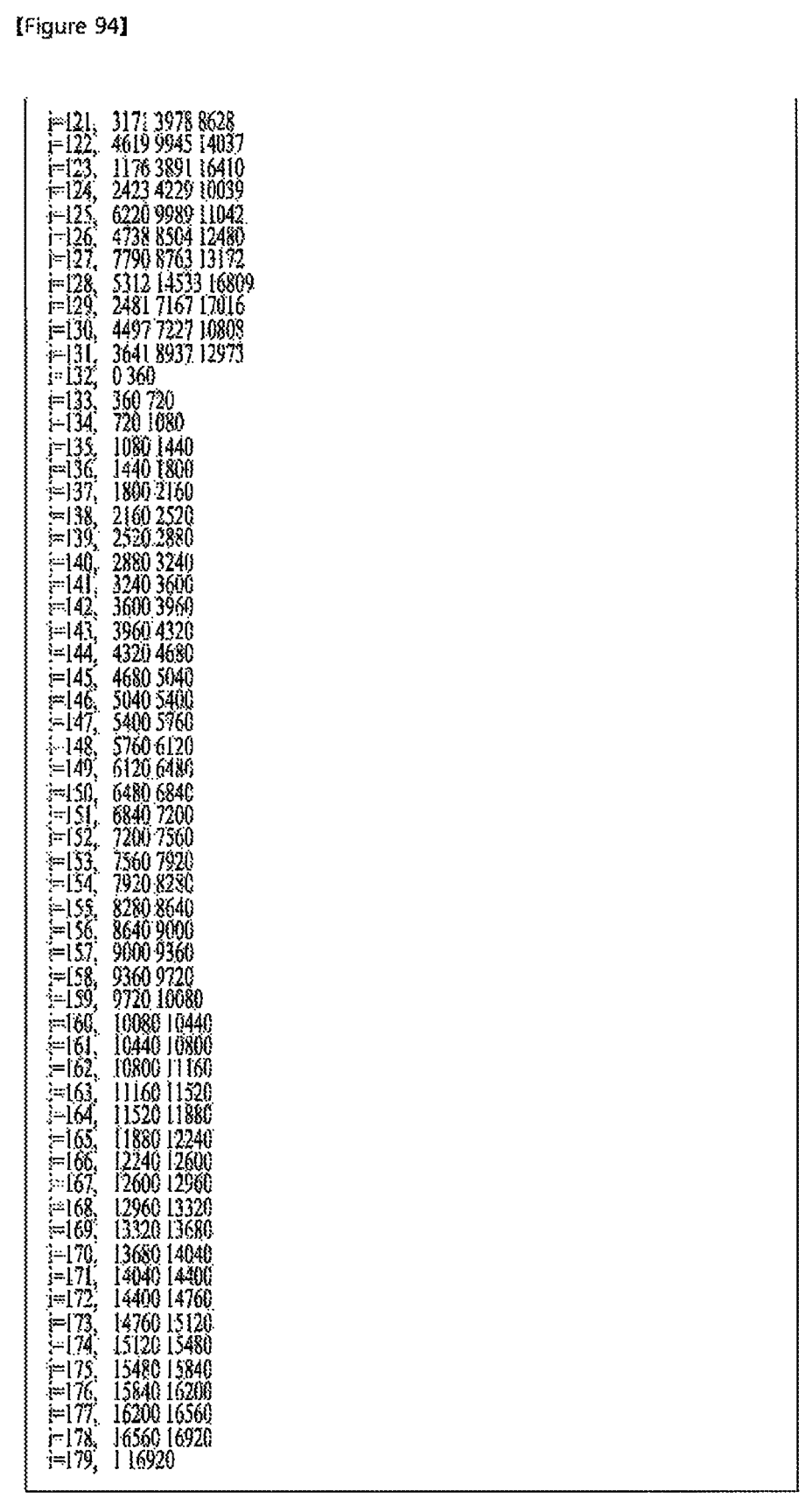

| Variable node degree | 14 | 12 | 3 | 2 |
|---|---|---|---|---|
| (# of variable node) / Q | 5 | 25 | 102 | 48 |

| | | | |
|---|---|---|---|
| 51. | 2355 | 13425 | 23634 |
| 52. | 17832 | 24463 | 31439 |
| 53. | 8125 | 36540 | 37125 |
| 54. | 14077 | 27384 | 28731 |
| 55. | 4640 | 34749 | 37912 |
| 56. | 1885 | 11516 | 28866 |
| 57. | 2488 | 18280 | 36738 |
| 58. | 14306 | 16985 | 42877 |
| 59. | 9676 | 28197 | 40250 |
| 60. | 0 | 360 | |
| 61. | 360 | 720 | |
| 62. | 720 | 1080 | |
| 63. | 1080 | 1440 | |
| 64. | 1440 | 1800 | |
| 65. | 1800 | 2160 | |
| 66. | 2160 | 2520 | |
| 67. | 2520 | 2880 | |
| 68. | 2880 | 3240 | |
| 69. | 3240 | 3600 | |
| 70. | 3600 | 3960 | |
| 71. | 3960 | 4320 | |
| 72. | 4320 | 4680 | |
| 73. | 4680 | 5040 | |
| 74. | 5040 | 5400 | |
| 75. | 5400 | 5760 | |
| 76. | 5760 | 6120 | |
| 77. | 6120 | 6480 | |
| 78. | 6480 | 6840 | |
| 79. | 6840 | 7200 | |
| 80. | 7200 | 7560 | |
| 81. | 7560 | 7920 | |
| 82. | 7920 | 8280 | |
| 83. | 8280 | 8640 | |
| 84. | 8640 | 9000 | |
| 85. | 9000 | 9360 | |
| 86. | 9360 | 9720 | |
| 87. | 9720 | 10080 | |
| 88. | 10080 | 10440 | |
| 89. | 10440 | 10800 | |
| 90. | 10800 | 11160 | |
| 91. | 11160 | 11520 | |
| 92. | 11520 | 11880 | |
| 93. | 11880 | 12240 | |
| 94. | 12240 | 12600 | |
| 95. | 12600 | 12960 | |
| 96. | 12960 | 13320 | |
| 97. | 13320 | 13680 | |
| 98. | 13680 | 14040 | |
| 99. | 14040 | 14400 | |
| 100. | 14400 | 14760 | |
| 101. | 14760 | 15120 | |
| 102. | 15120 | 15480 | |
| 103. | 15480 | 15840 | |
| 104. | 15840 | 16200 | |
| 105. | 16200 | 16560 | |
| 106. | 16560 | 16920 | |
| 107. | 16920 | 17280 | |
| 108. | 17280 | 17640 | |
| 109. | 17640 | 18000 | |
| 110. | 18000 | 18360 | |
| 111. | 18360 | 18720 | |
| 112. | 18720 | 19080 | |
| 113. | 19080 | 19440 | |
| 114. | 19440 | 19800 | |
| 115. | 19800 | 20160 | |

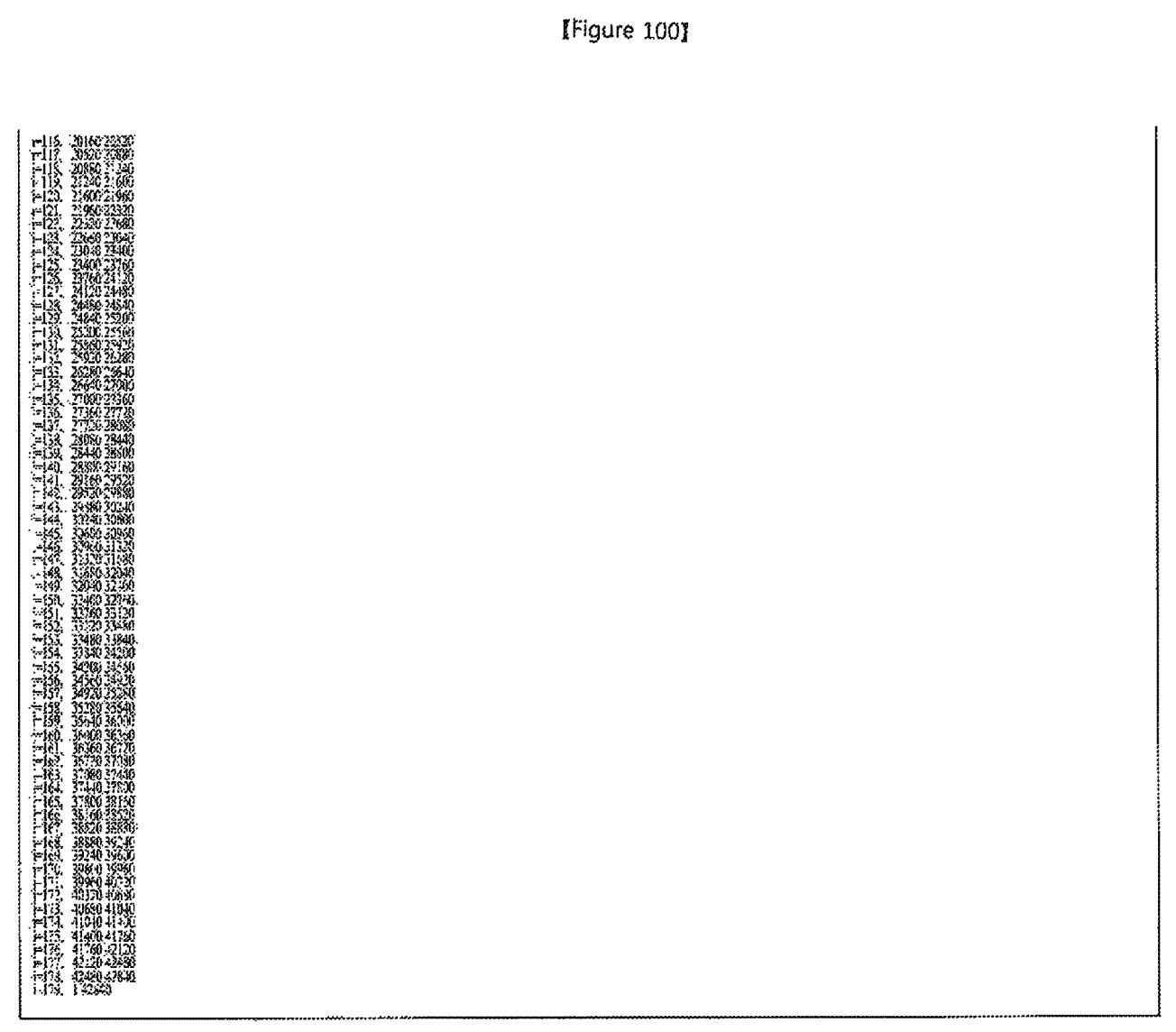

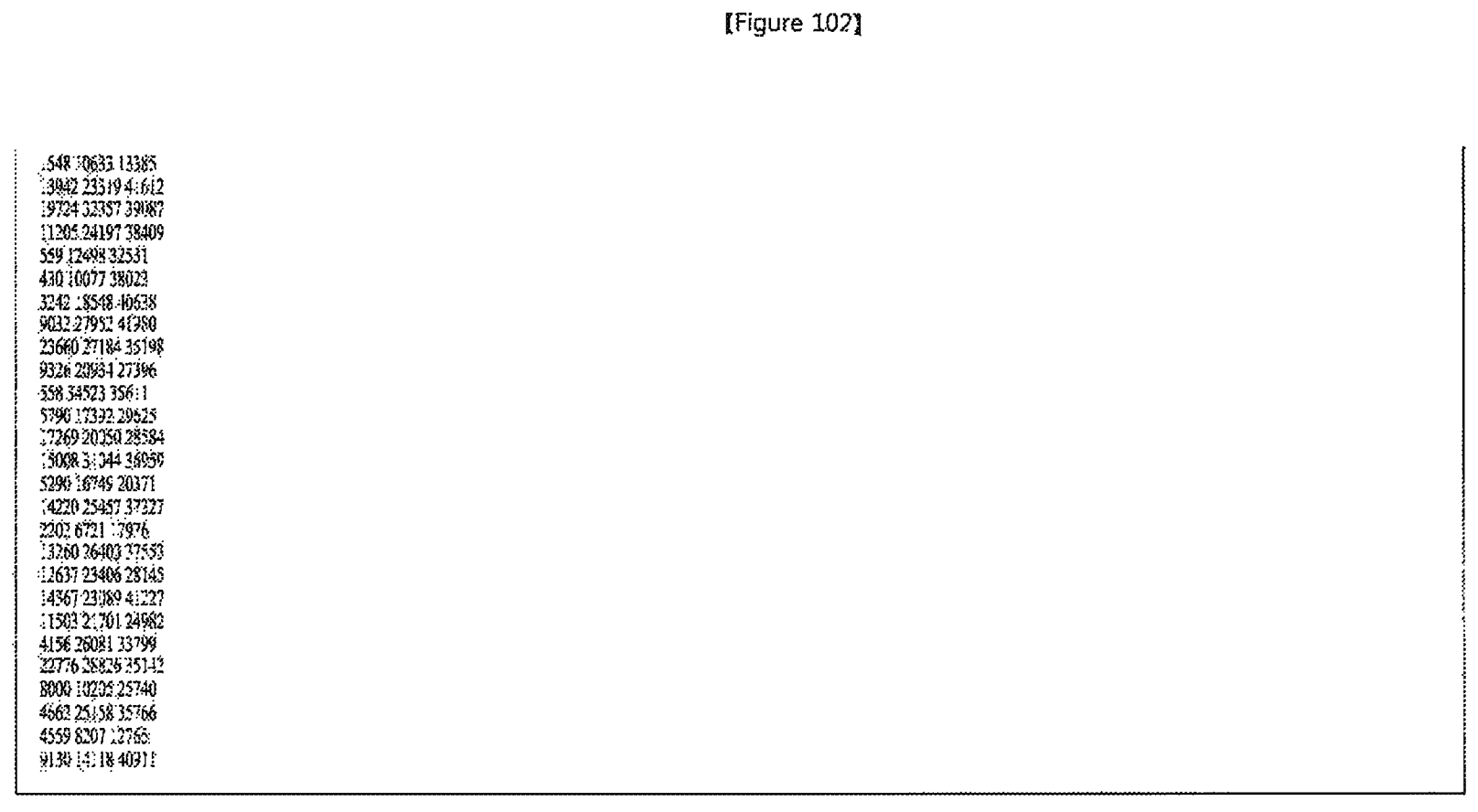

| | | | | | |
|---|---|---|---|---|---|
| Variable node degree | 34 | 11 | 10 | 3 | 2 |
| (# of variable node) / Q | 5 | 10 | 9 | 36 | 120 |

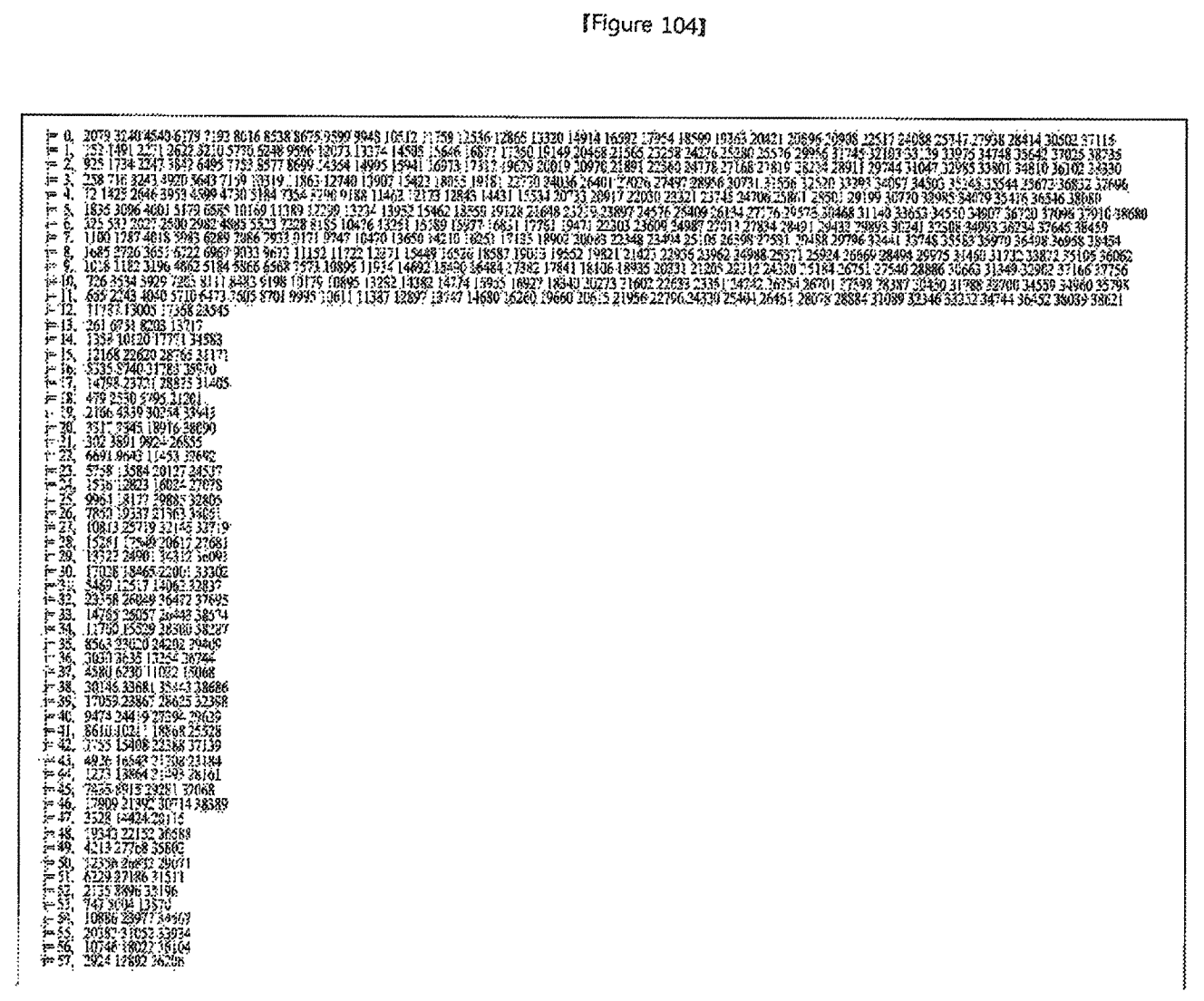

| | | |
|---|---|---|
| i= 58, | 15642 21827 30821 | |
| i= 59, | 15736 19562 30583 | |
| i= 60, | 8050 29694 33125 | |
| i= 61, | 26394 31873 37408 | |
| i= 62, | 5162 6090 22849 | |
| i= 63, | 9150 18654 27568 | |
| i= 64, | 689 6856 245.0 | |
| i= 65, | 10474 11995 34347 | |
| i= 66, | 16617 32904 38024 | |
| i= 67, | 2041 2802 14082 | |
| i= 68, | 1715 23805 37773 | |
| i= 69, | 4050 15145 25623 | |
| i= 70, | 946 25229 35493 | |
| i= 71, | 3191 11237 30456 | |
| i= 72, | 0 360 | |
| i= 73, | 360 720 | |
| i= 74, | 720 1080 | |
| i= 75, | 1080 1440 | |
| i= 76, | 1440 1800 | |
| i= 77, | 1800 2160 | |
| i= 78, | 2160 2520 | |
| i= 79, | 2520 2880 | |
| i= 80, | 2880 3240 | |
| i= 81, | 3240 3600 | |
| i= 82, | 3600 3960 | |
| i= 83, | 3960 4320 | |
| i= 84, | 4320 4680 | |
| i= 85, | 4680 5040 | |
| i= 86, | 5040 5400 | |
| i= 87, | 5400 5760 | |
| i= 88, | 5760 6120 | |
| i= 89, | 6120 6480 | |
| i= 90, | 6480 6840 | |
| i= 91, | 6840 7200 | |
| i= 92, | 7200 7560 | |
| i= 93, | 7560 7920 | |
| i= 94, | 7920 8280 | |
| i= 95, | 8280 8640 | |
| i= 96, | 8640 9000 | |
| i= 97, | 9000 9360 | |
| i= 98, | 9360 9720 | |
| i= 99, | 9720 10080 | |
| i= 100, | 10080 10440 | |
| i= 101, | 10440 10800 | |
| i= 102, | 10800 11160 | |
| i= 103, | 11160 11520 | |
| i= 104, | 11520 11880 | |
| i= 105, | 11880 12240 | |
| i= 106, | 12240 12600 | |
| i= 107, | 12600 12960 | |
| i= 108, | 12960 13320 | |
| i= 109, | 13320 13680 | |
| i= 110, | 13680 14040 | |
| i= 111, | 14040 14400 | |
| i= 112, | 14400 14760 | |
| i= 113, | 14760 15120 | |
| i= 114, | 15120 15480 | |
| i= 115, | 15480 15840 | |
| i= 116, | 15840 16200 | |
| i= 117, | 16200 16560 | |
| i= 118, | 16560 16920 | |
| i= 119, | 16920 17280 | |

```
i=120, 17280 17640
i=121, 17640 18000
i=122, 18000 18360
i=123, 18360 18720
i=124, 18720 19080
i=125, 19080 19440
i=126, 19440 19800
i=127, 19800 20160
i=128, 20160 20520
i=129, 20520 20880
i=130, 20880 21240
i=131, 21240 21600
i=132, 21600 21960
i=133, 21960 22320
i=134, 22320 22680
i=135, 22680 23040
i=136, 23040 23400
i=137, 23400 23760
i=138, 23760 24120
i=139, 24120 24480
i=140, 24480 24840
i=141, 24840 25200
i=142, 25200 25560
i=143, 25560 25920
i=144, 25920 26280
i=145, 26280 26640
i=146, 26640 27000
i=147, 27000 27360
i=148, 27360 27720
i=149, 27720 28080
i=150, 28080 28440
i=151, 28440 28800
i=152, 28800 29160
i=153, 29160 29520
i=154, 29520 29880
i=155, 29880 30240
i=156, 30240 30600
i=157, 30600 30960
i=158, 30960 31320
i=159, 31320 31680
i=160, 31680 32040
i=161, 32040 32400
i=162, 32400 32760
i=163, 32760 33120
i=164, 33120 33480
i=165, 33480 33840
i=166, 33840 34200
i=167, 34200 34560
i=168, 34560 34920
i=169, 34920 35280
i=170, 35280 35640
i=171, 35640 36000
i=172, 36000 36360
i=173, 36360 36720
i=174, 36720 37080
i=175, 37080 37440
i=176, 37440 37800
i=177, 37800 38160
i=178, 38160 38520
i=179, 1 38520
```

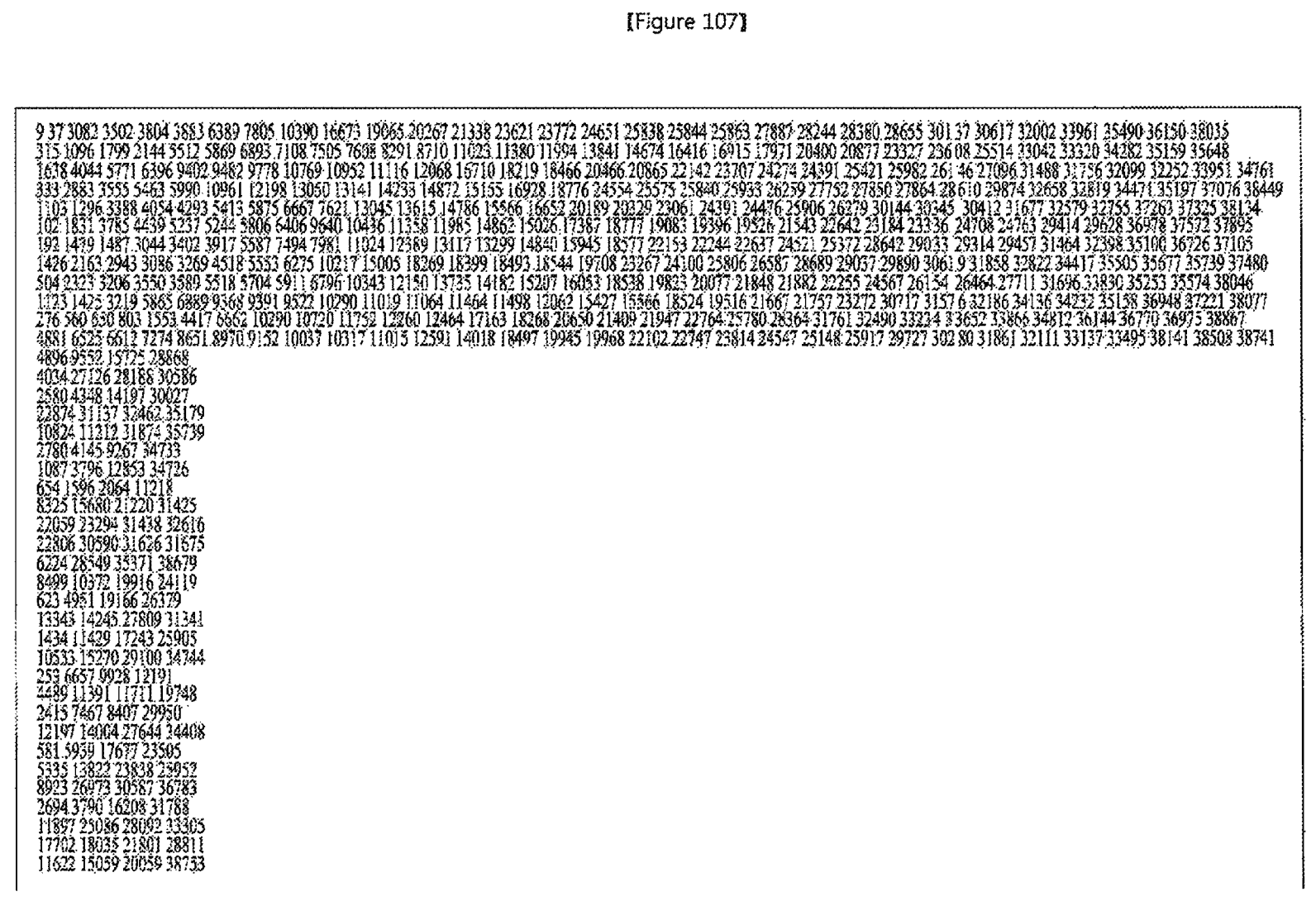

| Variable node degree | 30 | 4 | 3 | 2 |
|---|---|---|---|---|
| (# of variable node) / Q | 12 | 35 | 25 | 108 |

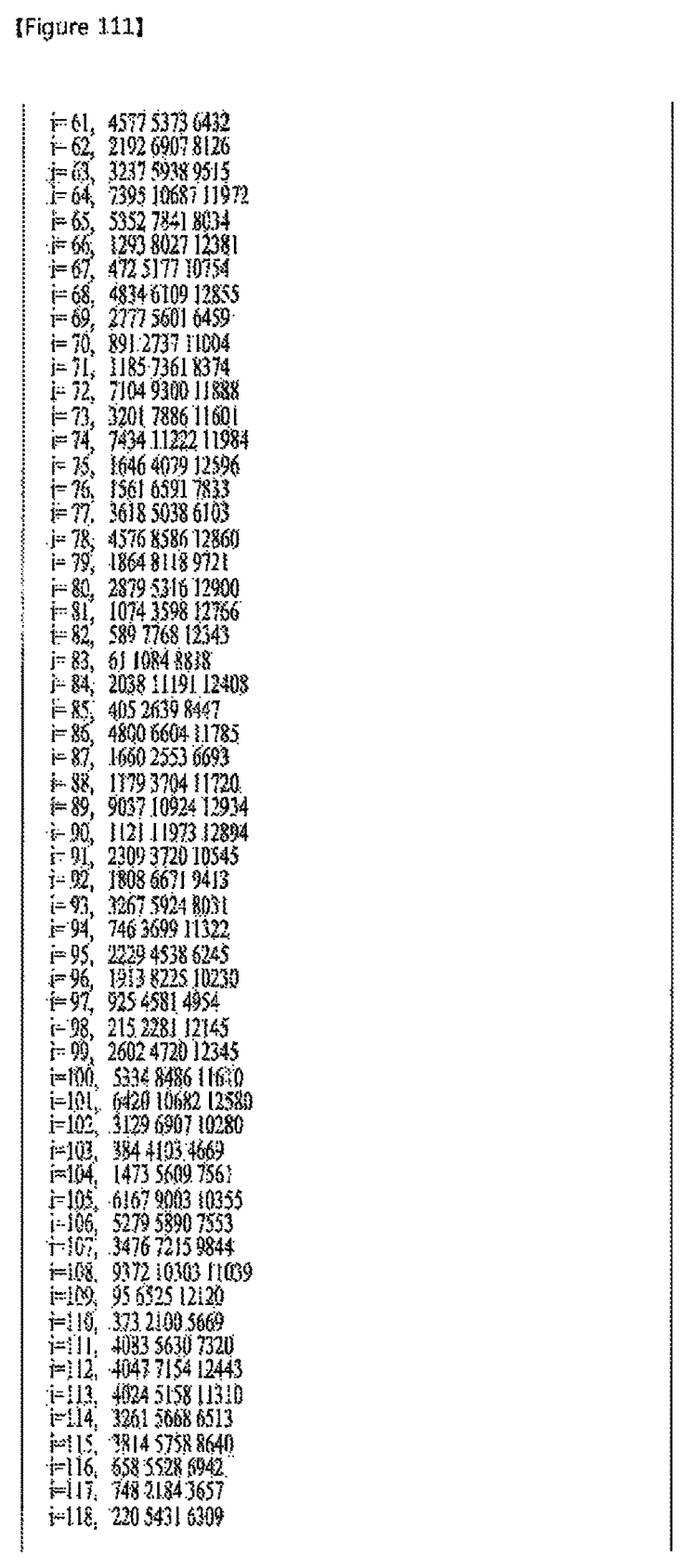

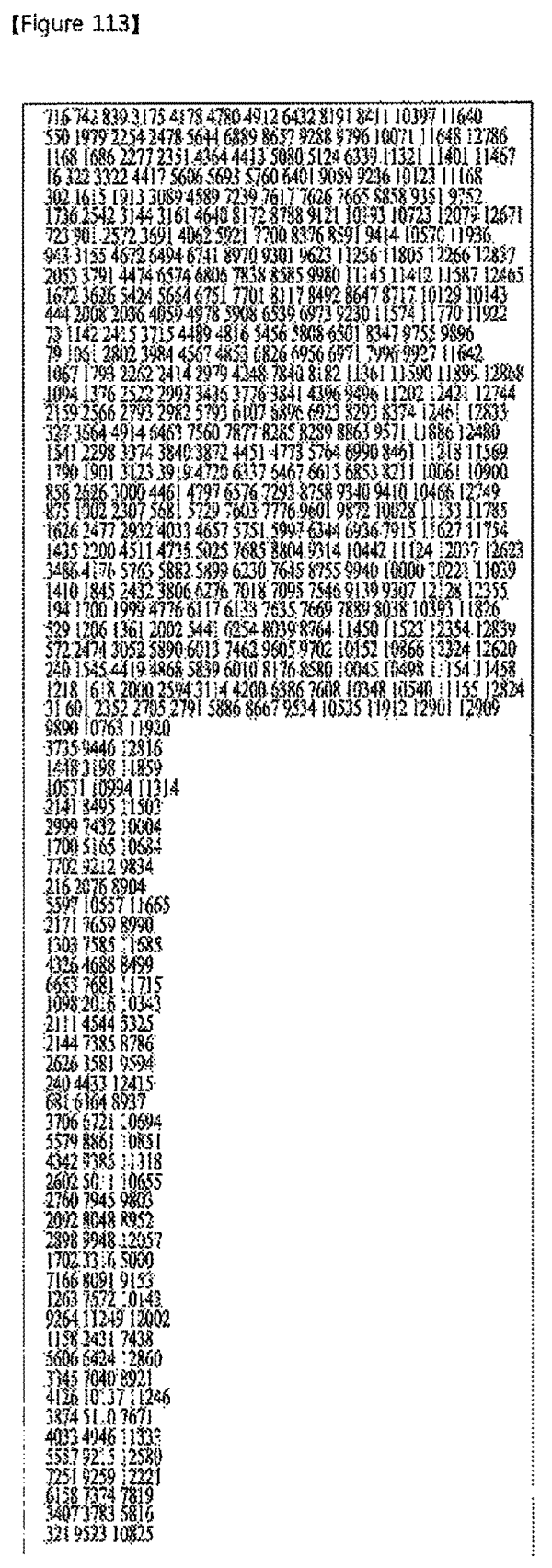

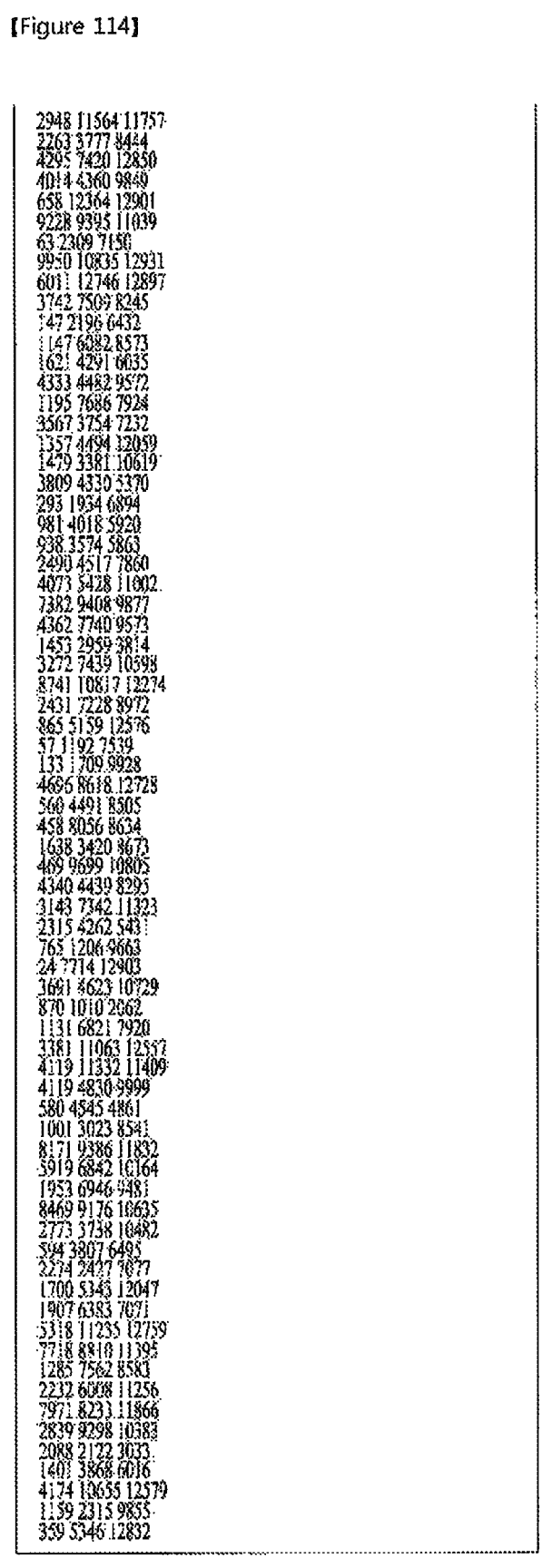

| Variable node degree | 12 | 3 | 2 |
|---|---|---|---|
| (# of variable node) / Q | 31 | 113 | 36 |

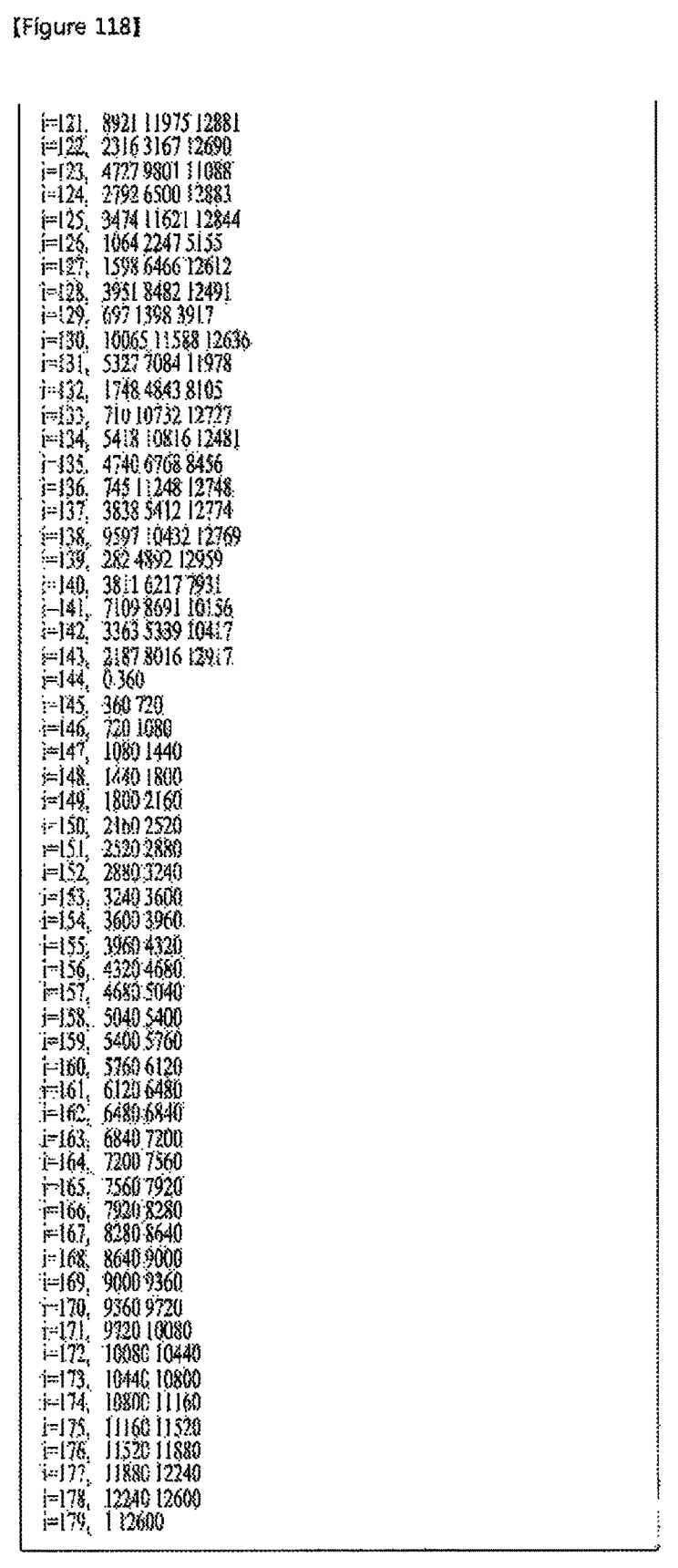

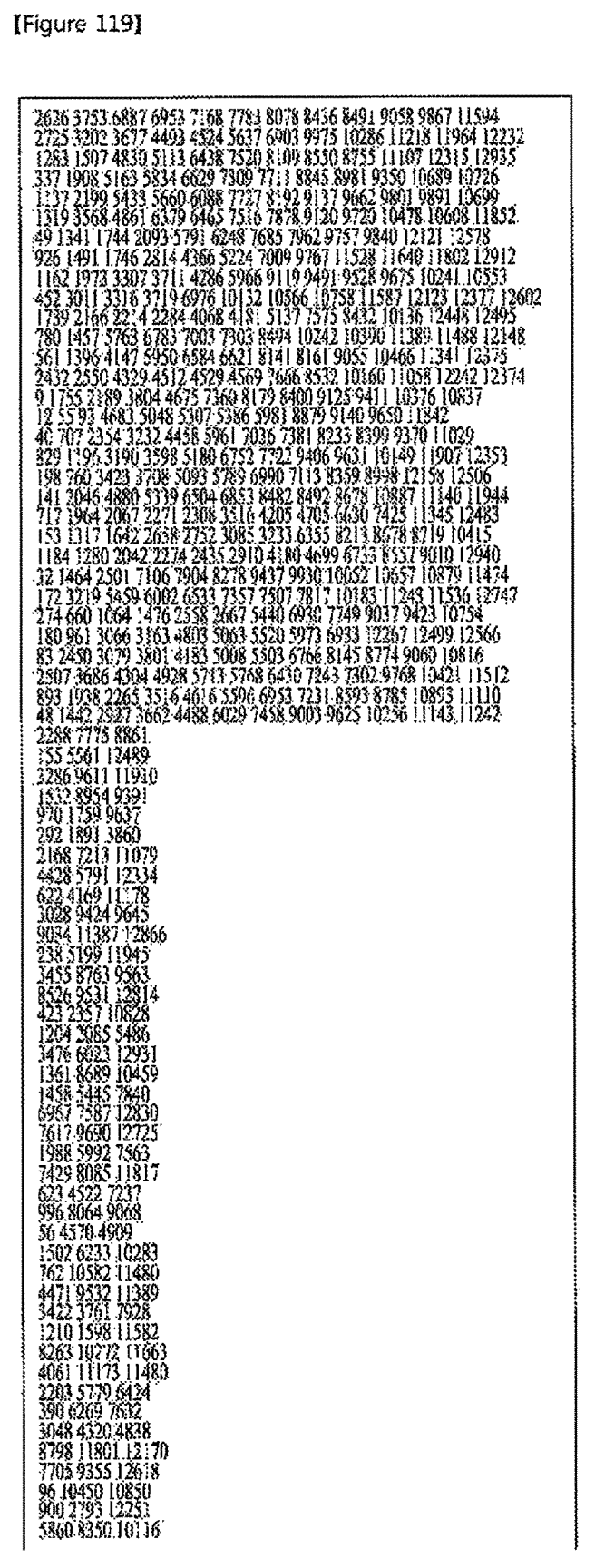

| Variable node degree | 12 | 3 | 2 |
|---|---|---|---|
| (# of variable node) / Q | 31 | 113 | 36 |

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application is a Continuation of application Ser. No. 14/908,991 filed Jan. 28, 2016, which is a U.S. National Phase Application under 35 U.S.C. § 371 of International Application PCT/KR2014/007120 filed on Aug. 1, 2014, which claims the benefit of U.S. Provisional Application Nos. 61/861,396 filed Aug. 1, 2013, 61/861,390 filed Aug. 1, 2013, 61/861,392 filed Aug. 1, 2013, 61/861,393 filed Aug. 1, 2013, 61/861,394 filed Aug. 1, 2013, 61/861,395 filed Aug. 1, 2013, 61/861,396 filed Aug. 1, 2013, 61/861,397 filed Aug. 1, 2013, 61/861,398 filed Aug. 1, 2013, 61/861,399 filed Aug. 1, 2013, 61/861,400 filed Aug. 1, 2013, 61/876,713 filed Sep. 11, 2013, 61/881,418 filed Sep. 23, 2013, 61/882,022 filed Sep. 25, 2013, 61/882,023 filed Sep. 25, 2013, 61/882,019 filed Sep. 25, 2013, 61/882,020 filed Sep. 25, 2013, 61/882,021 filed Sep. 25, 2013, 61/883,957 filed Sep. 27, 2013, all of which are hereby incorporated by reference in their entirety for all purposes as if fully set forth herein.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

DISCLOSURE

Technical Problem

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

To achieve the object and other advantages and in accordance with the purpose of the invention, as embodied and broadly described herein, the present invention provides a method of transmitting broadcast signals. The method of transmitting broadcast signals includes encoding Data Pipe, DP, data according to a code rate, wherein the encoding further includes Low-Density Parity-Check, LDPC, encoding the DP data using addresses of a parity check matrix and length of a LDPC codeword, wherein the addresses of the parity check matrix indicates addresses of parity bits to be calculated, wherein the addresses of the parity check matrix is defined according to the code rate, Bit interleaving the LDPC encoded DP data, mapping the bit interleaved DP data onto constellations, and Multi-Input Multi-Output, MIMO, encoding the mapped DP data; building at least one signal frame by mapping the encoded DP data; and modulating data in the built signal frame by an Orthogonal Frequency Division Multiplexing, OFDM, method and transmitting the broadcast signals having the modulated data.

Preferably, the code rate is 10/15, wherein the length of the LDPC codeword is 64800 bits.

Preferably, the parity check matrix includes an information part corresponding to information bits of the LDPC codeword and a parity part corresponding to the parity bits of the LDPC codeword, wherein the addresses of the parity check matrix is expressed as 316 1271 3692 9495 12147 12849 14928 16671 16938 17864 19108 20502 21097 21115
2341 2559 2643 2816 2865 5137 5331 7000 7523 8023 10439 10797 13208 15041
5556 6858 7677 10162 10207 11349 12321 12398 14787 15743 15859 15952 19313 20879
349 573 910 2702 3654 6214 9246 9353 10638 11772 14447 14953 16620 19888
204 1390 2887 3835 6230 6533 7443 7876 9299 10291 10896 13960 18287 20086
541 2429 2838 7144 8523 8637 10490 10585 11074 12074 15762 16812 17900 18548
733 1659 3838 5323 5805 7882 9429 10682 13697 16909 18846 19587 19592 20904
1134 2136 4631 4653 4718 5197 10410 11666 14996 15305 16048 17417 18960 20303
734 1001 1283 4959 10016 10176 10973 11578 12051 15550 15915 19022 19430 20121
745 4057 5855 9885 10594 10989 13156 13219 13351 13631 13685 14577 17713 20386
968 1446 2130 2502 3092 3787 5323 8104 8418 9998 11681 13972 17747 17929
3020 3857 5275 5786 6319 8608 11943 14062 17144 17752 18001 18453 19311 21414
709 747 1038 2181 5320 8292 10584 10859 13964 15009 15277 16953 20675 21509
1663 3247 5003 5760 7186 7360 10346 14211 14717 14792 15155 16128 17355 17970
516 578 1914 6147 9419 11148 11434 13289 13325 13332 19106 19257 20962 21556
5009 5632 6531 9430 9886 10621 11765 13969 16178 16413 18110 18249 20616 20759

457 2686 3318 4608 5620 5858 6480 7430 9602 12691 14664 18777 20152 20848
33 2877 5334 6851 7907 8654 10688 15401 16123 17942 17969 18747 18931 20224
87 897 7636 8663 11425 12288 12672 14199 16435 17615 17950 18953 19667 20281
1042 1832 2545 2719 2947 3672 3700 6249 6398 6833 11114 14283 17694 20477
326 488 2662 2880 3009 5357 6587 8882 11604 14374 18781 19051 19057 20508
854 1294 2436 2852 4903 6466 7761 9072 9564 10321 13638 15658 16946 19119
194 899 1711 2408 2786 5391 7108 8079 8716 11453 17303 19484 20989 21389
1631 3121 3994 5005 7810 8850 10315 10589 13407 17162 18624 18758 19311 20301
736 2424 4792 5600 6370 10061 16053 16775 18600
1254 8163 8876 9157 12141 14587 16545 17175 18191
388 6641 8974 10607 10716 14477 16825 17191 18400
5578 6082 6824 7360 7745 8655 11402 11665 12428
3603 8729 13463 14698 15210 19112 19550 20727 21052
48 1732 3805 5158 15442 16909 19854 21071 21579
11707 14014 21531
1542 4133 4925
10083 13505 21198
14300 15765 16752
778 1237 11215
1325 3199 14534
2007 14510 20599
1996 5881 16429
5111 15018 15980
4989 10681 12810
3763 10715 16515
2259 10080 15642
9032 11319 21305
3915 15213 20884
11150 15022 20201
1147 6749 19625
12139 12939 18870
3840 4634 10244
1018 10231 17720
2708 13056 13393
5781 11588 18888
1345 2036 5252
5908 8143 15141
1804 13693 18640
10433 13965 16950
9568 10122 15945
547 6722 14015
321 12844 14095
2632 10513 14936
6369 11995 20321
9920 19136 21529
1990 2726 10183
5763 12118 15467
503 10006 19564
9839 11942 19472
11205 13552 15389
8841 13797 19697
124 6053 18224
6477 14406 21146
1224 8027 16011
3046 4422 17717
739 12308 17760
4014 4130 7835
2266 5652 11981
2711 7970 18317

2196 15229 17217
8636 13302 16764
5612 15010 16657
615 1249 4639
3821 12073 18506
1066 16522 21536
11307 18363 19740
3240 8560 10391
3124 11424 20779
1604 8861 17394
2083 7400 8093
3218 7454 9155
9855 15998 20533
316 2850 20652
5583 9768 10333
7147 7713 18339
12607 17428 21418
14216 16954 18164
8477 15970 18488
1632 8032 9751
4573 9080 13507
11747 12441 13876
1183 15605 16675
4408 10264 17109
5495 7882 12150
1010 3763 5065
9828 18054 21599
6342 7353 15358
6362 9462 19999
7184 13693 17622
4343 4654 10995
7099 8466 18520
11505 14395 15138
6779 16691 18726
7146 12644 20196
5865 16728 19634
4657 8714 21246
4580 5279 18750
3767 6620 18905
9209 13093 17575
12486 15875 19791
8046 14636 17491
2120 4643 13206
6186 9675 12601
784 5770 21585 wherein each row represents a first information bit in each group of 360 information bits, wherein each value corresponding to the each row represents the addresses of the parity bits to be calculated.

Preferably, each of first to twenty-fourth rows has 14 addresses of the parity bits, each of twenty-fifth to thirtieth rows has 9 addresses of the parity bits, and each of thirty-first to one hundred and twentieth rows has 3 addresses of the parity bits.

Preferably, the MIMO encoding is performed by using a MIMO matrix having a specific MIMO parameter.

Preferably, the specific MIMO parameter is defined depending on QAM types.

In other aspect, the present invention provides a method of receiving broadcast signals. The method of receiving broadcast signals includes receiving broadcast signals having modulated data in signal frames and de-modulating the modulated data by an Orthogonal Frequency Division Multiplexing, OFDM, method; parsing at least one signal frame by de-mapping Data Pipe, DP, data; decoding the DP data according to a code rate, wherein the decoding further includes Multi-Input Multi-Output, MIMO, decoding the DP data, de-mapping the MIMO decoded DP data from constellations, Bit de-interleaving the de-mapped DP data, and Low-Density Parity-Check, LDPC, decoding the bit de-interleaved DP data using addresses of a parity check matrix and length of a LDPC codeword, wherein the addresses of the parity check matrix indicates addresses of parity bits to be calculated, wherein the addresses of the parity check matrix is defined according to the code rate.

Preferably, the code rate is 10/15, wherein the length of the LDPC codeword is 64800 bits.

Preferably, the parity check matrix includes an information part corresponding to information bits of the LDPC codeword and a parity part corresponding to the parity bits of the LDPC codeword, wherein the addresses of the parity check matrix is expressed as 316 1271 3692 9495 12147 12849 14928 16671 16938 17864 19108 20502 21097 21115
2341 2559 2643 2816 2865 5137 5331 7000 7523 8023 10439 10797 13208 15041
5556 6858 7677 10162 10207 11349 12321 12398 14787 15743 15859 15952 19313 20879
349 573 910 2702 3654 6214 9246 9353 10638 11772 14447 14953 16620 19888
204 1390 2887 3835 6230 6533 7443 7876 9299 10291 10896 13960 18287 20086
541 2429 2838 7144 8523 8637 10490 10585 11074 12074 15762 16812 17900 18548
733 1659 3838 5323 5805 7882 9429 10682 13697 16909 18846 19587 19592 20904
1134 2136 4631 4653 4718 5197 10410 11666 14996 15305 16048 17417 18960 20303
734 1001 1283 4959 10016 10176 10973 11578 12051 15550 15915 19022 19430 20121
745 4057 5855 9885 10594 10989 13156 13219 13351 13631 13685 14577 17713 20386
968 1446 2130 2502 3092 3787 5323 8104 8418 9998 11681 13972 17747 17929
3020 3857 5275 5786 6319 8608 11943 14062 17144 17752 18001 18453 19311 21414
709 747 1038 2181 5320 8292 10584 10859 13964 15009 15277 16953 20675 21509
1663 3247 5003 5760 7186 7360 10346 14211 14717 14792 15155 16128 17355 17970
516 578 1914 6147 9419 11148 11434 13289 13325 13332 19106 19257 20962 21556
5009 5632 6531 9430 9886 10621 11765 13969 16178 16413 18110 18249 20616 20759
457 2686 3318 4608 5620 5858 6480 7430 9602 12691 14664 18777 20152 20848
33 2877 5334 6851 7907 8654 10688 15401 16123 17942 17969 18747 18931 20224
87 897 7636 8663 11425 12288 12672 14199 16435 17615 17950 18953 19667 20281
1042 1832 2545 2719 2947 3672 3700 6249 6398 6833 11114 14283 17694 20477
326 488 2662 2880 3009 5357 6587 8882 11604 14374 18781 19051 19057 20508
854 1294 2436 2852 4903 6466 7761 9072 9564 10321 13638 15658 16946 19119
194 899 1711 2408 2786 5391 7108 8079 8716 11453 17303 19484 20989 21389
1631 3121 3994 5005 7810 8850 10315 10589 13407 17162 18624 18758 19311 20301
736 2424 4792 5600 6370 10061 16053 16775 18600
1254 8163 8876 9157 12141 14587 16545 17175 18191
388 6641 8974 10607 10716 14477 16825 17191 18400
5578 6082 6824 7360 7745 8655 11402 11665 12428

3603 8729 13463 14698 15210 19112 19550 20727 21052
48 1732 3805 5158 15442 16909 19854 21071 21579
11707 14014 21531
1542 4133 4925
10083 13505 21198
14300 15765 16752
778 1237 11215
1325 3199 14534
2007 14510 20599
1996 5881 16429
5111 15018 15980
4989 10681 12810
3763 10715 16515
2259 10080 15642
9032 11319 21305
3915 15213 20884
11150 15022 20201
1147 6749 19625
12139 12939 18870
3840 4634 10244
1018 10231 17720
2708 13056 13393
5781 11588 18888
1345 2036 5252
5908 8143 15141
1804 13693 18640
10433 13965 16950
9568 10122 15945
547 6722 14015
321 12844 14095
2632 10513 14936
6369 11995 20321
9920 19136 21529
1990 2726 10183
5763 12118 15467
503 10006 19564
9839 11942 19472
11205 13552 15389
8841 13797 19697
124 6053 18224
6477 14406 21146
1224 8027 16011
3046 4422 17717
739 12308 17760
4014 4130 7835
2266 5652 11981
2711 7970 18317
2196 15229 17217
8636 13302 16764
5612 15010 16657
615 1249 4639
3821 12073 18506
1066 16522 21536
11307 18363 19740
3240 8560 10391
3124 11424 20779
1604 8861 17394
2083 7400 8093
3218 7454 9155
9855 15998 20533
316 2850 20652
5583 9768 10333
7147 7713 18339
12607 17428 21418
14216 16954 18164
8477 15970 18488
1632 8032 9751

4573 9080 13507
11747 12441 13876
1183 15605 16675
4408 10264 17109
5495 7882 12150
1010 3763 5065
9828 18054 21599
6342 7353 15358
6362 9462 19999
7184 13693 17622
4343 4654 10995
7099 8466 18520
11505 14395 15138
6779 16691 18726
7146 12644 20196
5865 16728 19634
4657 8714 21246
4580 5279 18750
3767 6620 18905
9209 13093 17575
12486 15875 19791
8046 14636 17491
2120 4643 13206
6186 9675 12601
784 5770 21585 wherein each row represents a first information bit in each group of 360 information bits, wherein each value corresponding to the each row represents the addresses of the parity bits to be calculated.

Preferably, each of first to twenty-fourth rows has 14 addresses of the parity bits, each of twenty-fifth to thirtieth rows has 9 addresses of the parity bits, and each of thirty-first to one hundred and twentieth rows has 3 addresses of the parity bits.

Preferably, the MIMO decoding is performed by using a MIMO matrix having a specific MIMO parameter.

Preferably, the specific MIMO parameter is defined depending on QAM types.

In another aspect, the present invention provides an apparatus for transmitting broadcast signals. The apparatus for transmitting broadcast signals includes an encoding module configured to encode Data Pipe, DP, data according to a code rate, wherein the encoding module includes a Low-Density Parity-Check, LDPC, encoding module configured to LDPC encode the DP data using addresses of a parity check matrix and length of a LDPC codeword, wherein the addresses of the parity check matrix indicates addresses of parity bits to be calculated, wherein the addresses of the parity check matrix is defined according to the code rate, a Bit interleaving module configured to bit interleave the LDPC encoded DP data, a mapping module configured to map the bit interleaved DP data onto constellations, and a Multi-Input Multi-Output, MIMO, encoding module configured to MIMO encode the mapped DP data; a frame building module configured to build at least one signal frame by mapping the encoded DP data; a modulating module configured to modulate data in the built signal frame by an Orthogonal Frequency Division Multiplexing, OFDM, method; and a transmitting module configured to transmit the broadcast signals having the modulated data.

Preferably, the code rate is 10/15, wherein the length of the LDPC codeword is 64800 bits.

Preferably, the parity check matrix includes an information part corresponding to information bits of the LDPC codeword and a parity part corresponding to the parity bits of the LDPC codeword, wherein the addresses of the parity check matrix is expressed as 316 1271 3692 9495 12147 12849 14928 16671 16938
17864 19108 20502 21097 21115
2341 2559 2643 2816 2865 5137 5331 7000 7523 8023
10439 10797 13208 15041
5556 6858 7677 10162 10207 11349 12321 12398 14787
15743 15859 15952 19313 20879
349 573 910 2702 3654 6214 9246 9353 10638 11772 14447
14953 16620 19888
204 1390 2887 3835 6230 6533 7443 7876 9299 10291
10896 13960 18287 20086
541 2429 2838 7144 8523 8637 10490 10585 11074 12074
15762 16812 17900 18548
733 1659 3838 5323 5805 7882 9429 10682 13697 16909
18846 19587 19592 20904
1134 2136 4631 4653 4718 5197 10410 11666 14996 15305
16048 17417 18960 20303
734 1001 1283 4959 10016 10176 10973 11578 12051
15550 15915 19022 19430 20121
745 4057 5855 9885 10594 10989 13156 13219 13351
13631 13685 14577 17713 20386
968 1446 2130 2502 3092 3787 5323 8104 8418 9998 11681
13972 17747 17929
3020 3857 5275 5786 6319 8608 11943 24062 17144 17752
18001 18453 19311 21414
709 747 1038 2181 5320 8292 10584 10859 13964 15009
15277 16953 20675 21509
1663 3247 5003 5760 7186 7360 10346 14211 14717 14792
15155 16128 17355 17970
516 578 1914 6147 9419 11148 11434 13289 13325 13332
19106 19257 20962 21556
5009 5632 6531 9430 9886 10621 11765 13969 16178
16413 18110 18249 20616 20759
457 2686 3318 4608 5620 5858 6480 7430 9602 12691
14664 18777 20152 20848
33 2877 5334 6851 7907 8654 10688 15401 16123 17942
17969 18747 18931 20224
87 897 7636 8663 11425 12288 12672 14199 16435 17615
17950 18953 19667 20281
1042 1832 2545 2719 2947 3672 3700 6249 6398 6833
11114 14283 17694 20477
326 488 2662 2880 3009 5357 6587 8882 11604 14374
18781 19051 19057 20508
854 1294 2436 2852 4903 6466 7761 9072 9564 10321
13638 15658 16946 19119
194 899 1711 2408 2786 5391 7108 8079 8716 11453 17303
19484 20989 21389
1631 3121 3994 5005 7810 8850 10315 10589 13407 17162
18624 18758 19311 20301
736 2424 4792 5600 6370 10061 16053 16775 18600
1254 8163 8876 9157 12141 14587 16545 17175 18191
388 6641 8974 10607 10716 14477 16825 17191 18400
5578 6082 6824 7360 7745 8655 11402 11665 12428
3603 8729 13463 14698 15210 19112 19550 20727 21052
48 1732 3805 5158 15442 16909 19854 21071 21579
11707 14014 21531
1542 4133 4925
10083 13505 21198
14300 15765 16752
778 1237 11215
1325 3199 14534
2007 14510 20599
1996 5881 16429
5111 15018 15980
4989 10681 12810
3763 10715 16515
2259 10080 15642
9032 11319 21305

3915 15213 20884
11150 15022 20201
1147 6749 19625
12139 12939 18870
3840 4634 10244
1018 10231 17720
2708 13056 13393
5781 11588 18888
1345 2036 5252
5908 8143 15141
1804 13693 18640
10433 13965 16950
9568 10122 15945
547 6722 14015
321 12844 14095
2632 10513 14936
6369 11995 20321
9920 19136 21529
1990 2726 10183
5763 12118 15467
503 10006 19564
9839 11942 19472
11205 13552 15389
8841 13797 19697
124 6053 18224
6477 14406 21146
1224 8027 16011
3046 4422 17717
739 12308 17760
4014 4130 7835
2266 5652 11981
2711 7970 18317
2196 15229 17217
8636 13302 16764
5612 15010 16657
615 1249 4639
3821 12073 18506
1066 16522 21536
11307 18363 19740
3240 8560 10391
3124 11424 20779
1604 8861 17394
2083 7400 8093
3218 7454 9155
9855 15998 20533
316 2850 20652
5583 9768 10333
7147 7713 18339
12607 17428 21418
14216 16954 18164
8477 15970 18488
1632 8032 9751
4573 9080 13507
11747 12441 13876
1183 15605 16675
4408 10264 17109
5495 7882 12150
1010 3763 5065
9828 18054 21599
6342 7353 15358
6362 9462 19999
7184 13693 17622
4343 4654 10995
7099 8466 18520
11505 14395 15138
6779 16691 18726
7146 12644 20196
5865 16728 19634
4657 8714 21246
4580 5279 18750
3767 6620 18905
9209 13093 17575
12486 15875 19791
8046 14636 17491
2120 4643 13206
6186 9675 12601
784 5770 21585 wherein each row represents a first information bit in each group of 360 information bits, wherein each value corresponding to the each row represents the addresses of the parity bits to be calculated.

Preferably, each of first to twenty-fourth rows has 14 addresses of the parity bits, each of twenty-fifth to thirtieth rows has 9 addresses of the parity bits, and each of thirty-first to one hundred and twentieth rows has 3 addresses of the parity bits.

Preferably, the MIMO encoding module performs MIMO encoding using a MIMO matrix having a specific MIMO parameter.

Preferably, the specific MIMO parameter is defined depending on QAM types.

In another aspect, the present invention provides an apparatus for receiving broadcast signals. The apparatus for receiving broadcast signals includes a receiving module configured to receive broadcast signals having modulated data in signal frames; a de-modulating module configured to de-modulate the modulated data by an Orthogonal Frequency Division Multiplexing, OFDM, method; a parsing module configured to parse at least one signal frame by de-mapping Data Pipe, DP, data; a decoding module configured to decode the DP data according to a code rate, wherein the decoding module includes a Multi-Input Multi-Output, MIMO, decoding module configured to MIMO decode the DP data, a de-mapping module configured to de-map the MIMO decoded DP data from constellations, a Bit de-interleaving module configured to bit de-interleave the de-mapped DP data, and a Low-Density Parity-Check, LDPC, decoding module configured to LDPC decode the bit de-interleaved DP data using addresses of a parity check matrix and length of a LDPC codeword, wherein the addresses of the parity check matrix indicates addresses of parity bits to be calculated, wherein the addresses of the parity check matrix is defined according to the code rate.

Preferably, the code rate is 10/15, wherein the length of the LDPC codeword is 64800 bits.

Preferably, the parity check matrix includes an information part corresponding to information bits of the LDPC codeword and a parity part corresponding to the parity bits of the LDPC codeword, wherein the addresses of the parity check matrix is expressed as 316 1271 3692 9495 12147 12849 14928 16671 16938 17864 19108 20502 21097 21115
2341 2559 2643 2816 2865 5137 5331 7000 7523 8023 10439 10797 13208 15041
5556 6858 7677 10162 10207 11349 12321 12398 14787 15743 15859 15952 19313 20879
349 573 910 2702 3654 6214 9246 9353 10638 11772 14447 14953 16620 19888
204 1390 2887 3835 6230 6533 7443 7876 9299 10291 10896 13960 18287 20086
541 2429 2838 7144 8523 8637 10490 10585 11074 12074 15762 16812 17900 18548
733 1659 3838 5323 5805 7882 9429 10682 13697 16909 18846 19587 19592 20904

1134 2136 4631 4653 4718 5197 10410 11666 14996 15305 16048 17417 18960 20303
734 1001 1283 4959 10016 10176 10973 11578 12051 15550 15915 19022 19430 20121
745 4057 5855 9885 10594 10989 13156 13219 13351 13631 13685 14577 17713 20386
968 1446 2130 2502 3092 3787 5323 8104 8418 9998 11681 13972 17747 17929
3020 3857 5275 5786 6319 8608 11943 14062 17144 17752 18001 18453 19311 21414
709 747 1038 2181 5320 8292 10584 10859 13964 15009 15277 16953 20675 21509
1663 3247 5003 5760 7186 7360 10346 14211 14717 14792 15155 16128 17355 17970
516 578 1914 6147 9419 11148 11434 13289 13325 13332 19106 19257 20962 21556
5009 5632 6531 9430 9886 10621 11765 13969 16178 16413 18110 18249 20616 20759
457 2686 3318 4608 5620 5858 6480 7430 9602 12691 14664 18777 20152 20848
33 2877 5334 6851 7907 8654 10688 15401 16123 17942 17969 18747 18931 20224
87 897 7636 8663 11425 12288 12672 14199 16435 17615 17950 18953 19667 20281
1042 1832 2545 2719 2947 3672 3700 6249 6398 6833 11114 14283 17694 20477
326 488 2662 2880 3009 5357 6587 8882 11604 14374 18781 19051 19057 20508
854 1294 2436 2852 4903 6466 7761 9072 9564 10321 13638 15658 16946 19119
194 899 1711 2408 2786 5391 7108 8079 8716 11453 17303 19484 20989 21389
1631 3121 3994 5005 7810 8850 10315 10589 13407 17162 18624 18758 19311 20301
736 2424 4792 5600 6370 10061 16053 16775 18600
1254 8163 8876 9157 12141 14587 16545 17175 18191
388 6641 8974 10607 10716 14477 16825 17191 18400
5578 6082 6824 7360 7745 8655 11402 11665 12428
3603 8729 13463 14698 15210 19112 19550 20727 21052
48 1732 3805 5158 15442 16909 19854 21071 21579
11707 14014 21531
1542 4133 4925
10083 13505 21198
14300 15765 16752
778 1237 11215
1325 3199 14534
2007 14510 20599
1996 5881 16429
5111 15018 15980
4989 10681 12810
3763 10715 16515
2259 10080 15642
9032 11319 21305
3915 15213 20884
11150 15022 20201
1147 6749 19625
12139 12939 18870
3840 4634 10244
1018 10231 17720
2708 13056 13393
5781 11588 18888
1345 2036 5252
5908 8143 15141
1804 13693 18640
10433 13965 16950
9568 10122 15945
547 6722 14015
321 12844 14095
2632 10513 14936
6369 11995 20321
9920 19136 21529
1990 2726 10183
5763 12118 15467
503 10006 19564
9839 11942 19472
11205 13552 15389
8841 13797 19697
124 6053 18224
6477 14406 21146
1224 8027 16011
3046 4422 17717
739 12308 17760
4014 4130 7835
2266 5652 11981
2711 7970 18317
2196 15229 17217
8636 13302 16764
5612 15010 16657
615 1249 4639
3821 12073 18506
1066 16522 21536
11307 18363 19740
3240 8560 10391
3124 11424 20779
1604 8861 17394
2083 7400 8093
3218 7454 9155
9855 15998 20533
316 2850 20652
5583 9768 10333
7147 7713 18339
12607 17428 21418
14216 16954 18164
8477 15970 18488
1632 8032 9751
4573 9080 13507
11747 12441 13876
1183 15605 16675
4408 10264 17109
5495 7882 12150
1010 3763 5065
9828 18054 21599
6342 7353 15358
6362 9462 19999
7184 13693 17622
4343 4654 10995
7099 8466 18520
11505 14395 15138
6779 16691 18726
7146 12644 20196
5865 16728 19634
4657 8714 21246
4580 5279 18750
3767 6620 18905
9209 13093 17575
12486 15875 19791
8046 14636 17491
2120 4643 13206
6186 9675 12601
784 5770 21585 wherein each row represents a first information bit in each group of 360 information bits, wherein each value corresponding to the each row represents the addresses of the parity bits to be calculated.

Preferably, each of first to twenty-fourth rows has 14 addresses of the parity bits, each of twenty-fifth to thirtieth rows has 9 addresses of the parity bits, and each of thirty-first to one hundred and twentieth rows has 3 addresses of the parity bits.

Preferably, the MIMO decoding module performs MIMO decoding using a MIMO matrix having a specific MIMO parameter.

Preferably, the specific MIMO parameter is defined depending on QAM types.

Advantageous Effects

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 shows a parity check matrix of a QC-IRA (quasi-cyclic irregular repeat accumulate) LDPC code.

FIG. 27 shows a process of encoding the QC-IRA LDPC code according to an embodiment of the present invention.

FIG. 28 illustrates a parity check matrix permutation process according to an embodiment of the present invention.

FIGS. 29, 30 and 31 illustrate a table showing addresses of parity check matrix according to an embodiment of the present invention.

FIGS. 32 and 33 illustrate a table showing addresses of parity check matrix according to another embodiment of the present invention.

FIG. 34 illustrates a method for sequentially encoding the QC-IRA LDPC code according to an embodiment of the present invention.

FIG. 35 illustrates an LDPC decoder according to an embodiment of the present invention.

FIG. 36 illustrates a MIMO encoding block diagram according to an embodiment of the present invention.

FIG. 37 illustrates MIMO parameter table according to an embodiment of the present invention.

FIG. 38 illustrates MIMO parameter table according to other embodiment of the present invention.

FIG. 39 illustrates a method of transmitting broadcast signal according to an embodiment of the present invention.

FIG. 40 illustrates the basic operation of a twisted row-column block interleaver according to an embodiment of the present invention.

FIG. 41 illustrates an operation of a twisted row-column block interleaver according to another embodiment of the present invention.

FIG. 42 illustrates a diagonal-wise reading pattern of a twisted row-column block interleaver according to an embodiment of the present invention.

FIG. 43 illustrates interleaved XFECBLOCKs from each interleaving array according to an embodiment of the present invention.

FIGS. 44, 45 and 46 illustrates one of the embodiments of the H1 matrix according to a code rate of 10/15.

FIGS. 47 and 48 illustrates one of the embodiments of the H2 matrix according to a code rate of 10/15.

FIG. 49 illustrates one of the embodiments of the degree distribution table according to a code rate of 10/15.

FIGS. 50, 51 and 52 illustrates one of the embodiments of the H1 matrix according to a code rate of 7/15.

FIGS. 53 and 54 illustrates one of the embodiments of the H2 matrix according to a code rate of 7/15.

FIG. 55 illustrates one of the embodiments of the degree distribution table according to a code rate of 7/15.

FIGS. 56, 57 and 58 illustrates one of the embodiments of the H1 matrix according to a code rate of 8/15.

FIGS. 59 and 60 illustrates one of the embodiments of the H2 matrix according to a code rate of 8/15.

FIG. 61 illustrates one of the embodiments of the degree distribution table according to a code rate of 8/15.

FIGS. 62, 63 and 64 illustrates one of the embodiments of the H1 matrix according to a code rate of 9/15.

FIGS. 65 and 66 illustrates one of the embodiments of the H2 matrix according to a code rate of 9/15.

FIG. 67 illustrates one of the embodiments of the degree distribution table according to a code rate of 9/15.

FIGS. 68, 69 and 70 illustrates one of the embodiments of the H1 matrix according to a code rate of 11/15.

FIGS. 71 and 72 illustrates one of the embodiments of the H2 matrix according to a code rate of 11/15.

FIG. 73 illustrates one of the embodiments of the degree distribution table according to a code rate of 11/15.

FIGS. 74, 75 and 76 illustrates one of the embodiments of the H1 matrix according to a code rate of 13/15.

FIGS. 77 and 78 illustrates one of the embodiments of the H2 matrix according to a code rate of 13/15.

FIG. 79 illustrates one of the embodiments of the degree distribution table according to a code rate of 13/15.

FIGS. 80, 81 and 82 illustrates one of the embodiments of the H1 matrix according to a code rate of 7/15.

FIGS. 83 and 84 illustrates one of the embodiments of the H2 matrix according to a code rate of 7/15.

FIG. 85 illustrates one of the embodiments of the degree distribution table according to a code rate of 7/15.

FIGS. 86, 87 and 88 illustrates one of the embodiments of the H1 matrix according to a code rate of 8/15.

FIGS. 89 and 90 illustrates one of the embodiments of the H2 matrix according to a code rate of 8/15.

FIG. 91 illustrates one of the embodiments of the degree distribution table according to a code rate of 8/15.

FIGS. 92, 93 and 94 illustrates one of the embodiments of the H1 matrix according to a code rate of 11/15.

FIGS. 95 and 96 illustrates one of the embodiments of the H2 matrix according to a code rate of 11/15.

FIG. 97 illustrates one of the embodiments of the degree distribution table according to a code rate of 11/15.

FIGS. 98, 99 and 100 illustrates one of the embodiments of the H1 matrix according to a code rate of 5/15.

FIGS. 101 and 102 illustrates one of the embodiments of the H2 matrix according to a code rate of 5/15.

FIG. 103 illustrates one of the embodiments of the degree distribution table according to a code rate of 5/15.

FIGS. 104, 105 and 106 illustrates one of the embodiments of the H1 matrix according to a code rate of 6/15.

FIGS. 107 and 108 illustrates one of the embodiments of the H2 matrix according to a code rate of 6/15.

FIG. 109 illustrates one of the embodiments of the degree distribution table according to a code rate of 6/15.

FIGS. 110, 111 and 112 illustrates one of the embodiments of the H1 matrix according to a code rate of 12/15.

FIGS. 113 and 114 illustrates one of the embodiments of the H2 matrix according to a code rate of 12/15.

FIG. 115 illustrates one of the embodiments of the degree distribution table according to a code rate of 12/15.

FIGS. 116, 117 and 118 illustrates one of the embodiments of the H1 matrix according to a code rate of 12/15.

FIGS. 119 and 120 illustrates one of the embodiments of the H2 matrix according to a code rate of 12/15.

FIG. 121 illustrates one of the embodiments of the degree distribution table according to a code rate of 12/15.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of $K_{bch}$ bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period $T_S$ expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK set of $N_{cells}$ cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DR Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DR For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DR The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DR The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention. The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention. The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DR Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_l$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DR Details of operations of the time interleaver 5050 will be described later. A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output ($g_{1,i}$ and $g_{2,i}$) is transmitted by the same carrier k and OFDM symbol I of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DR Details of the EAC and FTC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Math Figure 1]}$$

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (= $N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal.

The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACFION |
|---|---|
| 000 | $1/5$ |
| 001 | $1/10$ |
| 010 | $1/20$ |
| 011 | $1/40$ |
| 100 | $1/80$ |
| 101 | $1/160$ |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The

TABLE 8

| | Current PHY_PROFILE = '000' (base) | Current PHY_PROFILE = '001' (handheld) | Current PHY_PROFILE = '010' (handheld) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA. This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group.

PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Futurecast UTB system is the terrestrial broadcast system whose input is one or more input streams (TS, IP GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(f+1)^{h}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE This 2-bit field indicates whether additional parity is provided for PLS2 in the current frame-group. This value is constant during the entire duration of the current frame-group. The below table 12 gives the values of this field. When this field is set to '00'; additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE This 3-bit field indicates the type of the DR This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DR The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DR The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DR The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates P the number of the frames to which each TI group is mapped, and there is one TI-block per TI group ($N_{TI}$=1). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I$=1). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX This 10-bit field indicates the maximum value of DP_NUM_BLOCKS for this DR The value of this field has the same range as DP_NUM_BLOCKS.

DP_PAYLOAD_TYPE: This 2-bit field indicates the type of the payload data carried by the given DR DP_PAYLOAD_ TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'. DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates the ISSY mode used by the associated DP when DP_PAYLOAD_TYPE is set to TS ('00'. The ISSY_MODE is signaled according to the below table 24 If DP_PAYLOAD_TYPE is not TS ('00', ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00' and HC_MODE_TS is set to '01' or'10'.

RESERVED: This 8-bit field is reserved for future use.

The following field appears only if FIC_FLAG is equal to '1':

FIC_VERSION: This 8-bit field indicates the version number of the FIC.

FTC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK This 10-bit field indicates the number of FEC blocks in the current TI group for the current DR The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0' the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention. As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $Na_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

(a) shows an example mapping of FTC cell without EAC and (b) shows an example mapping of FTC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DR Therefore, no additional description is required for a base DR The FIC data is generated and consumed in the Management Layer. The content of FIC data is as described in the Management Layer specification.

The FIC data is optional and the use of FIC is signaled by the FIC_FLAG parameter in the static part of the PLS2. If FTC is used, FIC_FLAG is set to '1' and the signaling field for FIC is defined in the static part of PLS2. Signaled in this field are FIC_VERSION, and FIC_LENGTH_BYTE. FTC uses the same modulation, coding and time interleaving parameters as PLS2. FIC shares the same signaling parameters such as PLS2_MOD and PLS2_FEC. FTC data, if any, is mapped immediately after PLS2 or EAC if any. FTC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM

Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2}\leq D_{DP} \qquad \text{[Math Figure 2]}$$

where $D_{DP1}$ is the number of OFDM cells occupied by Type 1 DPs, $D_{DP2}$ is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs $(0, \ldots, D_{DP1}-1)$ is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs $(0, \ldots, D_{DP2}-1)$ is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |

TABLE 29-continued

| LDPC rate | $N_{ldpc}$ | $K_{ldpc}$ | $K_{bch}$ | BCH error correction capability | $N_{bch} - K_{bch}$ |
|---|---|---|---|---|---|
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Math Figure 3]}$$

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits, $$p_0=p_1=p_2=\ldots=p_{N_{ldpc}-K_{ldpc}-1}=0 \quad \text{[Math Figure 4]}$$

2) Accumulate the first information bit—$i_0$, at parity bit addresses specified in the first row of an addresses of parity check matrix. The details of addresses of parity check matrix will be described later. For example, for rate 13/15:

$$p_{983}=p_{983}\oplus i_0\ p_{2815}=p_{2815}\oplus i_0$$

$$p_{4237}=p_{4837}\oplus i_0\ p_{4989}=p_{4989}\oplus i_0$$

$$p_{6138}=p_{6138}\oplus i_0\ p_{6458}=p_{6458}\oplus i_0$$

$$p_{6921}=p_{6921}\oplus i_0\ p_{6974}=p_{6974}\oplus i_0$$

$$p_{7572}=p_{7572}\oplus i_0\ p_{8260}=p_{8260}\oplus i_0$$

$$p_{8496}=p_{8496}\oplus i_0 \quad \text{[Math Figure 5]}$$

3) For the next 359 information bits, $i_s$, s=1, 2, . . . , 359 accumulate is at parity bit addresses using following Math figure.

$$\{x+(s \bmod 360)\times Q_{ldpc}\} \bmod (N_{ldpc}-K_{ldpc}) \quad \text{[Math Figure 6]}$$

where x denotes the address of the parity bit accumulator corresponding to the first bit $i_0$, and $Q_{ldpc}$ is a code rate dependent constant specified in the addresses of parity check matrix. Continuing with the example, $Q_{ldpc}$=24 for rate 13/15, so for information bit $i_1$, the following operations are performed:

$$p_{1007}=p_{1007}\oplus i_1\ p_{2839}=p_{2839}\oplus i_1$$

$$p_{4861}=p_{4861}\oplus i_1\ p_{5013}=p_{5013}\oplus i_1$$

$$p_{6162}=p_{6162}\oplus i_1\ p_{6482}=p_{6482}\oplus i_1$$

$$p_{6943}=p_{6943}\oplus i_1\ p_{6998}=p_{6998}\oplus i_1$$

$$p_{7596}=p_{7596}\oplus i_1\ p_{8284}=p_{8284}\oplus i_1$$

$$p_{8520}=p_{8520}\oplus i_1 \quad \text{[Math Figure 7]}$$

4) For the $361^{st}$ information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the Math Figure 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i=p_i \oplus p_{i-1}, i=1,2, \ldots, N_{ldpc}-K_{ldpc}-1 \quad \text{[Math Figure 8]}$$

where final content of $p_i$ i=0, 1, . . . $N_{ldpc}-K_{ldpc}-1$ is equal to the parity bit p

TABLE 30

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity Interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cell}=64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 5 |
| NUQ-256 | 8 | 4 |
| NUC-256 | 3 | 3 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word ($c_{0,l}$, $c_{1,l}$, . . . , $c_{\eta mod-1,l}$) of the bit interleaving output is demultiplexed into ($d_{1,0,m}$, $d_{1,1,m}$ . . . , $d_{1,\eta mod-1,m}$) and ($d_{2,0,m}$, $d_{2,1,m}$ . . . , $d_{2,\eta mod-1,m}$) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word ($c_{0,l}$, $c_{1,l}$, . . . , $c_{9,l}$) of the Bit Interleaver output is demultiplexed into ($d_{1,0,m}$, $d_{1,1,m}$ . . . , $d_{1,3,m}$) and ($d_{2,0,m}$, $d_{2,1,m}$ . . . , $d_{2,5,m}$), as shown in (b).

FIG. 25 illustrates a time interleaving according to an embodiment of the present invention.

(a) to (c) show examples of TI mode.

The time interleaver operates at the DP level. The parameters of time Interleaving (TI) may be set differently for each DR The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames P spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DR When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOOC\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option 1 | Each TI group contains one TI block and is mapped directly to one frame as shown in (a). This option is signaled in PLS2-STAT by DP_TI_TYPE = '0' and DP_TI_LENGTH = '1'($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory, so as to provide a maximum bit-rate for a DP. This option is signaled in PLS2-STAT signaling by DP_TI_TYPE = '0' and DP_TI_LENGTH = $N_{TI}$, while $P_I$ = 1. |

FIG. 26 shows a parity check matrix of a QC-IRA (quasi-cyclic irregular repeat accumulate) LDPC code.

The above-described LDPC encoder may encode a parity of an LDPC encoding block using the parity check matrix.

The parity check matrix according to the present invention is a parity check matrix of the QC-IRA LDPC code and may have the form of a quasi-cyclic matrix called an H matrix and be represented as $H_{qc}$.

(a) shows a parity check matrix according to an embodiment of the present invention. As shown in (a), the parity check matrix is a matrix having a horizontal size of Q×(K+M) and a vertical size of Q×M and may include an information part and a parity part. The information part may include a matrix having a horizontal size of Q×K and a vertical size of Q×M and the parity part may include a matrix having a horizontal size of Q×M and a vertical size of Q×M. In this case, an LDPC code rate corresponds to K/(K+M).

The parity check matrix according to an embodiment of the present invention may include randomly distributed 1s and 0s and 1 may be referred to as an "edge". The position of 1 in the parity check matrix, that is, the position of each edge may be represented in the form of a circulant shifted identity matrix per submatrix having a horizontal size of Q and a vertical size of Q. That is, a submatrix can be represented as a Q×Q circulant-shifted identity matrix including only 1 and 0. Specifically, the submatrix according to an embodiment of the present invention is represented as identity matrices $I_x$ including $I_0$, $I_1$, $I_2$, $I_1$ . . . , which have different positions of 1s according to the number of circulant shifts. The number of submatrices according to an embodiment of the present invention may be (K+M)×M.

(b) shows the circulant-shifted identity matrices $I_x$ which represent submatrices according to an embodiment of the present invention.

The subscript x of $I_x$ indicates the number of left-circulant shifts of columns of a circulant-shifted identity matrix. That is, $I_1$ represents an identify matrix in which columns are circulant-shifted to the left once and $I_2$ represents an identity matrix in which columns are circulant-shifted to the left twice. $I_Q$ which is an identity matrix circulant-shifted Q times corresponding to the total number of columns, Q may be the same matrix as $I_0$ due to circulant characteristic thereof.

$I_{0+2}$ represents a submatrix corresponding to a combination of two circulant-shifted identity matrices. In this case, the submatrix corresponds to a combination of the identity matrix $I_0$ and an identity matrix circulant-shifted twice.

$I_1$ represents a circulant-shifted identity matrix in which the edge of the last column of the corresponding submatrix, that is, 1 has been removed while corresponding to the submatrix $I_1$.

The parity part of the parity check matrix of the QC-IRA LDPC code may include only submatrices $I_0$ and $I_1$ and the position of submatrices $I_0$ may be fixed. As shown in (a), submatrices $I_0$ may be distributed in a diagonal direction in the parity part.

An edge in the parity check matrix represents that the corresponding row (checksum node) and the corresponding column (variable node) are physically connected. In this case, the number of is included in each column (variable node) may be referred to as a degree and columns may have the same degree or different degrees. Accordingly, the number, positions and value x of identity matrices $I_x$ that represent edges grouped per submatrix are important factors in determining QC-IRA LDPC encoding performance and unique values may be determined per code rate.

(c) shows a base matrix of the parity check matrix according to an embodiment of the present invention. The base matrix represents only the number and positions of identity matrices $I_x$ as specific numbers, ignoring the value x of $I_x$. As shown in (c), a base matrix may have a horizontal size of K+M and a vertical size of M and be represented as $H_{base}$. When $I_x$ is not a matrix corresponding to a combination of submatrices, the position of the corresponding submatrix may be represented as 1. When a submatrix is represented as $I_{0+2}$, this submatrix is a matrix corresponding to a combination of two circulant-shifted identity matrices and thus the submatrix needs to be discriminated from a submatrix represented as one circulant-shifted identity matrix. In this case, the position of the submatrix may be represented as 2 which is the number of the combined circulant-shifted identity matrices. In the same manner, the position of a submatrix corresponding to a combination of N circulant-shifted identity matrices can be represented as N.

FIG. 27 shows a process of encoding the QC-IRA LDPC code according to an embodiment of the present invention.

The QC-IRA LDPC code may be encoded per submatrix, distinguished from conventional sequential encoding, to reduce processing complexity.

(a) shows arrangement of a QC-IRA parity check matrix in a QC form. The QC-IRA parity check matrix may be divided into 6 regions A, B, C, D, E and T when arranged in the QC form. When a Q×K information vector s, a parity vector p1 having a length of Q and a parity vector p2 having a length of Q×(M−1) are used, a codeword x can be represented as x={s, p1, p2}.

When the efficient encoding equation of Richardson is used, the codeword x can be obtained by directly acquiring p1 and p2 from the parity check matrix arranged in the QC form. The efficient encoding equation of Richardson is as follows.

$$\phi=-ET^{-1}B+D$$

$$p_1^T=-\phi^{-1}(-ET^{-1}A+C)s^T$$

$$p2^T=-T^{-1}(As^T+Bp_1^T) \quad \text{[Math Figure 9]}$$

(b) shows matrices $\varphi$ and $\varphi_1$ derived according to the efficient encoding equation.

As shown in (b), $\varphi^{-1}$ can be represented as a left low triangular (sub) matrix. The parity vector p2 can be obtained by calculating s and p1 according to the above-described equation. When the QC-IRA parity check matrix is encoded according to the efficient encoding equation of Richardson, at least Q parity nodes can be simultaneously processed in parallel according to characteristics of a Q×Q submatrix.

FIGS. 28 to 31 illustrate a process of sequentially encoding the QC-IRA LDPC code according to an embodiment of the present invention. This sequentially encoding may correspond to the above mentioned LDPC encoding.

FIG. 28 illustrates a parity check matrix permutation process according to an embodiment of the present invention.

(a) shows a QC-IRA LDPC parity check matrix $H_1$ arranged in QC form. As shown in (a), a parity part of the matrix $H_1$ may include submatrices distributed in a stepped form, which corresponds to the above-described QC-IRA LDPC parity check matrix. To easily perform sequential encoding, rows and columns of the matrix $H_1$ are moved such that the matrix $H_1$ is modified into a matrix $H_2$ according to an embodiment of the present invention.

(b) shows the modified matrix $H_2$. As shown in (b), a parity part of the matrix $H_2$ may include a dual diagonal matrix. In this case, an applied row and column permutation equation is as follows.

$$r_y=(r_x \bmod Q)M+\lfloor r_x/Q\rfloor \text{ where } r_x=0,1,2, \ldots ,QM-1$$

$$c_y\{((c_x-QK)\bmod Q\}M+\lfloor(c_x-QK)/Q\rfloor+QK \text{ where } c_x=QK,QK+1, \ldots ,Q(K+M)-1 \quad \text{[Math Figure 10]}$$

According to the above permutation equation, the $r_x$-th row of the matrix $H_1$ can be moved to the $r_y$-th row of the matrix $H_2$ and the $c_x$-th column of the matrix $H_1$ can be moved to the $c_y$-th column of the matrix $H_2$. In this case, column permutation can be applied only to a parity processing period ($QK\le c_x\le Q(K+M)-1$) and LDPC code characteristics can be maintained even if permutation is applied.

FIGS. 29, 30 and 31 illustrate a table showing addresses of parity check matrix according to an embodiment of the present invention. These 3 figures, FIGS. 29, 30 and 31, are parts of one table showing addresses of parity check matrix, but the figure is divided into 3 figures due to lack of space. The table shown in the FIG. 28 represents a parity check matrix (or matrix H) having a codeword length of 64800 and a code rate of 10/15. The table represents addresses of I in the parity check matrix. In this case, the table according to an embodiment of the present invention can be referred to as addresses of a parity check matrix.

In the table of (a), i indicates the blocks generated when the length of the matrix H or codeword by the length of a submatrix. A submatrix according to an embodiment of the present invention is a 360×360 matrix having a codeword length of 64800, and thus the number of blocks can be 180 obtained by dividing 64800 by 360. The each block can be sequentially indicated from 0. Accordingly, i can have a value in the range of 0 to 180. Also i can indicate information bit corresponding to first column in each block.

(b) shows the positions (or addresses) of 1s (or edges) in the first column in each block.

The matrix H can be represented as H(r,c) using all rows and columns thereof. The following equation 11 is used to derive H(r,c).

[Math Figure 11]

$$r=\lfloor x(i,j)/Q\rfloor\times Q+(x(i,j)+m)\bmod Q,$$

$$H(r,c)=\begin{cases}0, & \text{if } r=0 \text{ and } c=16199\\ 1, & \text{else}\end{cases}$$

$$c=i\times Q+m$$

$\lfloor x\rfloor$, the largest integer less than or equal to $x$ $i=0, \ldots$ , length of $x(i)$ $m=0, \ldots , Q-1$ $Q=360$ In the equation, X(i,j) represents the j-th value of the i-th line in the table. Specifically, x(0,0)=3454, x(0,1)=3981 and x(1,0)=399, which correspond to the positions of rows having 1 (or addresses of 1) corresponding to i-th line of the matrix H. In this case, maximum values of r and c can be 21599 and 64799, respectively.

The performance of the LDPC code may depend on distribution of degrees of nodes of the parity check matrix, the girth according to the positions of is or edges of the parity check matrix, cycle characteristic, connection between check nodes and variable nodes, etc. The matrix H shown optimizes node degree distribution in the case of the codeword of 64800, Q=360 and code rate=10/15 and optimizes the positions of is or edges under the condition of optimized degree distribution, Q and code rate.

The matrix H configured according to the table has the above-described QC-IRA LDPC structure. $H_{qc}$ can be obtained using H(r,c) derived using the equation and a base matrix $H_{base}$ can be derived from $H_{qc}$.

In addition, the matrix H according to an embodiment of the present invention may include a matrix H in a different from, which has the same degree distribution as the lengths of x(i) (or degrees of corresponding variable nodes) of the table shown in FIG. 4. Furthermore, when a transmitter performs encoding using the corresponding matrix H, the above-described efficient encoding for QC-IRA LDPC can be employed.

Accordingly, a transmitting side can implement an encoder having high encoding performance, low complexity and high throughput and a receiving side can perform parallel decoding up to 360 level using Q and effectively design a receiver with high throughput using the proposed matrix H.

The following table shows degree distribution.

TABLE 34

| Variable node degree | 14 | 9 | 3 | 2 |
|---|---|---|---|---|
| (# of variable node)/Q | 24 | 6 | 90 | 60 |

When i is from 0 to 23, the numbers of is in the 0-th block to 23rd block are all 14. Accordingly, when the variable node degree is 14, the number of blocks having the same degree is represented as 24. When i corresponds to 120 to 179, the numbers of is in the one hundred twentieth to one hundred seventy ninth block are 2. Accordingly, when the variable node degree is 2, the number of blocks having the same degree is 60. As described above, since the parity part of the matrix H includes only submatrices represented as $I_0$ diagonally distributed in a stepped form, the variable node degree is always 2. Hence, blocks having a variable node degree of 2 can be regarded as blocks corresponding to the parity part. The number of actual variable nodes corresponding to each variable node degree can be obtained by multiplying the number of blocks shown in the table by Q of the submatrix.

FIGS. 32 and 33 illustrate a table showing addresses of parity check matrix according to another embodiment of the present invention. These 2 figures, FIGS. 32 and 33, are parts of one table showing addresses of parity check matrix, but the figure is divided into 2 figures due to lack of space.

The table shown in FIGS. 32 and 33 shows the matrix $H_2$ obtained by modifying the matrix $H_1$.

In sequential encoding, edges used in a parity processing period are typically represented by an equation and thus the edges can be omitted from the table. That is, 60 blocks having a degree of 2 corresponding to the parity part are not represented in the table.

Since the property of the matrix is maintained even if the matrix is modified, as described above, node degree characteristic, cycle, girth, connection between check nodes and variable nodes, etc. are maintained. Accordingly, the equal encoding performance can be obtained and sequential encoding can be performed using the matrix $H_2$ according to the table.

FIG. 34 illustrates a method for sequentially encoding the QC-IRA LDPC code according to an embodiment of the present invention.

When the parity check matrix is modified into the matrix $H_2$ through the above-described permutation process, sequential encoding can be performed through updating of each parity checksum using information bits of a codeword and checksum updating between parity checksums.

As shown in FIG. 34, the codeword can be represented using QK information bits and QM parity checksums. The information bits can be represented as $i_z$ according to position and parity checksums can be represented as $p_s$.

A parity checksum update process through the information bits can be represented by the following equation 12.

[Math Figure 12]

$$p_w = p_w \oplus i_z \quad (1)$$

$$w = \{v + (z \bmod Q)M\} \bmod (QM) \text{ where } z = 0,1,2, \ldots, QK-1 \quad (2)$$

Here, $i_z$ represents a z-th information bit and $p_w$ denotes a parity checksum that needs to be updated using $i_z$. Equation (1) represents that parity checksum $p_w$ corresponding to the w-th row is updated through an XOR operation performed on the z-th information and parity checksum $p_w$. According to equation (2), the position of w is calculated using the above-described table representing the matrix $H_2$. Here, v denotes a number corresponding to each row in the table representing the matrix $H_2$. As described above, a row in the table representing the matrix Hz corresponds to the position of a block generated when the length of the matrix H or codeword is divided by the submatrix length. Accordingly, the information processing period shown in FIG. 6 is divided by the submatrix length Q and then the numbers of rows corresponding to every Q-th $i_z$ are read. Upon completion of checksum update using the information bits of the information processing period, checksum update of the parity processing period can be performed. Checksum update of the parity processing period may be represented by the following equation 13.

$$p_s = p_s \oplus p_{s-1} \text{ where } s = 1,2, \ldots, QM-1 \quad \text{[Math Figure 13]}$$

When S is 0, parity checksum corresponds to parity $p_0$ and parity values from $p_1$ to $p_{QM-1}$ can be sequentially derived through XOR operations performed on the parity values and parity values immediately prior thereto.

FIG. 35 illustrates an LDPC decoder according to an embodiment of the present invention.

The LDPC decoder 700 according to an embodiment of the present invention may include a variable node update block 710, a check node update block 720, a barrel shift block 730 and a check sum block 740. Each block will now be described.

The variable node block 710 may update each variable node of the matrix H using an input of the LDPC decoder and a message delivered through edges from the check node block.

The check node block 720 may update a check node of the matrix H using a message transmitted through edges from a variable node. A node update algorithm according to an embodiment of the present invention may include sum product algorithm, belief-propagation algorithm, min-sum algorithm, modified min-sum algorithm, etc. and may be changed according to designer. In addition, since connection between variable nodes and check nodes is represented in the form of a Q×Q circulant identity matrix due to characteristics of QC-IRA LDPC, Q messages between variable nodes and the check node block can be simultaneously processed in parallel. The barrel shift block 730 may control circulant connection.

The check sum block 740 is an optional block which hard-decides a decoding message for each variable node update and performs parity checksum operation to reduce the number of decoding iterations necessary for error correction. In this case, the LDPC decoder 700 according to an embodiment of the present invention can output a final LDPC decoding output through soft decision even if the check sum block 740 hard-decides the decoding message.

FIG. 36 illustrates a MIMO encoding block diagram according to an embodiment of the present invention.

The MIMO encoding scheme according to an embodiment of the present invention is optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics can make it difficult to get capacity gain from MIMO. The MIMO encoding scheme according to an embodiment of the present invention overcomes this problem using a rotation-based pre-coding and phase randomization of one of the MIMO output signals.

MIMO encoding can be intended for a 2×2 MIMO system requiring at least two antennas at both the transmitter and the receiver. Two MIMO encoding modes are defined in the present invention; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a relatively great complexity increase at the receiver side. These two MIMO encoding schemes have no restriction on the antenna polarity configuration.

MIMO processing can be required for the advanced profile frame, which means all DPs in the advanced profile frame are processed by the MIMO encoder. MIMO processing can be applied at DP level. Pairs of the Constellation Mapper outputs NUQ ($e_{1,i}$ and $e_{2,i}$) can be fed to the input of the MIMO Encoder. Paired MIMO Encoder output ($g_{1,i}$ and $g_{2,i}$) can be transmitted by the same carrier k and OFDM symbol l of their respective TX antennas.

The illustrated diagram shows the MIMO Encoding block, where i is the index of the cell pair of the same XFECBLOCK and Ncells is the number of cells per one XFECBLOCK.

The full-rate SM (FR-SM) encoding process can include two steps. The first step can be multiplying the rotation matrix with the pair of the input symbols for the two TX antenna paths, and the second step can be applying complex phase rotation to the symbols for TX antenna 2. The FR-SM encoding operation is expressed in equations as follows:

[Math Figure 14]

$$\begin{bmatrix} g_{1,i} \\ g_{2,i} \end{bmatrix} = \frac{1}{\sqrt{1+a^2}} \begin{bmatrix} 1 & 0 \\ 0 & e^{j\phi(i)} \end{bmatrix} \begin{bmatrix} 1 & a \\ a & -1 \end{bmatrix} \begin{bmatrix} e_{1,i} \\ e_{2,i} \end{bmatrix},$$

$$\phi(i) = \frac{2\pi}{N} i, (N = 9), i = 0, \ldots, \frac{N_{cells}}{2} - 1$$

The full-rate and full-diversity SM (FRFD-SM) encoding process can take two pairs of NUQ symbols as input to provide two pairs of MIMO output symbols. The FRFD-SM encoding operation is expressed in equations as follows:

[Math Figure 15]

$$\begin{bmatrix} g_{1,2i} & g_{1,2i+1} \\ g_{2,2i} & g_{2,2i+1} \end{bmatrix} = \frac{1}{\sqrt{1+a^2}} \begin{bmatrix} 1 & 0 \\ 0 & e^{j\phi(i)} \end{bmatrix} \begin{bmatrix} e_{1,2i} + ae_{2,2i} & ae_{1,2i+1} - e_{2,2i+1} \\ e_{1,2i+1} + ae_{2,2i+1} & ae_{1,2i} - e_{2,2i} \end{bmatrix},$$

$$\phi(i) = \frac{2\pi}{N} i, (N = 9), i = 0, \ldots, \frac{N_{cells}}{4} - 1$$

FIG. 37 illustrates MIMO parameter table according to an embodiment of the present invention.

The FR-SM encoding process can be applied for 8 bpcu and 12 bpcu with 16K and 64K FECBLOCK. FR-SM encoding can use the parameters defined in the illustrated MIMO parameter table for each combination of a value of bits per channel use and code rate of an FECBLOCK. Detailed constellations corresponding to the illustrated MIMO parameter table are described above.

The FRFD-SM encoding process can use the FR-SM parameters defined in the illustrated MIMO parameter table for each combination of a value of bit per channel use and code rate of an FECBLOCK. Detailed constellations corresponding to the illustrated MIMO parameter table are described above.

FIG. 38 illustrates MIMO parameter table according to other embodiment of the present invention.

For the 10 bpcu MIMO case, FR-SM encoding can use the parameters defined in the illustrated MIMO parameter table. These parameters are especially useful when there is a power imbalance between horizontal and vertical transmission (e.g. 6 dB in current U.S. Elliptical pole network). The QAM-16 can be used for the TX antenna of which the transmission power is deliberately attenuated.

The FRFD-SM encoding process can use the FR-SM parameters defined in the illustrated MIMO parameter table for each combination of a value of bit per channel use and code rate of an FECBLOCK. Detailed constellations corresponding to the illustrated MIMO parameter table are described above.

FIG. 39 illustrates a method of transmitting broadcast signal according to an embodiment of the present invention.

The method includes encoding DP data, building at least one signal frame and/or modulating data by an OFDM method & transmitting broadcast signals.

In step of encoding DP data, the above-described BICM module may encode each data pipe (DP) according to a code rate. The step of encoding DP data can include LDPC encoding, Bit interleaving, mapping onto constellations and/or MIMO encoding.

The step of LDPC (Low-Density Parity-Check) encoding corresponds to above-described LDPC encoding. The LDPC encoding is performed on the DP data by using addresses of a parity check matrix and length of a LDPC codeword. The addresses of the parity check matrix indicates addresses of parity bits to be calculated, and the addresses of the parity check matrix is defined according to the code rate.

The step of Bit interleaving corresponds to above-described Bit interleaving by the Bit interleaver. The Bit interleaving is performed on the LDPC encoded DP data.

The step of mapping onto constellations corresponds to above-described constellation mapping by the constellation mapper. The mapping onto constellation is performed on the bit interleaved DP data.

The step of MIMO (Multi-Input Multi-Output) encoding corresponds to above-described MIMO encoding by the MIMO encoding block. The MIMO encoding is performed on the mapped DP data.

The step of building at least one signal frame corresponds to above-described frame building. The building signal frame is performed on the encoded DP data.

The step of modulating data by an OFDM method & transmitting broadcast signals corresponds to above-described OFDM generation process. The built signal frame is being modulated by OFDM method, and the broadcast signals having the modulated data are being transmitted.

In a method of transmitting broadcast signal according to other embodiment of the present invention, the code rate is 10/15, and the length of the LDPC codeword is 64800 bits.

In a method of transmitting broadcast signal according to another embodiment of the present invention, the parity check matrix includes an information part corresponding to information bits of the LDPC codeword and a parity part corresponding to the parity bits of the LDPC codeword. The addresses of the parity check matrix is expressed as follows.

TABLE 35

| |
|---|
| 316 1271 3692 9495 12147 12849 14928 16671 16938 17864 19108 20502 21097 21115 |
| 2341 2559 2643 2816 2865 5137 5331 7000 7523 8023 10439 10797 13208 15041 |
| 5556 6858 7677 10162 10207 11349 12321 12398 14787 15743 15859 15952 19313 20879 |
| 349 573 910 2702 3654 6214 9246 9353 10638 11772 14447 14953 16620 19888 |
| 204 1390 2887 3835 6230 6533 7443 7876 9299 10291 10896 13960 18287 20086 |
| 541 2429 2838 7144 8523 8637 10490 10585 11074 12074 15762 16812 17900 18548 |
| 733 1659 3838 5323 5805 7882 9429 10682 13697 16909 18846 19587 19592 20904 |
| 1134 2136 4631 4653 4718 5197 10410 11666 14996 15305 16048 17417 18960 20303 |
| 734 1001 1283 4959 10016 10176 10973 11578 12051 15550 15915 19022 19430 20121 |
| 745 4057 5855 9885 10594 10989 13156 13219 13351 13631 13685 14577 17713 20386 |
| 968 1446 2130 2502 3092 3787 5323 8104 8418 9998 11681 13972 17747 17929 |
| 3020 3857 5275 5786 6319 8608 11943 14062 17144 17752 18001 18453 19311 21414 |
| 709 747 1038 2181 5320 8292 10584 10859 13964 15009 15277 16953 20675 21509 |
| 1663 3247 5003 5760 7186 7360 10346 14211 14717 14792 15155 16128 17355 17970 |
| 516 578 1914 6147 9419 11148 11434 13289 13325 13332 19106 19257 20962 21556 |
| 5009 5632 6531 9430 9886 10621 11765 13969 16178 16413 18110 18249 20616 20759 |
| 457 2686 3318 4608 5620 5858 6480 7430 9602 12691 14664 18777 20152 20848 |
| 33 2877 5334 6851 7907 8654 10688 15401 16123 17942 17969 18747 18931 20224 |
| 87 897 7636 8663 11425 12288 12672 14199 16435 17615 17950 18953 19667 20281 |
| 1042 1832 2545 2719 2947 3672 3700 6249 6398 6833 11114 14283 17694 20477 |
| 326 488 2662 2880 3009 5357 6587 8882 11604 14374 18781 19051 19057 20508 |
| 854 1294 2436 2852 4903 6466 7761 9072 9564 10321 13638 15658 16946 19119 |
| 194 899 1711 2408 2786 5391 7108 8079 8716 11453 17303 19484 20989 21389 |

TABLE 36

| |
|---|
| 1631 3121 3994 5005 7810 8850 10315 10589 13407 |
| 17162 18624 18758 19311 20301 |
| 736 2424 4792 5600 6370 10061 16053 16775 18600 |
| 1254 8163 8876 9157 12141 14587 16545 17175 18191 |
| 388 6641 8974 10607 10716 14477 16825 17191 18400 |
| 5578 6082 6824 7360 7745 8655 11402 11665 12428 |
| 3603 8729 13463 14698 15210 19112 19550 20727 21052 |
| 48 1732 3805 5158 15442 16909 19854 21071 21579 |
| 11707 14014 21531 |
| 1542 4133 4925 |
| 10083 13505 21198 |
| 14300 15765 16752 |
| 778 1237 11215 |
| 1325 3199 14534 |
| 2007 14510 20599 |
| 1996 5881 16429 |
| 5111 15018 15980 |
| 4989 10681 12810 |
| 3763 10715 16515 |
| 2259 10080 15642 |
| 9032 11319 21305 |
| 3915 15213 20884 |
| 11150 15022 20201 |
| 1147 6749 19625 |
| 12139 12939 18870 |
| 3840 4634 10244 |
| 1018 10231 17720 |

TABLE 37

| |
|---|
| 2708 13056 13393 |
| 5781 11588 18888 |
| 1345 2036 5252 |
| 5908 8143 15141 |
| 1804 13693 18640 |
| 10433 13965 16950 |
| 9568 10122 15945 |

TABLE 37-continued

| |
|---|
| 547 6722 14015 |
| 321 12844 14095 |
| 2632 10513 14936 |
| 6369 11995 20321 |
| 9920 19136 21529 |
| 1990 2726 10183 |
| 5763 12118 15467 |

TABLE 37-continued

| |
|---|
| 503 10006 19564 |
| 9839 11942 19472 |
| 11205 13552 15389 |
| 8841 13797 19697 |
| 124 6053 18224 |
| 6477 14406 21146 |
| 1224 8027 16011 |
| 3046 4422 17717 |
| 739 12308 17760 |

TABLE 38

| |
|---|
| 4014 4130 7835 |
| 2266 5652 11981 |
| 2711 7970 18317 |
| 2196 15229 17217 |
| 8636 13302 16764 |
| 5612 15010 16657 |
| 615 1249 4639 |
| 3821 12073 18506 |
| 1066 16522 21536 |
| 11307 18363 19740 |
| 3240 8560 10391 |
| 3124 11424 20779 |
| 1604 8861 17394 |
| 2083 7400 8093 |
| 3218 7454 9155 |
| 9855 15998 20533 |
| 316 2850 20652 |
| 5583 9768 10333 |
| 7147 7713 18339 |
| 12607 17428 21418 |
| 14216 16954 18164 |
| 8477 15970 18488 |
| 1632 8032 9751 |
| 4573 9080 13507 |
| 11747 12441 13876 |

TABLE 38-continued

| |
|---|
| 1183 15605 16675 |

TABLE 39

| |
|---|
| 4408 10264 17109 |
| 5495 7882 12150 |
| 1010 3763 5065 |
| 9828 18054 21599 |
| 6342 7353 15358 |
| 6362 9462 19999 |
| 7184 13693 17622 |
| 4343 4654 10995 |
| 7099 8466 18520 |
| 11505 14395 15138 |
| 6779 16691 18726 |
| 7146 12644 20196 |
| 5865 16728 19634 |
| 4657 8714 21246 |
| 4580 5279 18750 |
| 3767 6620 18905 |
| 9209 13093 17575 |
| 12486 15875 19791 |
| 8046 14636 17491 |
| 2120 4643 13206 |
| 6186 9675 12601 |
| 784 5770 21585 |

Above 5 tables are parts of one table of addresses of the parity check matrix, but the table is divided into above 5 tables due to lack of space. In the above expressions, each row represents a first information bit in each group of 360 information bits, and each value corresponding to the each row represents the addresses of the parity bits to be calculated.

In a method of transmitting broadcast signal according to another embodiment of the present invention, each of first to twenty-fourth rows has 14 addresses of the parity bits, each of twenty-fifth to thirtieth rows has 9 addresses of the parity bits, and each of thirty-first to one hundred and twentieth rows has 3 addresses of the parity bits.

In a method of transmitting broadcast signal according to another embodiment of the present invention, the MIMO encoding is performed by using a MIMO matrix having a specific MIMO parameter.

In a method of transmitting broadcast signal according to another embodiment of the present invention, the specific MIMO parameter is defined depending on QAM types. The above-described MIMO parameter table shows the relation between MIMO parameter and constellation.

The method of transmitting broadcast signal according to an embodiment of the present invention can be implemented in an apparatus.

The apparatus includes an encoding module, a frame building module, a modulating module and/or a transmitting module.

The encoding module is configured to encode Data Pipe, DP, data according to a code rate. The encoding module corresponds to above-described BICM module. The encoding may represents the encoding by the above-described BICM module. The encoding module can include a LDPC encoding module, a Bit interleaving module, a mapping module and/or a MIMO encoding module.

The LDPC (Low-Density Parity-Check) encoding module is configured to LDPC encode the DP data using addresses of a parity check matrix and length of a LDPC codeword. The LDPC encoding corresponds to above-described LDPC encoding. The addresses of the parity check matrix indicates addresses of parity bits to be calculated, and the addresses of the parity check matrix is defined according to the code rate.

The Bit interleaving module is configured to bit interleave the LDPC encoded DP data. The Bit interleaving corresponds to above-described Bit interleaving by the Bit interleaver.

The mapping module is configured to map the bit interleaved DP data onto constellations. The mapping onto constellations corresponds to above-described constellation mapping by the constellation mapper.

The MIMO (Multi-Input Multi-Output) encoding module is configured to MIMO encode the mapped DP data. The MIMO encoding corresponds to above-described MIMO encoding by the MIMO encoding block.

The frame building module is configured to build at least one signal frame by mapping the encoded DP data. The building at least one signal frame corresponds to above-described frame building.

The modulating module is configured to modulate data in the built signal frame by an Orthogonal Frequency Division Multiplexing, OFDM, method. The modulating data corresponds to above-described OFDM generation process.

The transmitting module is configured to transmit the broadcast signals having the modulated data.

The transmitting broadcast signals corresponds to above-described OFDM generation process.

In an apparatus for transmitting broadcast signal according to other embodiment of the present invention, the code rate is 10/15, and the length of the LDPC codeword is 64800 bits.

In an apparatus for transmitting broadcast signal according to another embodiment of the present invention, the parity check matrix includes an information part corresponding to information bits of the LDPC codeword and a parity part corresponding to the parity bits of the LDPC codeword. The addresses of the parity check matrix is expressed as follows.

TABLE 40

| |
|---|
| 316 1271 3692 9495 12147 12849 14928 16671 16938 17864 19108 20502 21097 21115 |
| 2341 2559 2643 2816 2865 5137 5331 7000 7523 8023 10439 10797 13208 15041 |
| 5556 6858 7677 10162 10207 11349 12321 12398 14787 15743 15859 15952 19313 20879 |
| 349 573 910 2702 3654 6214 9246 9353 10638 11772 14447 14953 16620 19888 |
| 204 1390 2887 3835 6230 6533 7443 7876 9299 10291 10896 13960 18287 20086 |
| 541 2429 2838 7144 8523 8637 10490 10585 11074 12074 15762 16812 17900 18548 |
| 733 1659 3838 5323 5805 7882 9429 10682 13697 16909 18846 19587 19592 20904 |
| 1134 2136 4631 4653 4718 5197 10410 11666 14996 15305 16048 17417 18960 20303 |
| 734 1001 1283 4959 10016 10176 10973 11578 12051 15550 15915 19022 19430 20121 |
| 745 4057 5855 9885 10594 10989 13156 13219 13351 13631 13685 14577 17713 20386 |
| 968 1446 2130 2502 3092 3787 5323 8104 8418 9998 11681 13972 17747 17929 |
| 3020 3857 5275 5786 6319 8608 11943 14062 17144 17752 18001 18453 19311 21414 |
| 709 747 1038 2181 5320 8292 10584 10859 13964 15009 15277 16953 20675 21509 |

TABLE 40-continued

| |
|---|
| 1663 3247 5003 5760 7186 7360 10346 14211 14717 14792 15155 16128 17355 17970 |
| 516 578 1914 6147 9419 11148 11434 13289 13325 13332 19106 19257 20962 21556 |
| 5009 5632 6531 9430 9886 10621 11765 13969 16178 16413 18110 18249 20616 20759 |
| 457 2686 3318 4608 5620 5858 6480 7430 9602 12691 14664 18777 20152 20848 |
| 33 2877 5334 6851 7907 8654 10688 15401 16123 17942 17969 18747 18931 20224 |
| 87 897 7636 8663 11425 12288 12672 14199 16435 17615 17950 18953 19667 20281 |
| 1042 1832 2545 2719 2947 3672 3700 6249 6398 6833 11114 14283 17694 20477 |
| 326 488 2662 2880 3009 5357 6587 8882 11604 14374 18781 19051 19057 20508 |
| 854 1294 2436 2852 4903 6466 7761 9072 9564 10321 13638 15658 16946 19119 |
| 194 899 1711 2408 2786 5391 7108 8079 8716 11453 17303 19484 20989 21389 |

TABLE 41

| |
|---|
| 1631 3121 3994 5005 7810 8850 10315 10589 13407 17162 18624 18758 19311 20301 |
| 736 2424 4792 5600 6370 10061 16053 16775 18600 |
| 1254 8163 8876 9157 12141 14587 16545 17175 18191 |
| 388 6641 8974 10607 10716 14477 16825 17191 18400 |
| 5578 6082 6824 7360 7745 8655 11402 11665 12428 |
| 3603 8729 13463 14698 15210 19112 19550 20727 21052 |
| 48 1732 3805 5158 15442 16909 19854 21071 21579 |
| 11707 14014 21531 |
| 1542 4133 4925 |
| 10083 13505 21198 |
| 14300 15765 16752 |
| 778 1237 11215 |
| 1325 3199 14534 |
| 2007 14510 20599 |
| 1996 5881 16429 |
| 5111 15018 15980 |
| 4989 10681 12810 |
| 3763 10715 16515 |
| 2259 10080 15642 |
| 9032 11319 21305 |
| 3915 15213 20884 |
| 11150 15022 20201 |
| 1147 6749 19625 |
| 12139 12939 18870 |
| 3840 4634 10244 |
| 1018 10231 17720 |

TABLE 42

| |
|---|
| 2708 13056 13393 |
| 5781 11588 18888 |
| 1345 2036 5252 |
| 5908 8143 15141 |
| 1804 13693 18640 |
| 10433 13965 16950 |
| 9568 10122 15945 |
| 547 6722 14015 |
| 321 12844 14095 |
| 2632 10513 14936 |
| 6369 11995 20321 |
| 9920 19136 21529 |
| 1990 2726 10183 |
| 5763 12118 15467 |
| 503 10006 19564 |
| 9839 11942 19472 |
| 11205 13552 15389 |
| 8841 13797 19697 |
| 124 6053 18224 |
| 6477 14406 21146 |
| 1224 8027 16011 |
| 3046 4422 17717 |
| 739 12308 17760 |

TABLE 43

| |
|---|
| 4014 4130 7835 |
| 2266 5652 11981 |
| 2711 7970 18317 |
| 2196 15229 17217 |

TABLE 43-continued

| |
|---|
| 8636 13302 16764 |
| 5612 15010 16657 |
| 615 1249 4639 |
| 3821 12073 18506 |
| 1066 16522 21536 |
| 11307 18363 19740 |
| 3240 8560 10391 |
| 3124 11424 20779 |
| 1604 8861 17394 |
| 2083 7400 8093 |
| 3218 7454 9155 |
| 9855 15998 20533 |
| 316 2850 20652 |
| 5583 9768 10333 |
| 7147 7713 18339 |
| 12607 17428 21418 |
| 14216 16954 18164 |
| 8477 15970 18488 |
| 1632 8032 9751 |
| 4573 9080 13507 |
| 11747 12441 13876 |
| 1183 15605 16675 |

TABLE 44

| |
|---|
| 4408 10264 17109 |
| 5495 7882 12150 |
| 1010 3763 5065 |
| 9828 18054 21599 |
| 6342 7353 15358 |
| 6362 9462 19999 |
| 7184 13693 17622 |
| 4343 4654 10995 |
| 7099 8466 18520 |
| 11505 14395 15138 |
| 6779 16691 18726 |
| 7146 12644 20196 |
| 5865 16728 19634 |
| 4657 8714 21246 |
| 4580 5279 18750 |
| 3767 6620 18905 |
| 9209 13093 17575 |
| 12486 15875 19791 |
| 8046 14636 17491 |
| 2120 4643 13206 |
| 6186 9675 12601 |
| 784 5770 21585 |

Above 5 tables are parts of one table of addresses of the parity check matrix, but the table is divided into above 5 tables due to lack of space. In the above expressions, each row represents a first information bit in each group of 360 information bits, and each value corresponding to the each row represents the addresses of the parity bits to be calculated.

In an apparatus for transmitting broadcast signal according to another embodiment of the present invention, each of first to twenty-fourth rows has 14 addresses of the parity bits, each of twenty-fifth to thirtieth rows has 9 addresses of the parity bits, and each of thirty-first to one hundred and twentieth rows has 3 addresses of the parity bits.

In an apparatus for transmitting broadcast signal according to another embodiment of the present invention, the MIMO encoding module performs MIMO encoding using a MIMO matrix having a specific MIMO parameter.

In an apparatus for transmitting broadcast signal according to another embodiment of the present invention, the specific MIMO parameter is defined depending on QAM types. The above-described MIMO parameter table shows the relation between MIMO parameter and In each DP, the TI memory stores the input XFECBLOCKs (output XFECBLOCKs from the SSD/MIMO encoding block). Assume that input XFECBLOCKs are defined as $$\left(d_{n,s,0,0}, d_{n,s,0,1}, \ldots, d_{n,s,0,N_{cells}-1}, d_{n,s,1,0}, \ldots, d_{n,s,1,N_{cells}-1}, \ldots, d_{n,s,N_{xBLOCK\_TI}(n,s)-1,0}, \ldots, d_{n,s,N_{xBLOCK\_TI}(n,s)-1,N_{cells}-1}\right),$$

where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & theoutputofSSD \ldots \text{encoding} \\ g_{n,s,r,q}, & theoutputofMIMOencoding \end{cases}.$$

In addition, assume that output XFECBLOCKs from the time interleaver are defined as $$\left(h_{n,s,0}, h_{n,s,1}, \ldots, h_{n,s,i}, \ldots, h_{n,s,N_{xBLOCK\_TI}(n,s)\times N_{cells}-1}\right),$$

where $h_{n,s,i}$ is the ith output cell (for i=0, . . . , $N_{xBLOCK\_TI}(n,s)\times N_{cell}-1$) in the sth TI block of the nth TI group.

Typically, the time Interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

FIG. 40 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, . . . , $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

[Math Figure 16]

$$\text{GENERATE}(R_{n,s,i}, C_{n,s,i}) = \{ R_{n,s,i} = \text{mod}(i, N_r), \; T_{n,s,i} = \text{mod}(S_{shift} \times R_{n,s,i}, N_c), \; C_{n,s,i} = \text{mod}\left(T_{n,s,i} + \left\lfloor \frac{i}{N_r} \right\rfloor, N_c\right) \}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

[Math Figure 17]

for $$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i}=N_r C_{n,s,i}+R_{n,s,i}$.

FIG. 41 illustrates an operation of a twisted row-column block interleaver according to another embodiment of the present invention.

More specifically, FIG. 41 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r\times N_c=N_{cells}\times N_{xBLOCK\_TI\_MAX}$ by inserting the virtual XFECBLOCKs into the TI memory and the reading process is accomplished as follow expression.

[Math FIG. 18]

```
p = 0;
for i = 0;i < N_cells N'_xBLOCK_TI_MAX;i = i + 1
{GENERATE(R_n,s,i,C_n,s,i);
V_i = N_r C_n,s,j + R_n,s,j
  if V_i < N_cells N_xBLOCK_TI(n,s)
  {
   Z_n,s,p = V_i; p = p + 1;
  }
}
```

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{JUMP}=1$, and $P_I=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI}\rfloor=N_{xBLOCK\_TI\_MAX}=6$ FIG. 42 illustrates a diagonal-wise reading pattern of a twisted row-column block interleaver according to an embodiment of the present invention.

More specifically FIG. 42 shows a diagonal-wise reading pattern from each interleaving array with parameters of $N_{xBLOCK\_TI\_MAX}=7$ and $S_{shift}=(7-1)/2=3$. Note that in the reading process shown as pseudocode above, if $V_i \geq N_{cells}N_{xBLOCK\_TI}(n,s)$ the value of $V_i$ is skipped and the next calculated value of $V_i$ is used.

FIG. 43 illustrates interleaved XFECBLOCKs from each interleaving array according to an embodiment of the present invention.

FIG. 43 illustrates the interleaved XFECBLOCKs from each interleaving array with parameters of $N_{xBLOCK\_TI\_MAX}=7$ and $S_{shift}=3$.

Another embodiments of the present invention will be described below. These embodiments are based on each code rate. Each embodiments are based on a codeword length of 64800. For each embodiments, the $H_1$ matrixes, $H_2$ matrixes and degree distribution tables will be described. Each of the $H_1$ matrixes, $H_2$ matrixes and degree distribution tables have different values depends on each code rates. But the structures and descriptions are the same as the $H_1$ matrix, $H_2$ matrix and degree distribution table, described above.

One of the embodiments according to a code rate of 10/15 will be described below.

Figure 44:
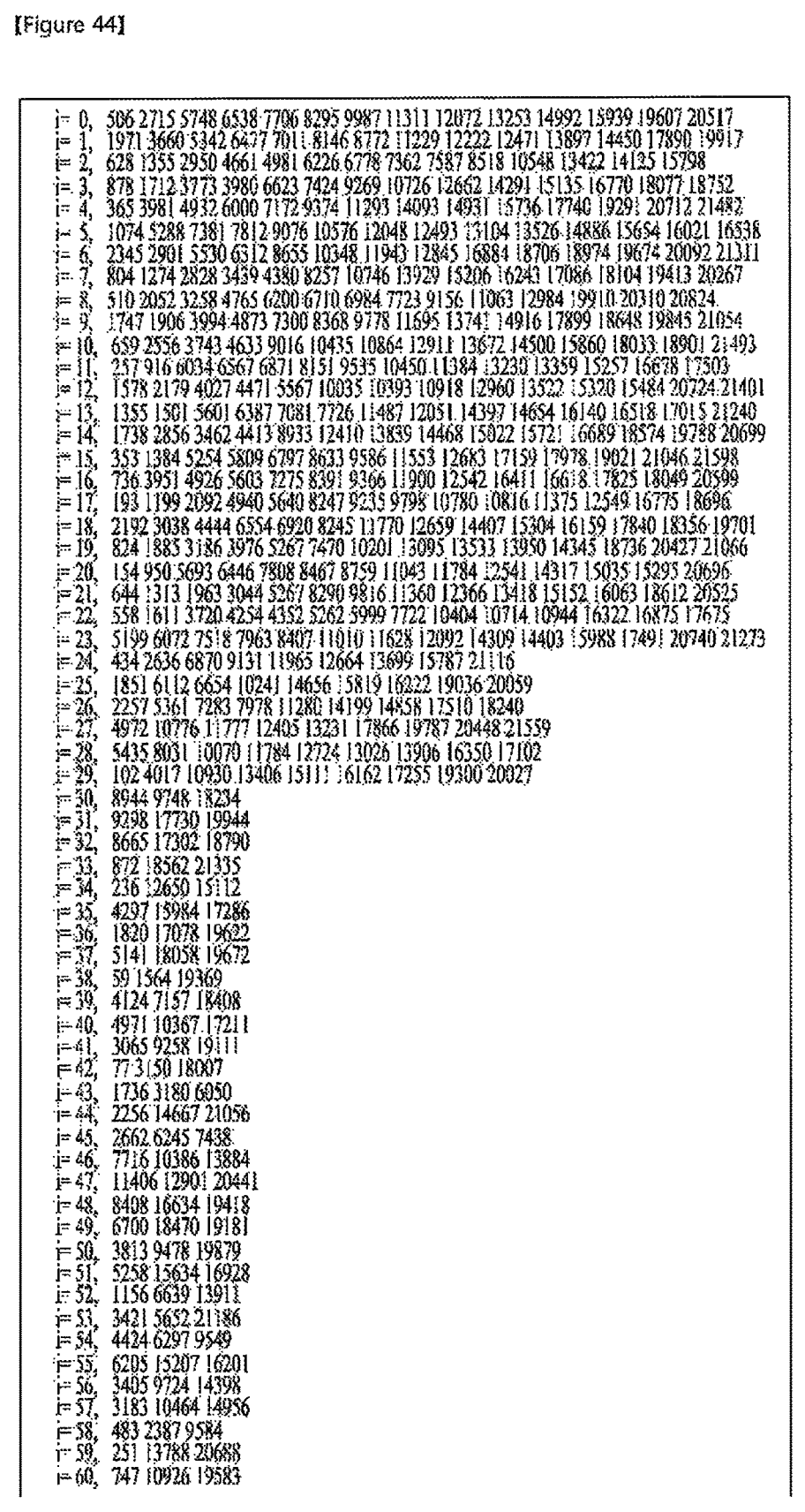
Figure 45:
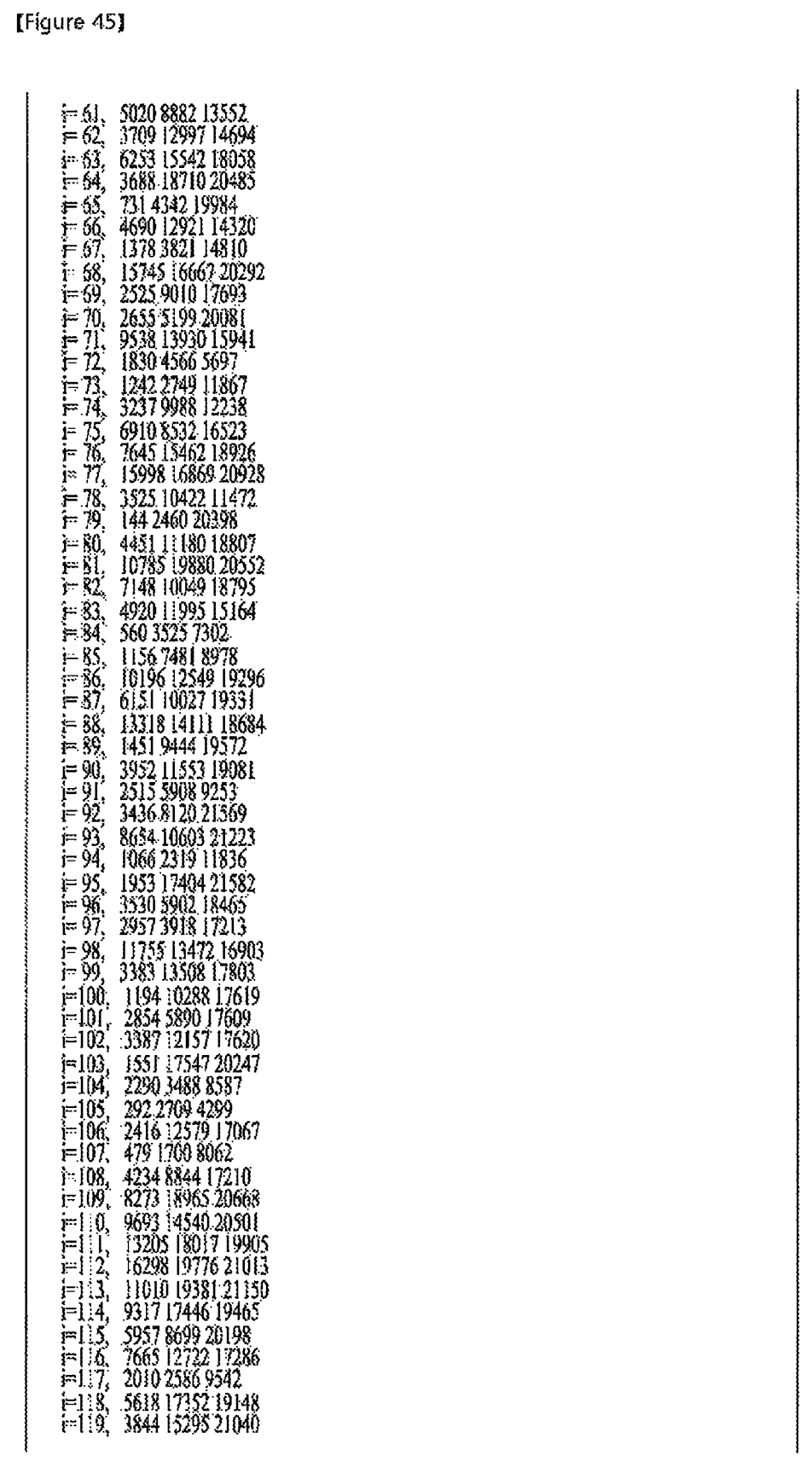
Figure 46:
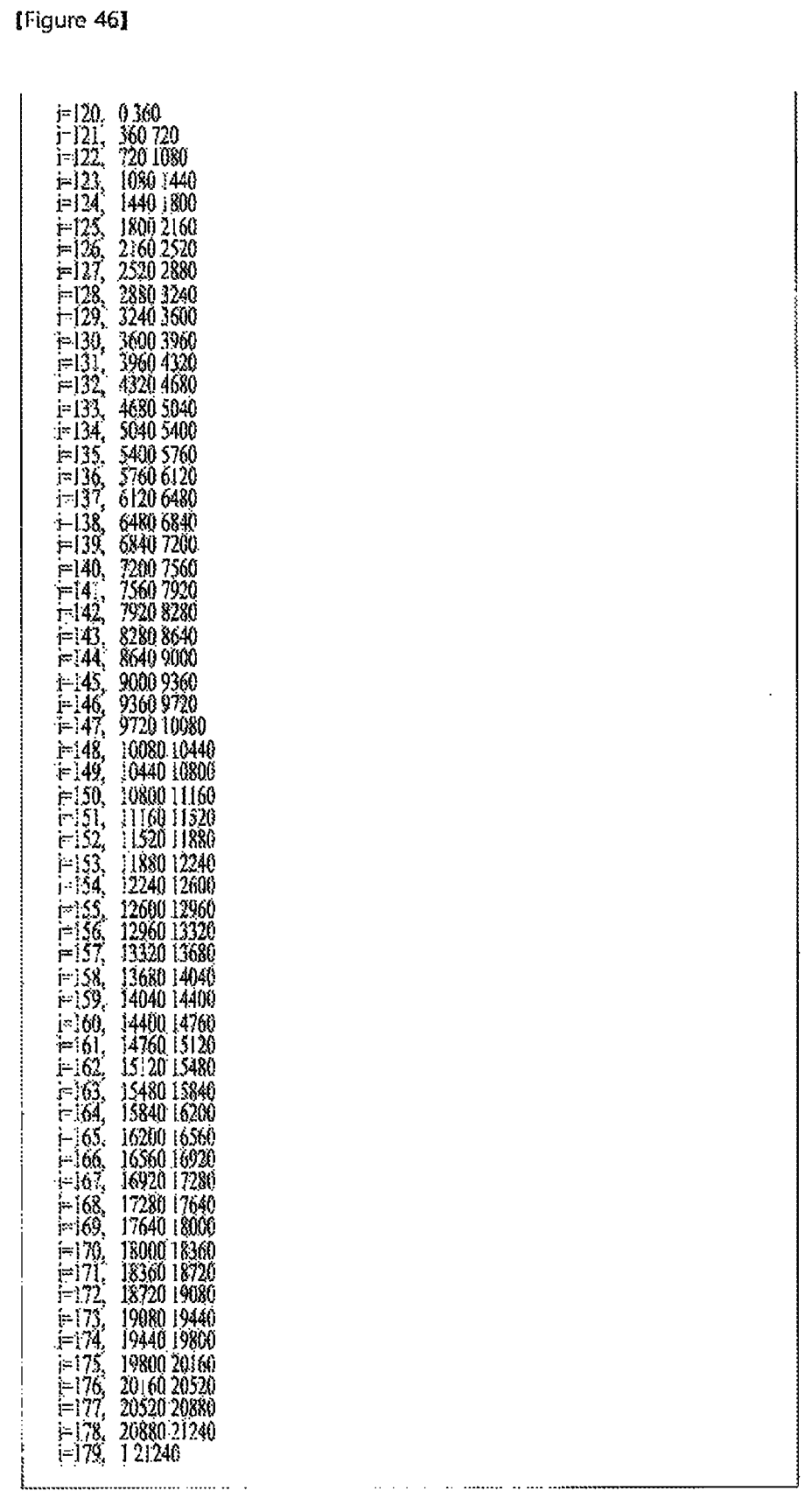

FIGS. 44, 45 and 46 illustrates one of the embodiments of the $H_1$ matrix according to a code rate of 10/15.

Above 3 figures are parts of one table which represents $H_1$ matrix, but the table is divided into 3 figures due to lack of space.

Figure 47:
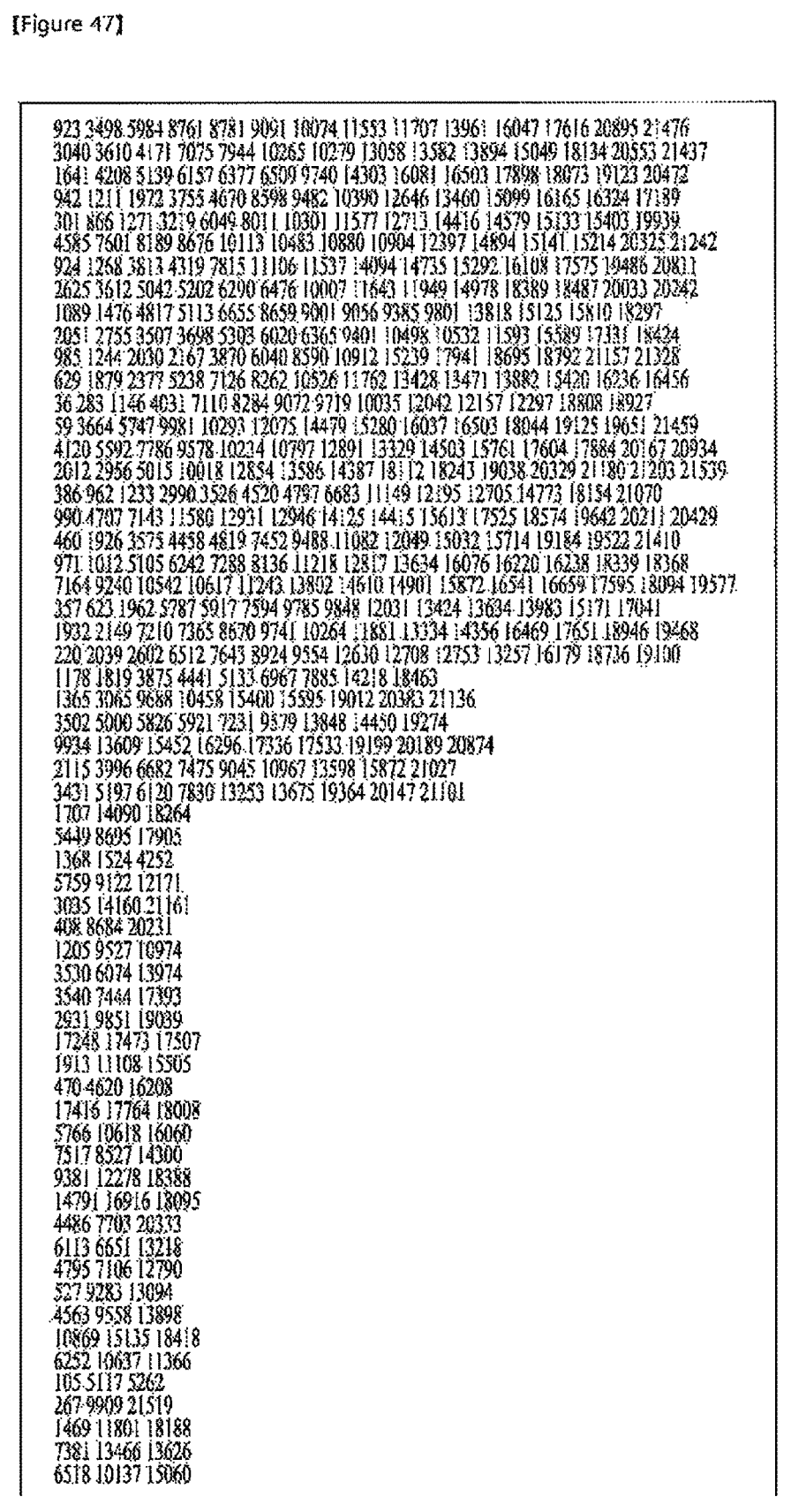
Figure 48:
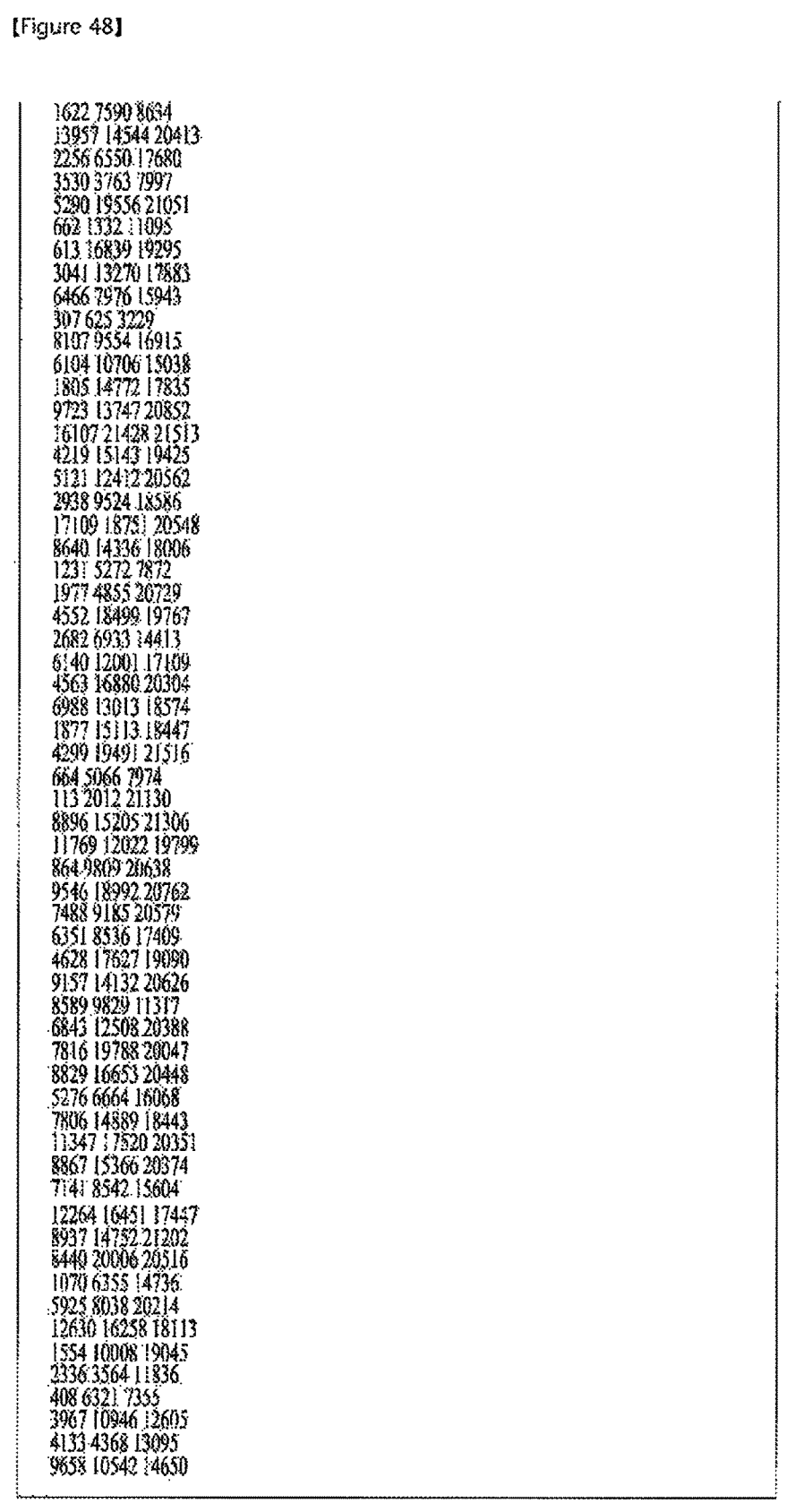

FIGS. 47 and 48 illustrates one of the embodiments of the $H_2$ matrix according to a code rate of 10/15.

Above 2 figures are parts of one table which represents $H_2$ matrix, but the table is divided into 2 figures due to lack of space.

FIG. 49 illustrates one of the embodiments of the degree distribution table according to a code rate of 10/15.

One of the embodiments according to a code rate of 7/15 will be described below.

FIGS. 50, 51 and 52 illustrates one of the embodiments of the $H_1$ matrix according to a code rate of 7/15.

Above 3 figures are parts of one table which represents $H_1$ matrix, but the table is divided into 3 figures due to lack of space.

FIGS. 53 and 54 illustrates one of the embodiments of the $H_2$ matrix according to a code rate of 7/15.

Above 2 figures are parts of one table which represents $H_2$ matrix, but the table is divided into 2 figures due to lack of space.

FIG. 55 illustrates one of the embodiments of the degree distribution table according to a code rate of 7/15.

One of the embodiments according to a code rate of 8/15 will be described below.

Figure 57:
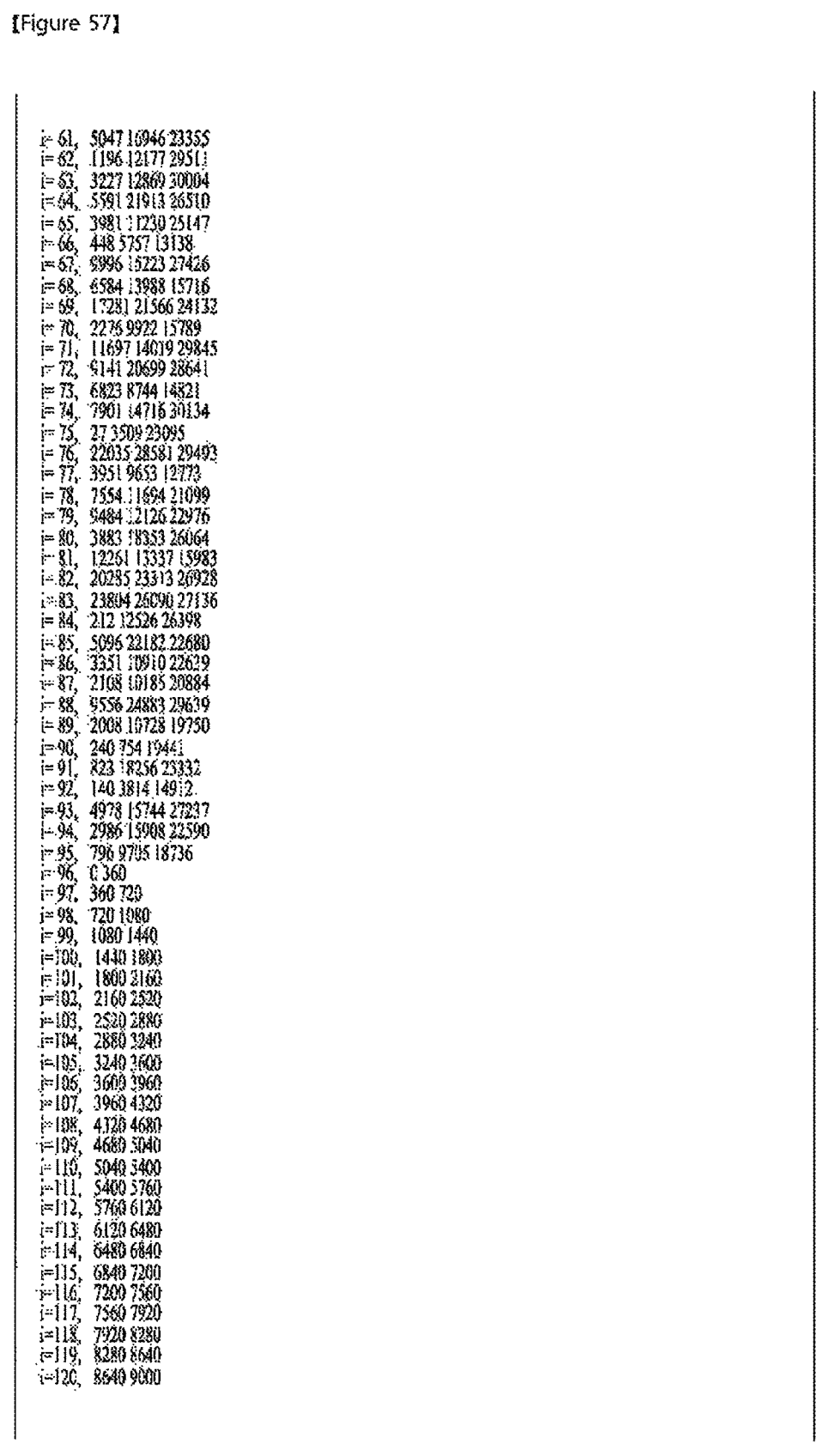
Figure 58:
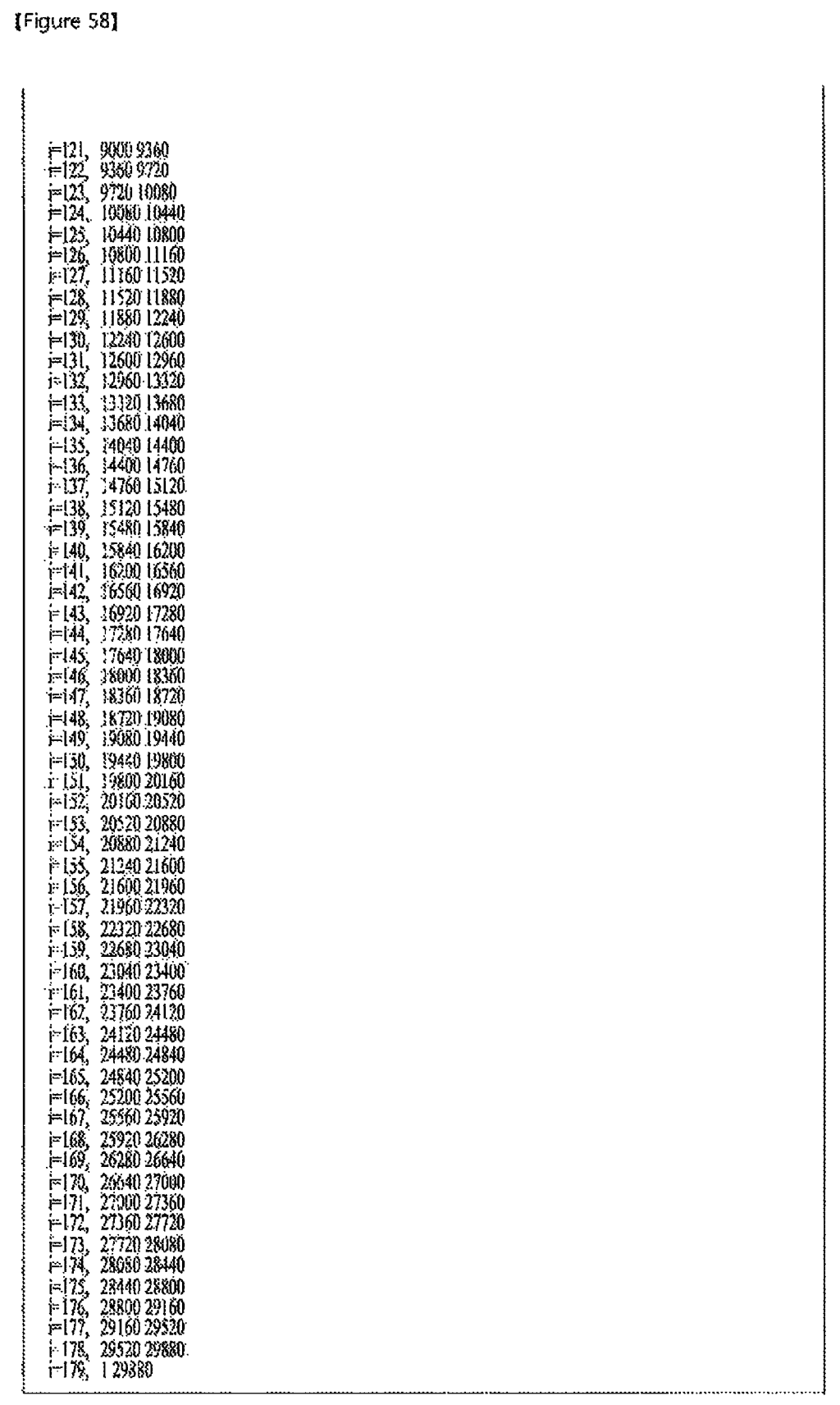

FIGS. 56, 57 and 58 illustrates one of the embodiments of the $H_1$ matrix according to a code rate of 8/15.

Above 3 figures are parts of one table which represents $H_1$ matrix, but the table is divided into 3 figures due to lack of space.

Figure 59:
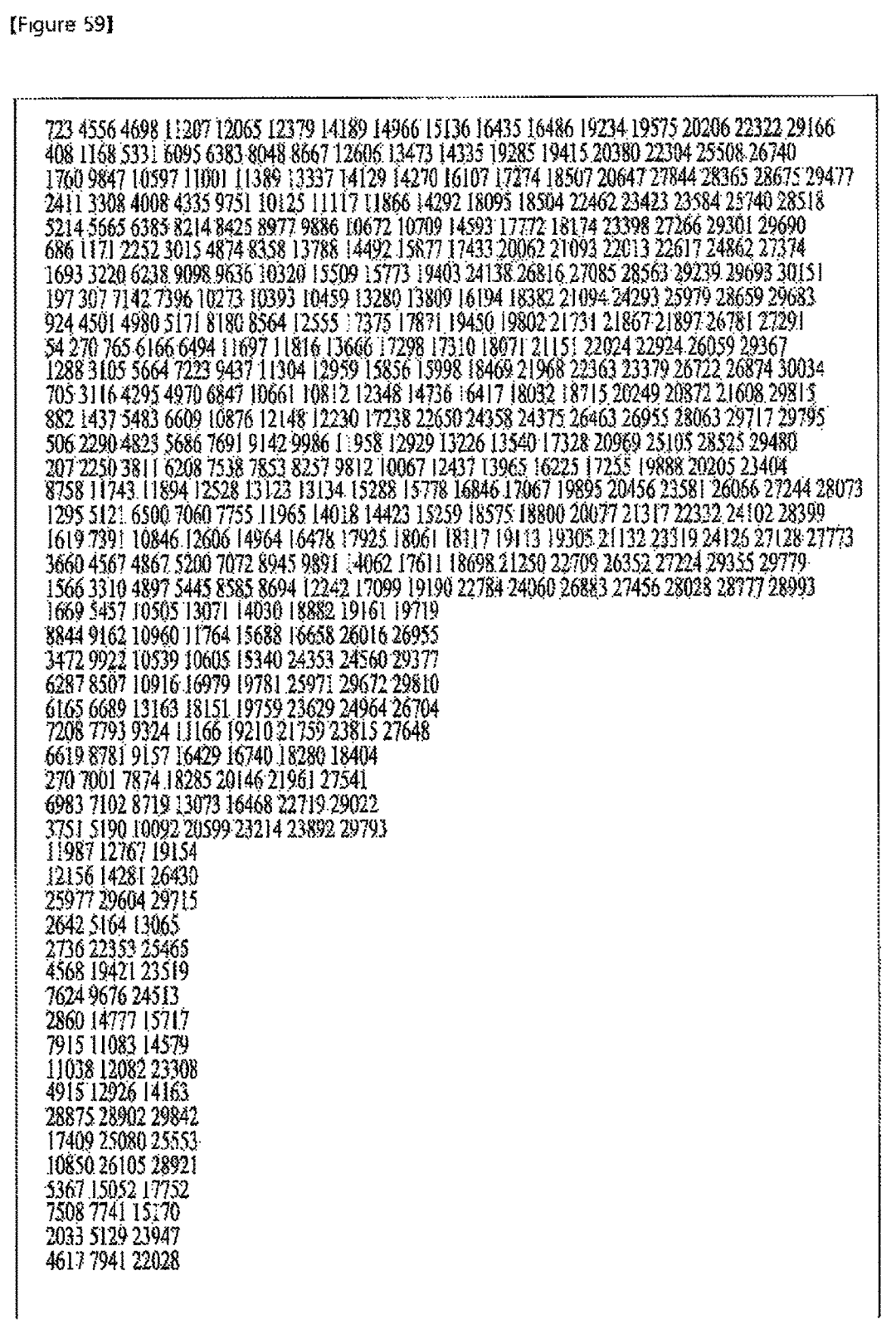
Figure 60:
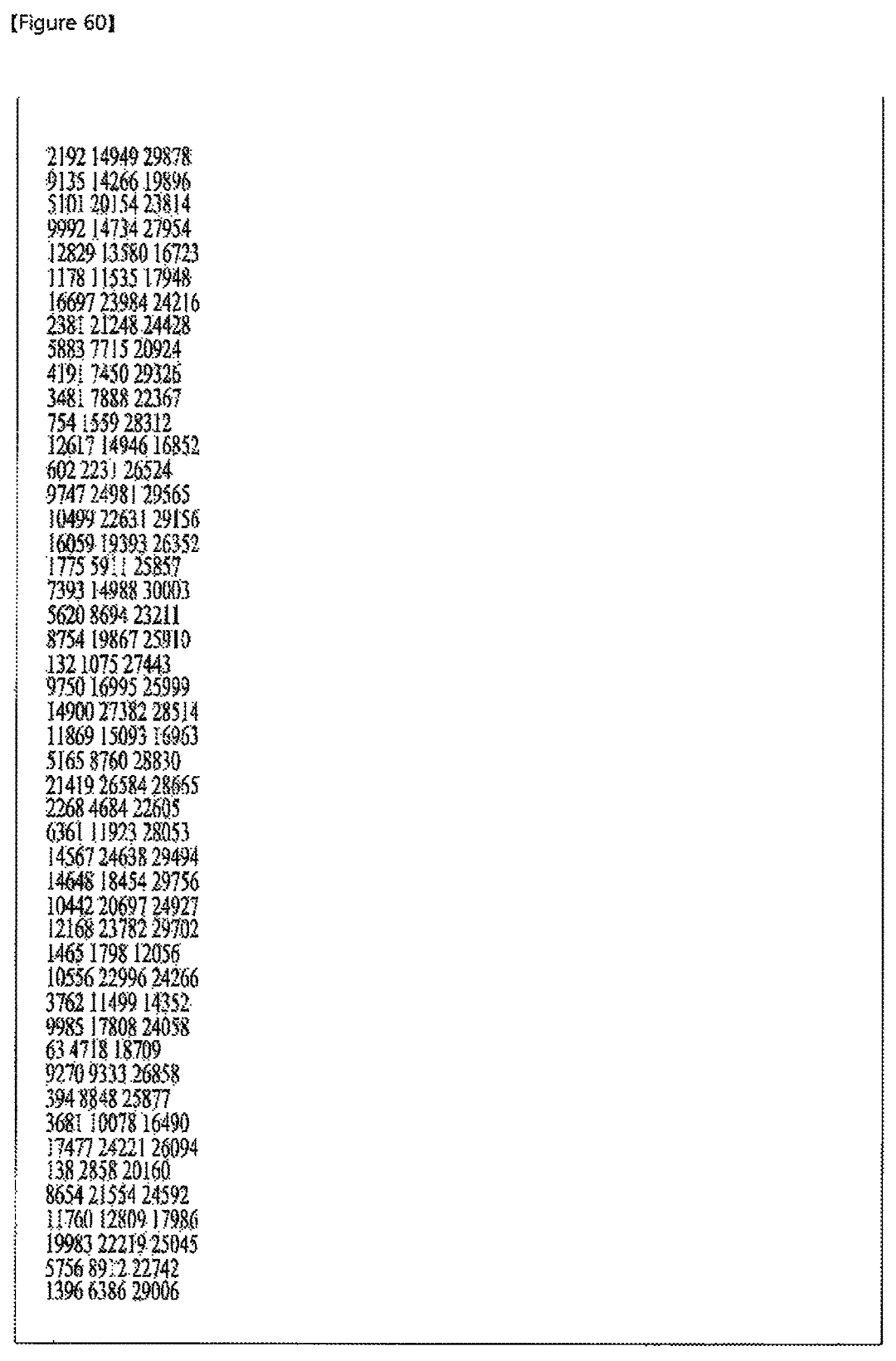

FIGS. 59 and 60 illustrates one of the embodiments of the $H_2$ matrix according to a code rate of 8/15.

Above 2 figures are parts of one table which represents $H_2$ matrix, but the table is divided into 2 figures due to lack of space.

FIG. 61 illustrates one of the embodiments of the degree distribution table according to a code rate of 8/15.

One of the embodiments according to a code rate of 9/15 will be described below.

Figure 62:
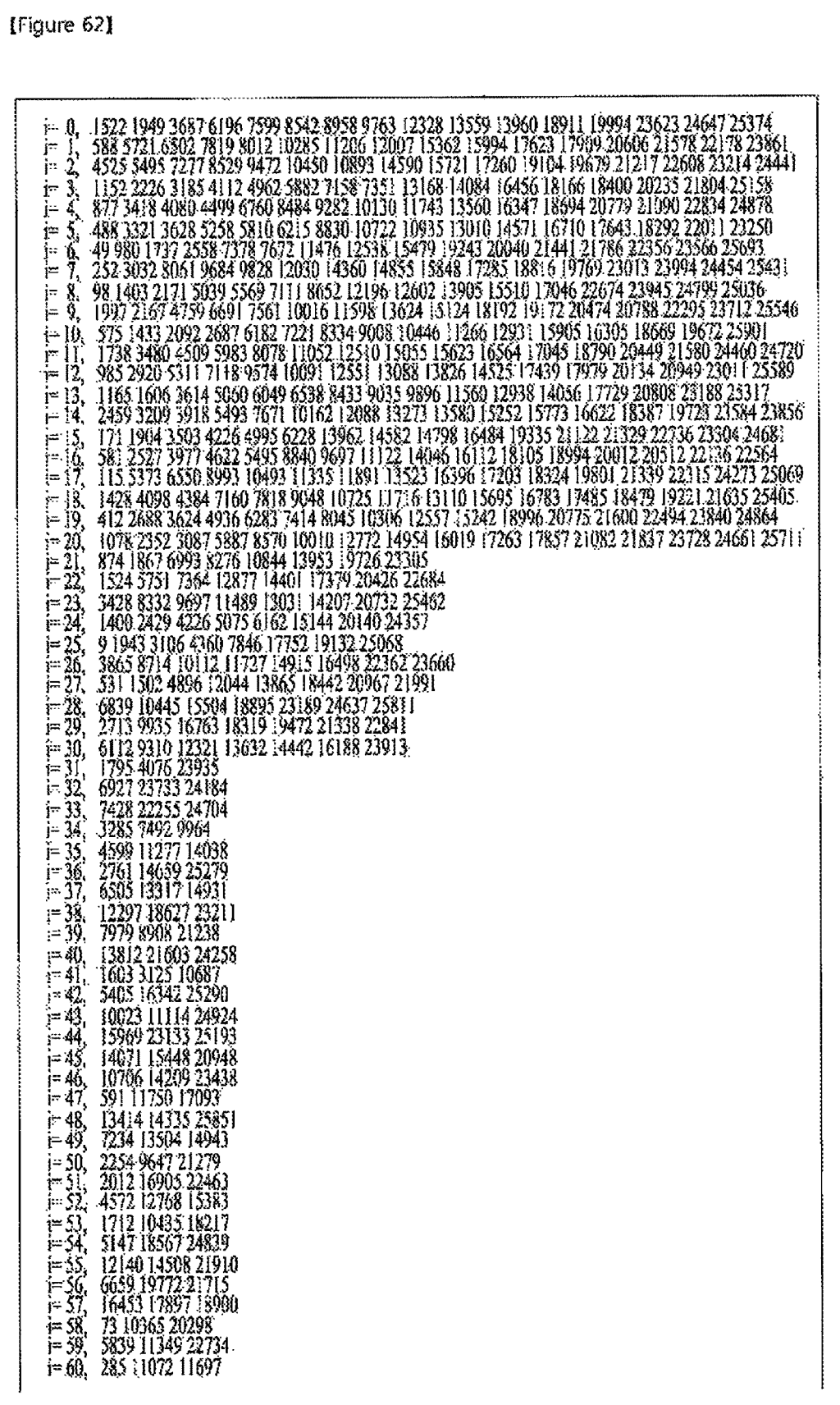
Figure 63:
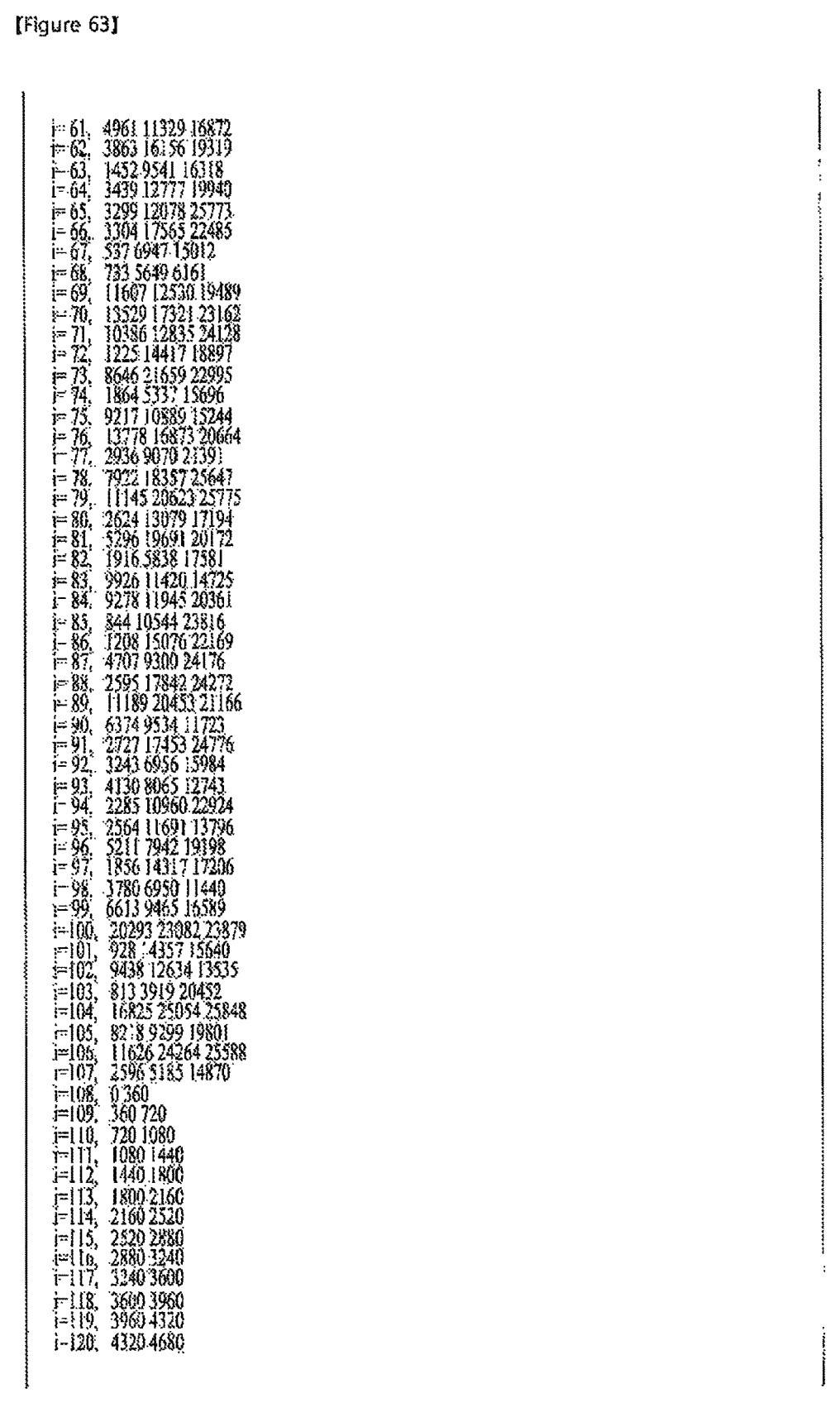

FIGS. 62, 63 and 64 illustrates one of the embodiments of the $H_1$ matrix according to a code rate of 9/15.

Above 3 figures are parts of one table which represents $H_1$ matrix, but the table is divided into 3 figures due to lack of space.

Figure 65:
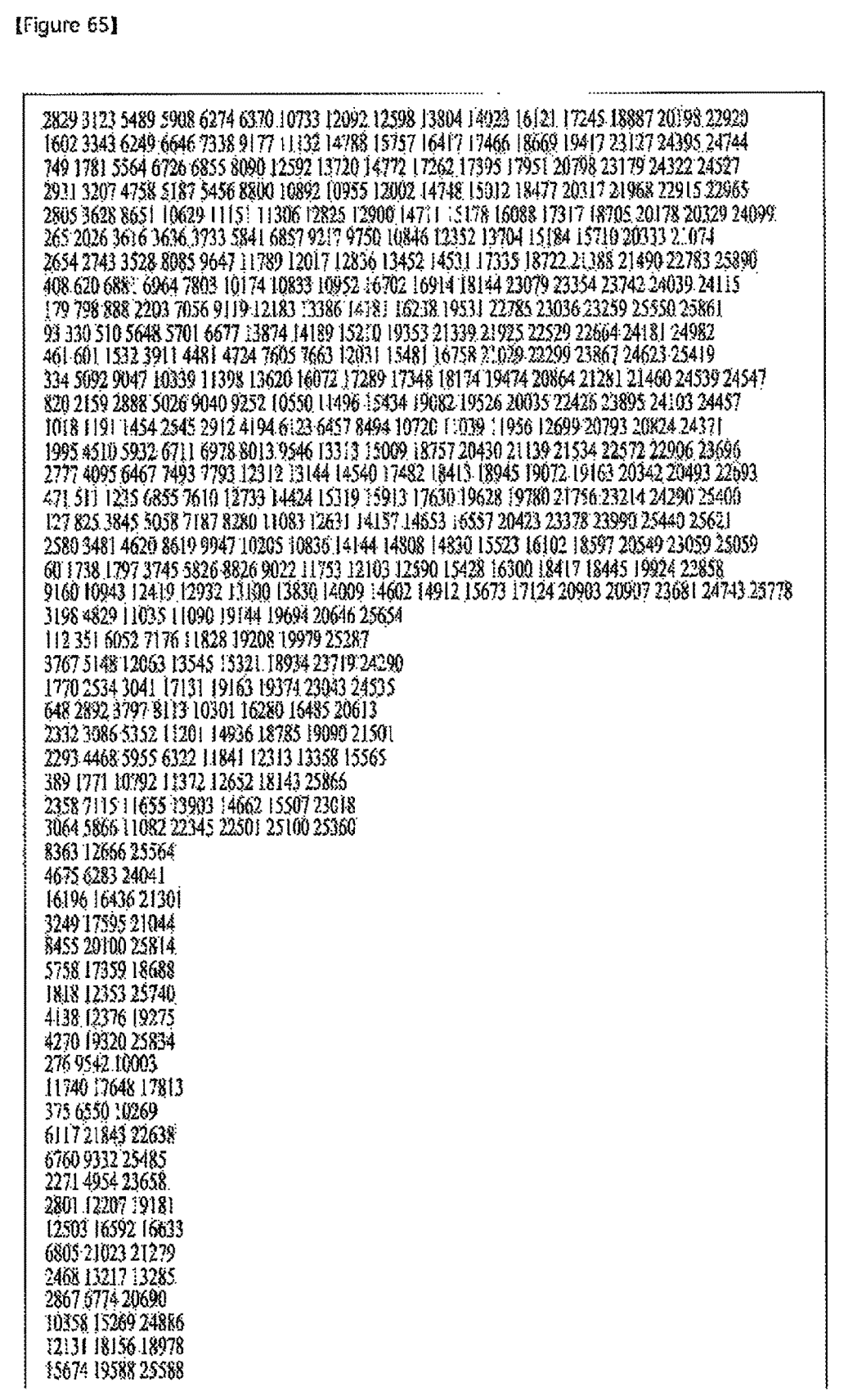

FIGS. 65 and 66 illustrates one of the embodiments of the $H_2$ matrix according to a code rate of 9/15.

Above 2 figures are parts of one table which represents $H_2$ matrix, but the table is divided into 2 figures due to lack of space.

FIG. 67 illustrates one of the embodiments of the degree distribution table according to a code rate of 9/15.

One of the embodiments according to a code rate of 11/15 will be described below.

Figure 68:
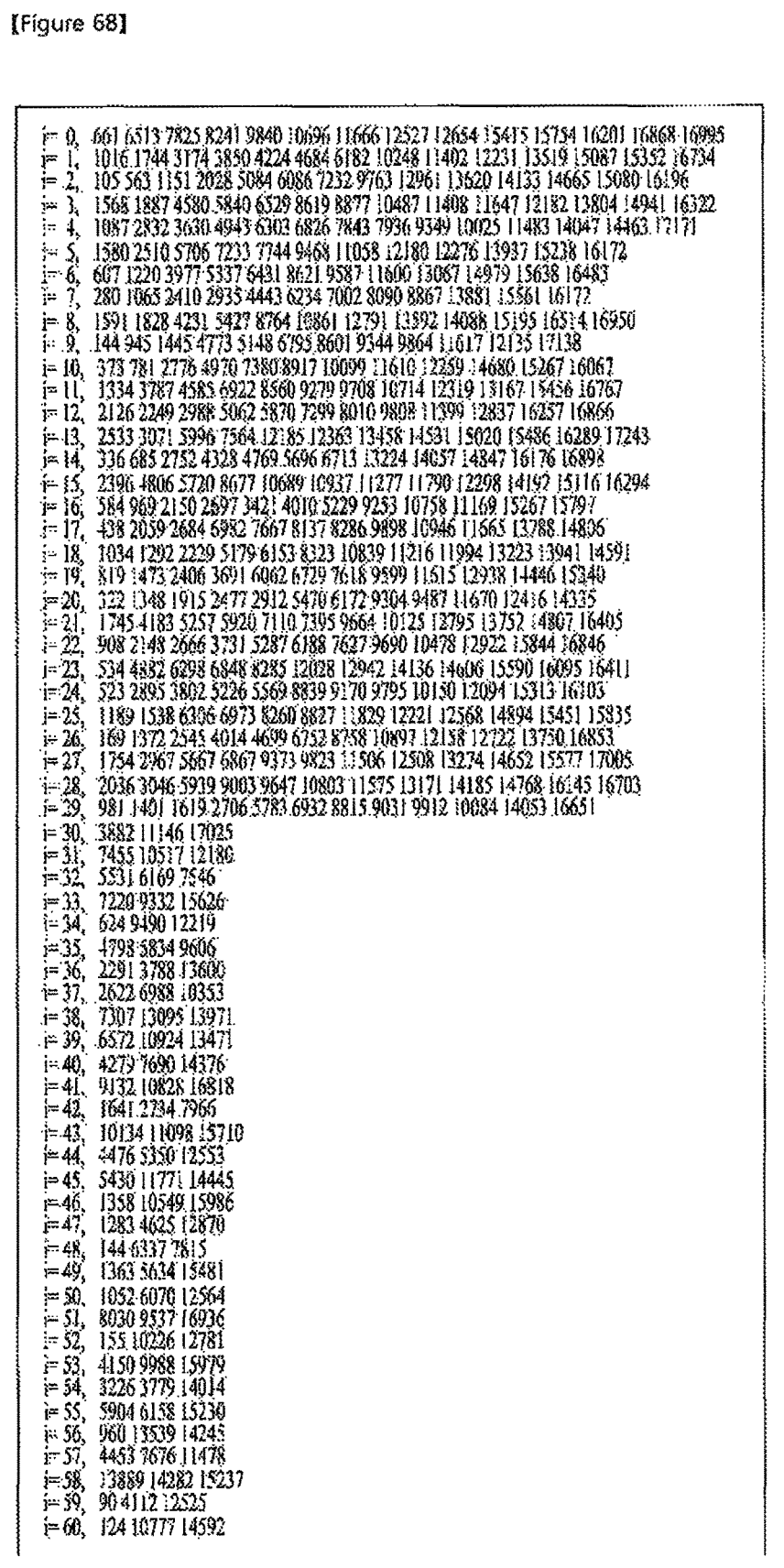
Figure 69:
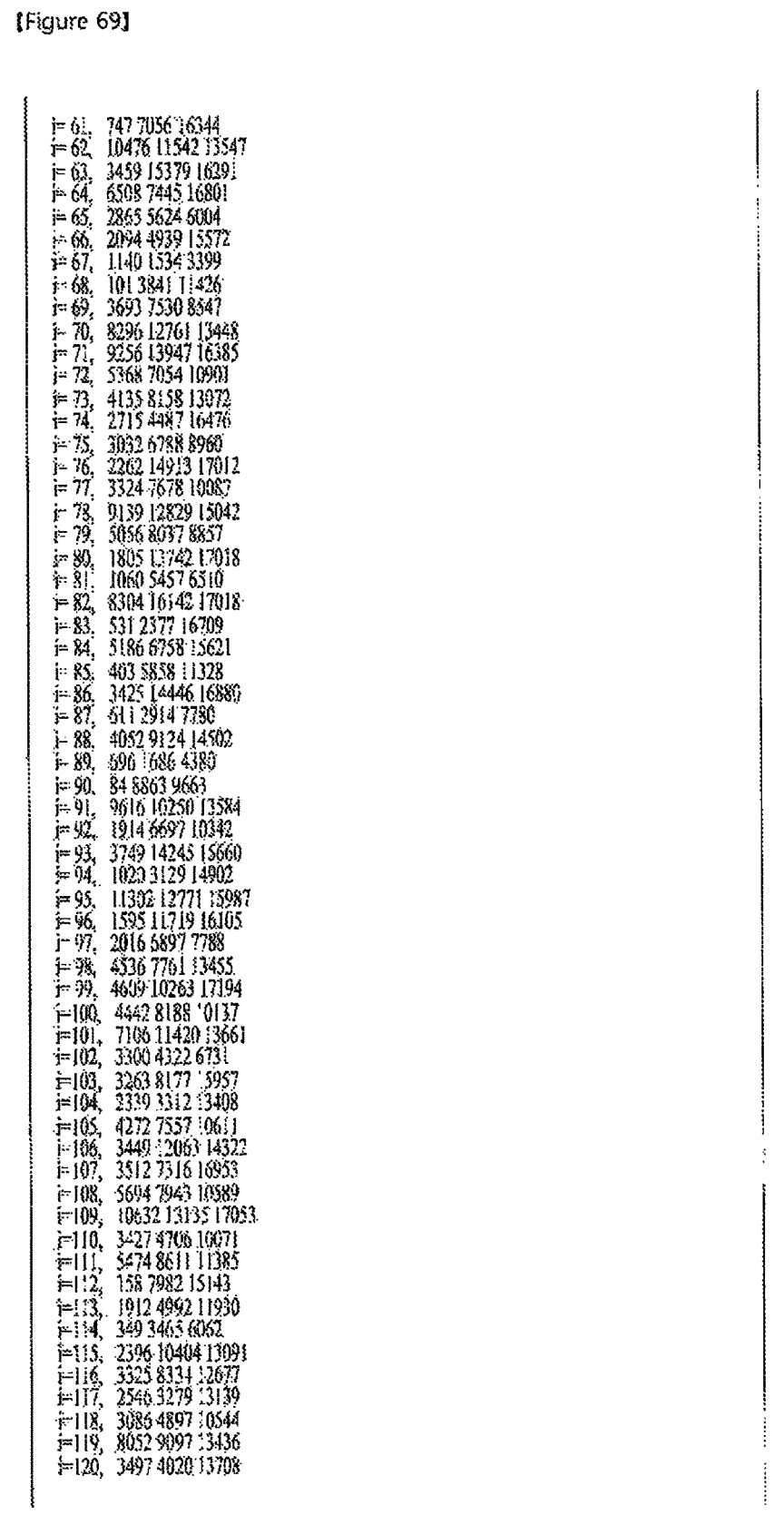
Figure 70:
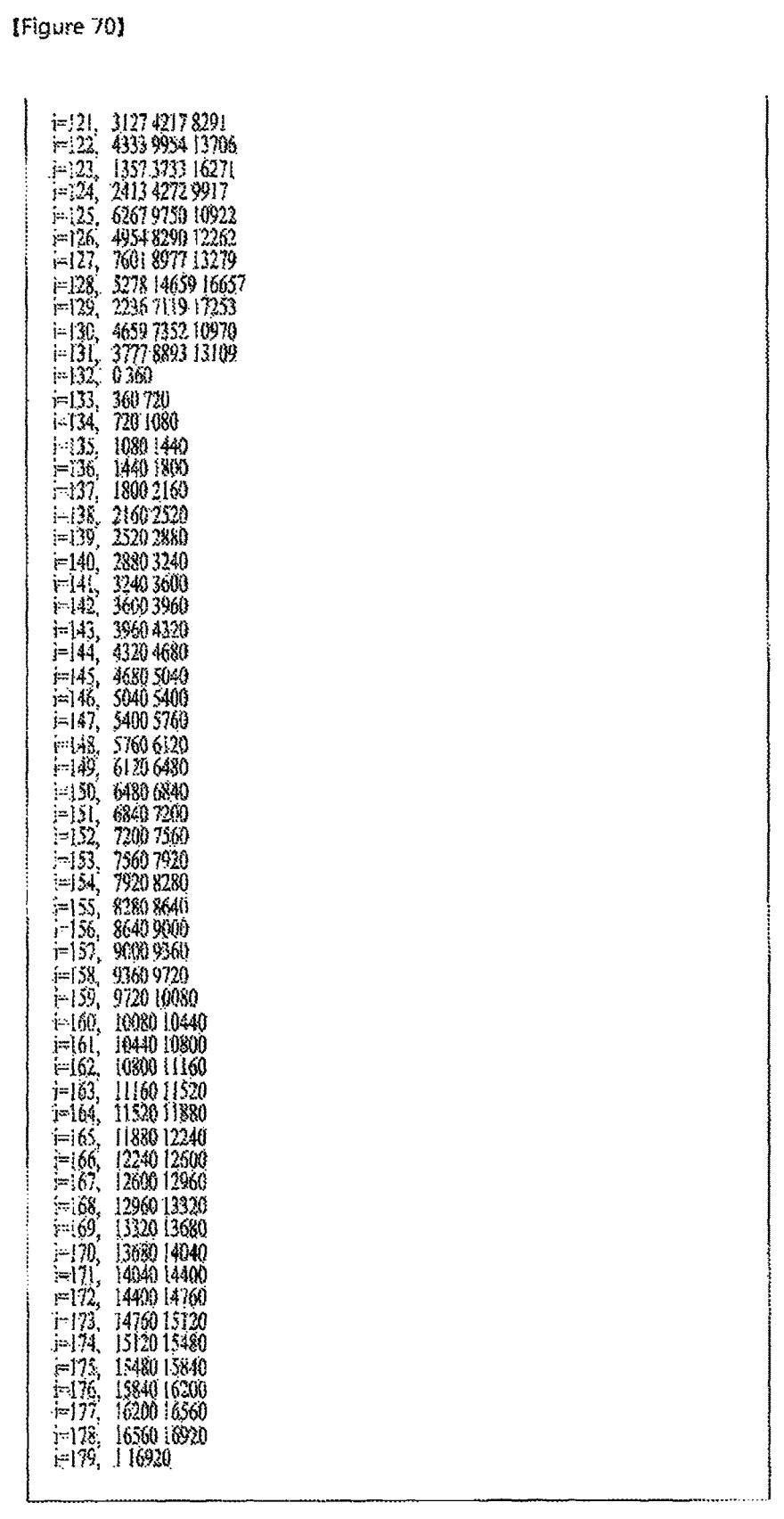

FIGS. 68, 69 and 70 illustrates one of the embodiments of the $H_1$ matrix according to a code rate of 11/15.

Above 3 figures are parts of one table which represents $H_1$ matrix, but the table is divided into 3 figures due to lack of space.

FIGS. 71 and 72 illustrates one of the embodiments of the $H_2$ matrix according to a code rate of 11/15.

Above 2 figures are parts of one table which represents $H_2$ matrix, but the table is divided into 2 figures due to lack of space.

FIG. 73 illustrates one of the embodiments of the degree distribution table according to a code rate of 11/15.

One of the embodiments according to a code rate of 13/15 will be described below.

FIGS. 74, 75 and 76 illustrates one of the embodiments of the $H_1$ matrix according to a code rate of 13/15.

Above 3 figures are parts of one table which represents $H_1$ matrix, but the table is divided into 3 figures due to lack of space.

Figure 77:
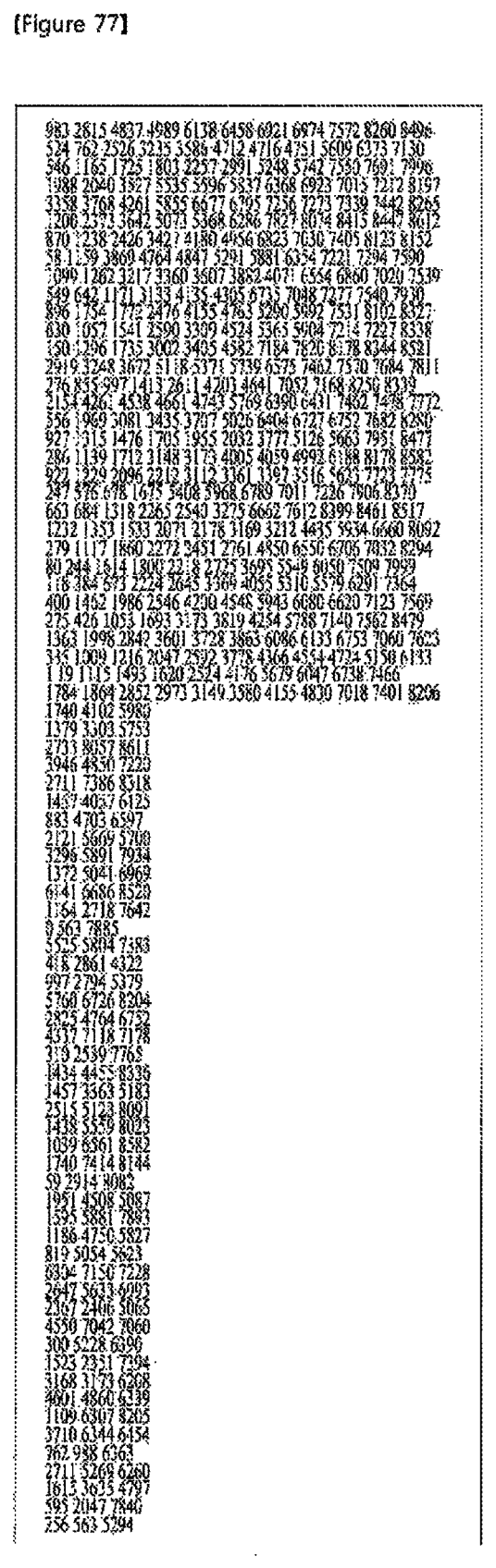

FIGS. 77 and 78 illustrates one of the embodiments of the $H_2$ matrix according to a code rate of 13/15.

Above 2 figures are parts of one table which represents $H_2$ matrix, but the table is divided into 2 figures due to lack of space.

Figures 79, 80:
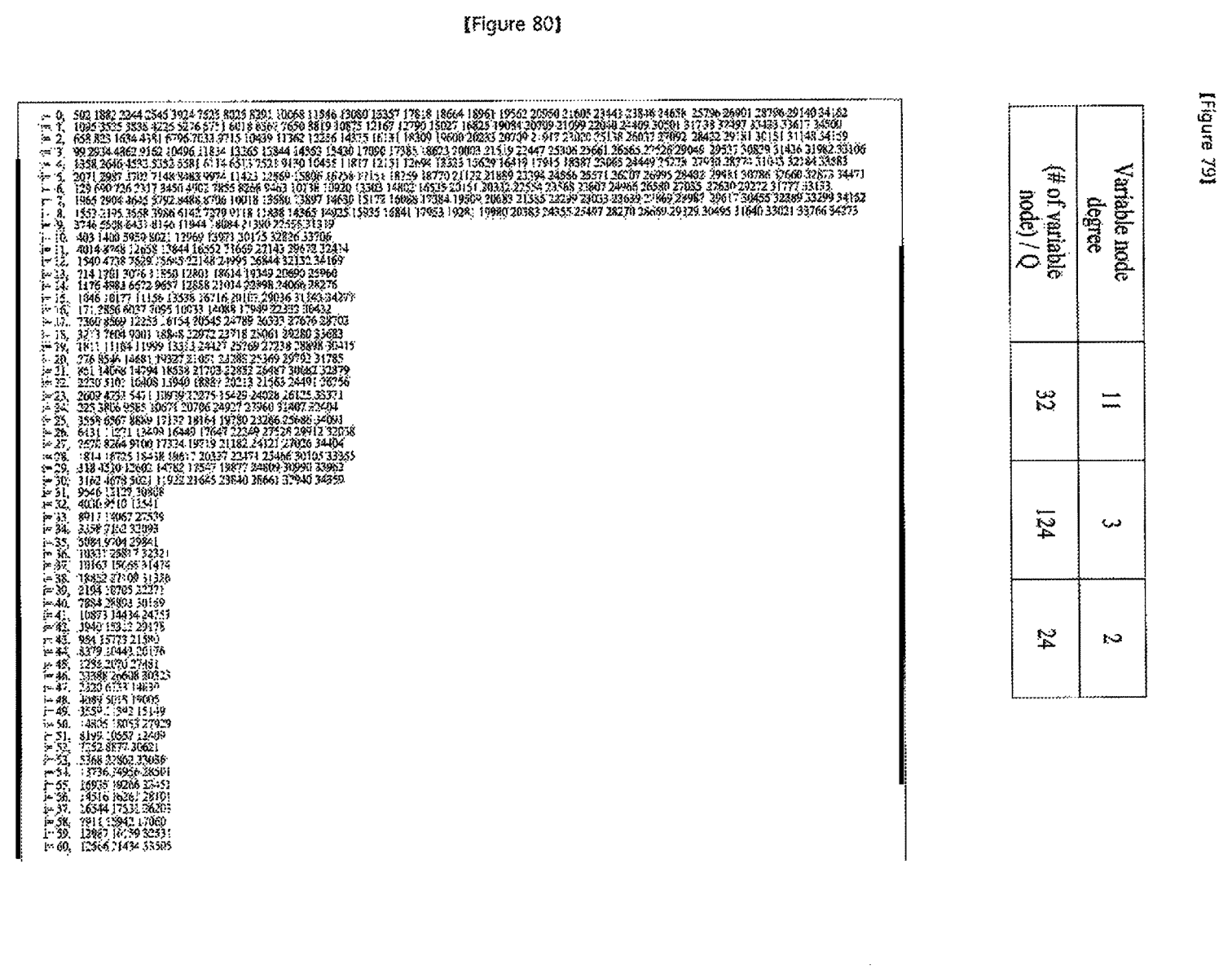

FIG. 79 illustrates one of the embodiments of the degree distribution table according to a code rate of 13/15.

One of the embodiments according to a code rate of 7/15 will be described below.

FIGS. 80, 81 and 82 illustrates one of the embodiments of the $H_1$ matrix according to a code rate of 7/15.

Above 3 figures are parts of one table which represents $H_1$ matrix, but the table is divided into 3 figures due to lack of space.

FIGS. 83 and 84 illustrates one of the embodiments of the $H_2$ matrix according to a code rate of 7/15.

Above 2 figures are parts of one table which represents $H_2$ matrix, but the table is divided into 2 figures due to lack of space.

FIG. 85 illustrates one of the embodiments of the degree distribution table according to a code rate of 7/15.

One of the embodiments according to a code rate of 8/15 will be described below.

Figure 86:
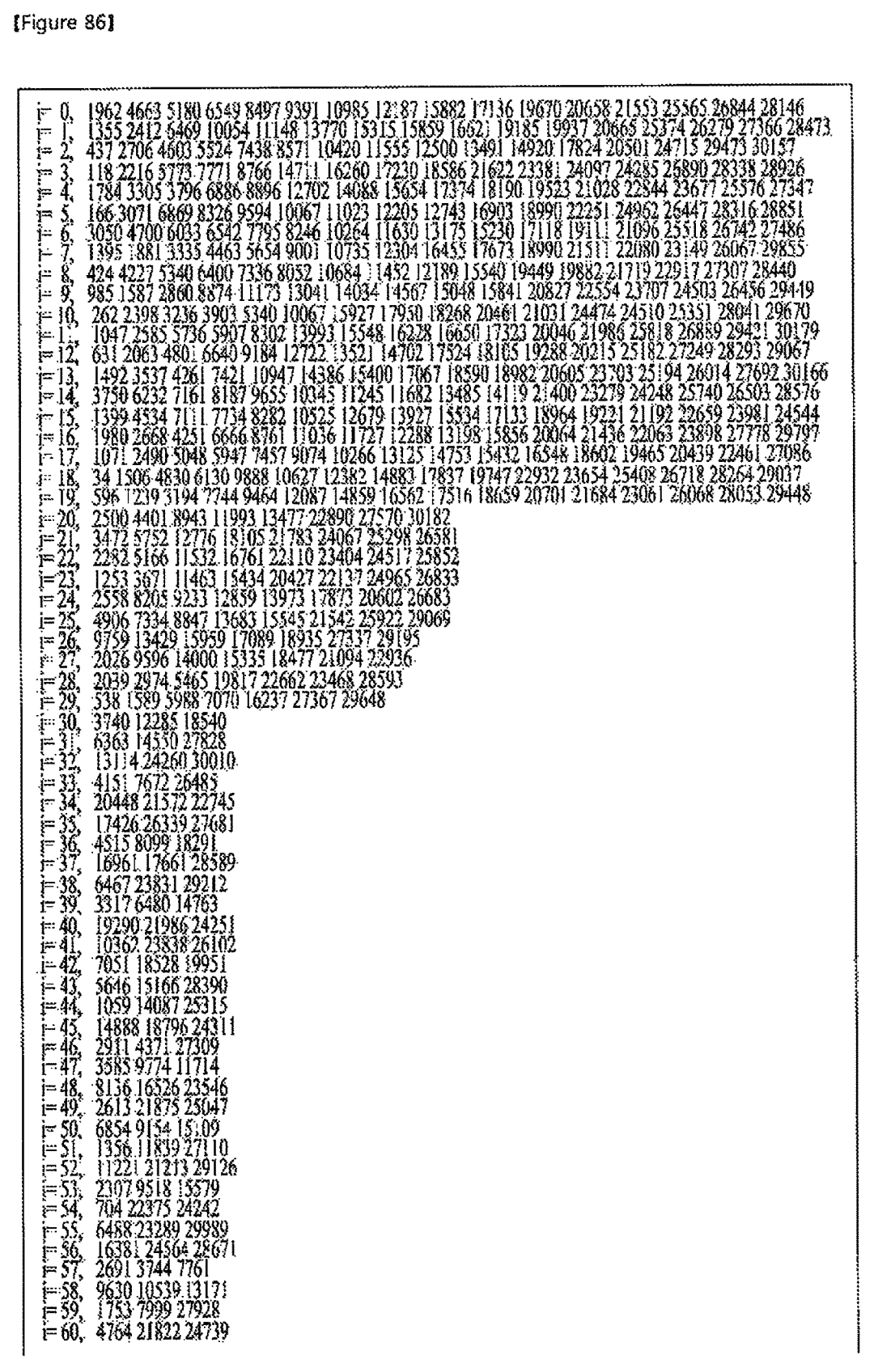
Figure 88:
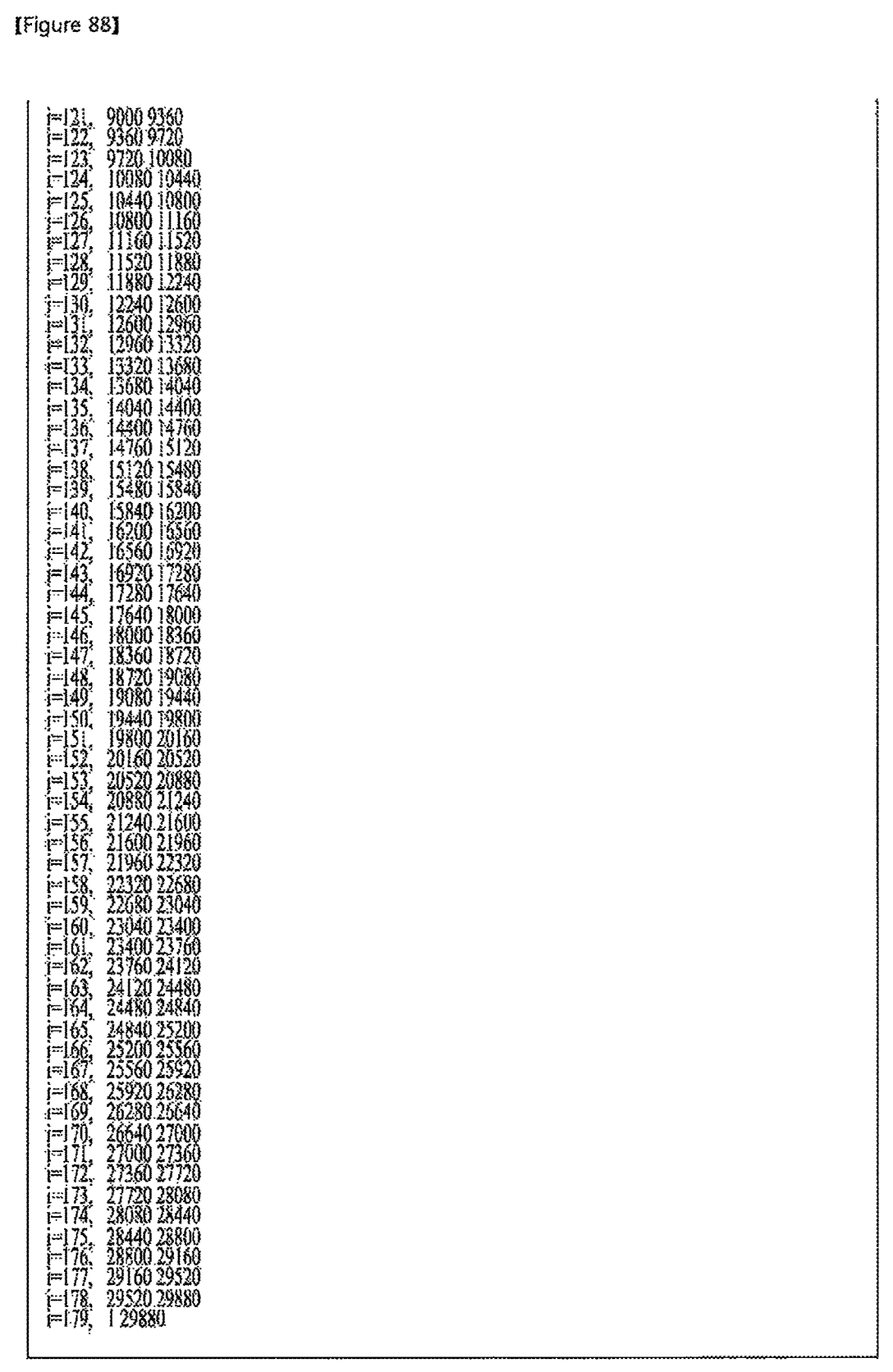

FIGS. 86, 87 and 88 illustrates one of the embodiments of the $H_1$ matrix according to a code rate of 8/15.

Above 3 figures are parts of one table which represents $H_1$ matrix, but the table is divided into 3 figures due to lack of space.

FIGS. 89 and 90 illustrates one of the embodiments of the $H_2$ matrix according to a code rate of 8/15.

Above 2 figures are parts of one table which represents $H_2$ matrix, but the table is divided into 2 figures due to lack of space.

FIG. 91 illustrates one of the embodiments of the degree distribution table according to a code rate of 8/15.

One of the embodiments according to a code rate of 11/15 will be described below.

Figure 92:
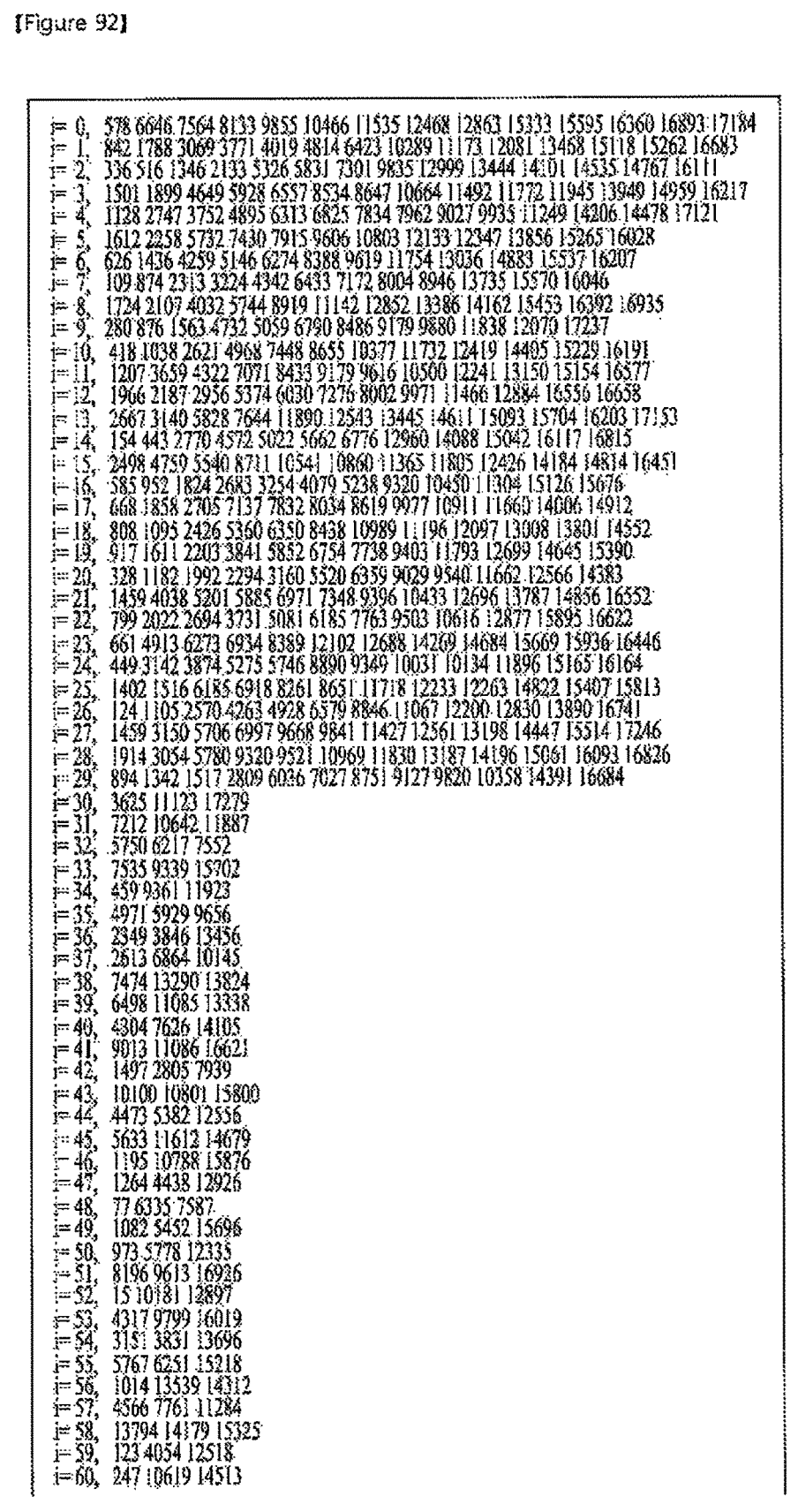

FIGS. 92, 93 and 94 illustrates one of the embodiments of the $H_1$ matrix according to a code rate of 11/15.

Above 3 figures are parts of one table which represents $H_1$ matrix, but the table is divided into 3 figures due to lack of space.

Figure 95:
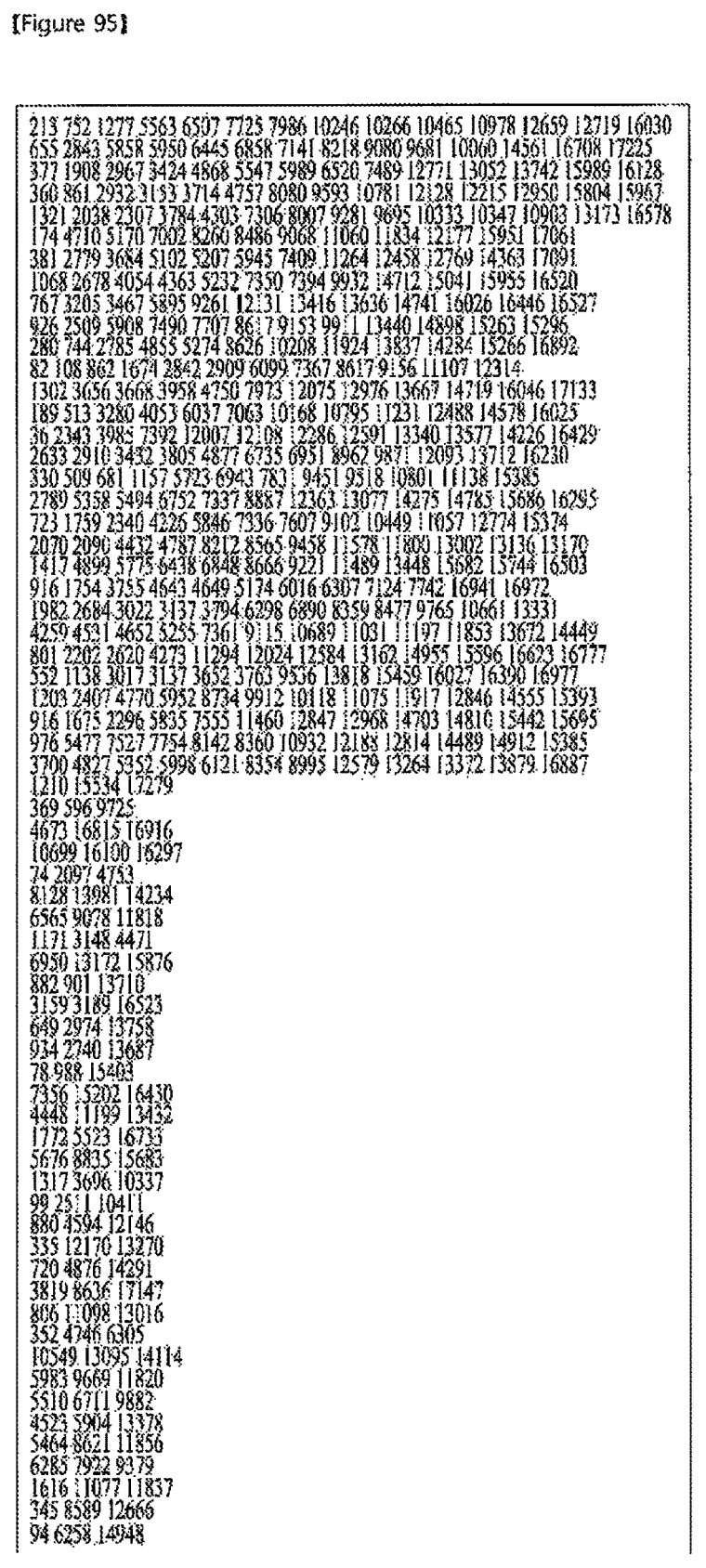
Figure 96:
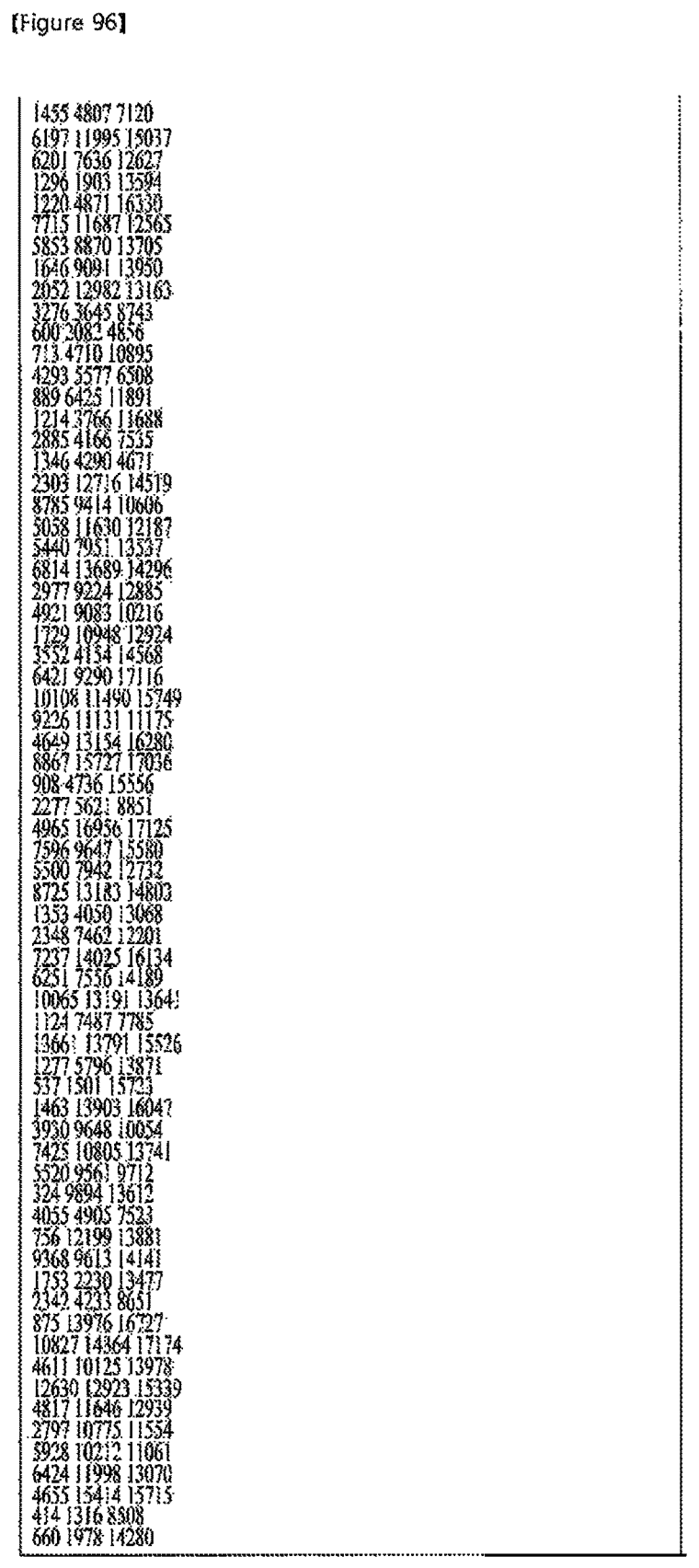

FIGS. 95 and 96 illustrates one of the embodiments of the $H_2$ matrix according to a code rate of 11/15.

Above 2 figures are parts of one table which represents $H_2$ matrix, but the table is divided into 2 figures due to lack of space.

FIG. 97 illustrates one of the embodiments of the degree distribution table according to a code rate of 11/15.

One of the embodiments according to a code rate of 5/15 will be described below.

Figure 98:
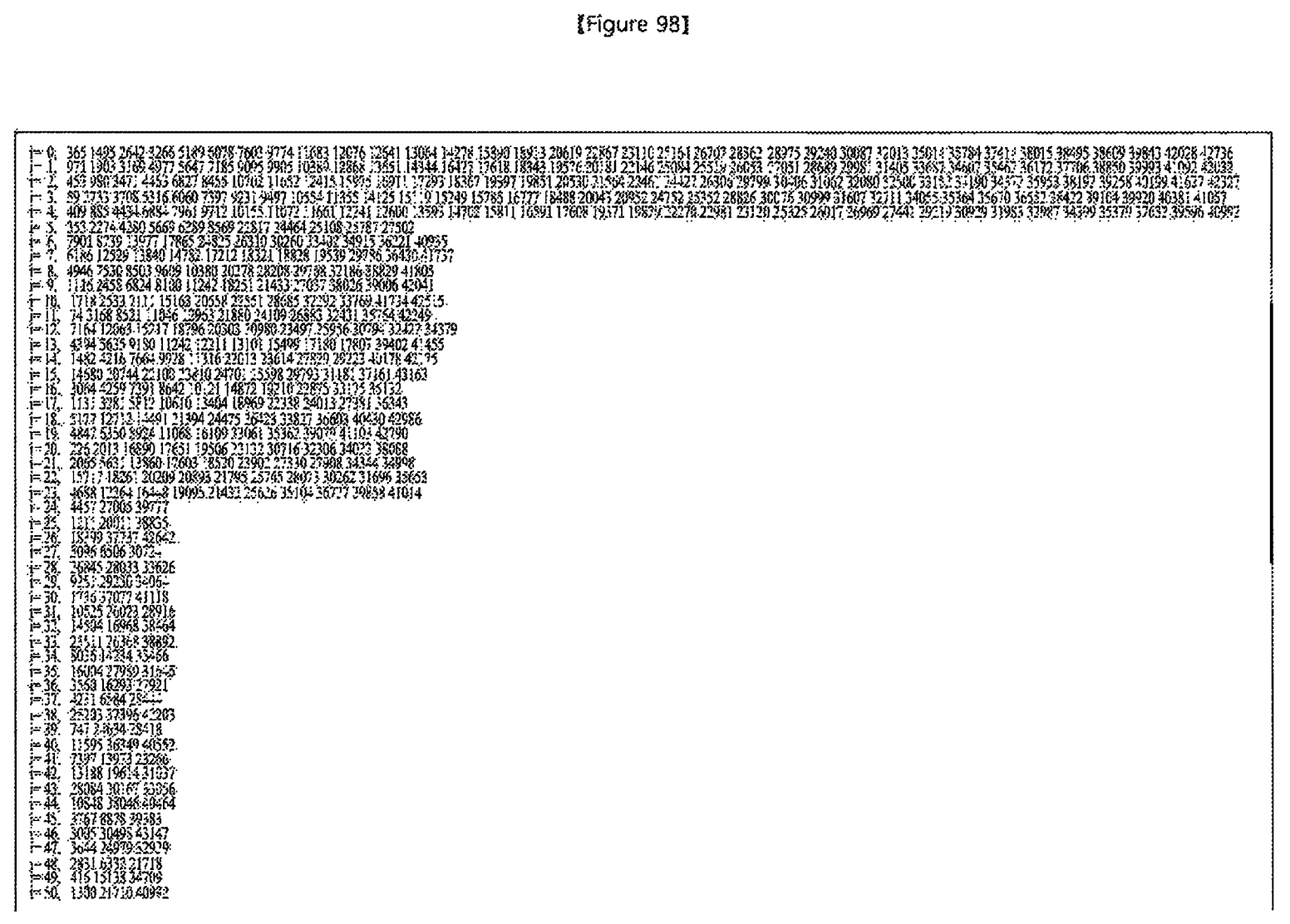

FIGS. 98, 99 and 100 illustrates one of the embodiments of the $H_1$ matrix according to a code rate of 5/15.

Above 3 figures are parts of one table which represents $H_1$ matrix, but the table is divided into 3 figures due to lack of space.

Figure 101:
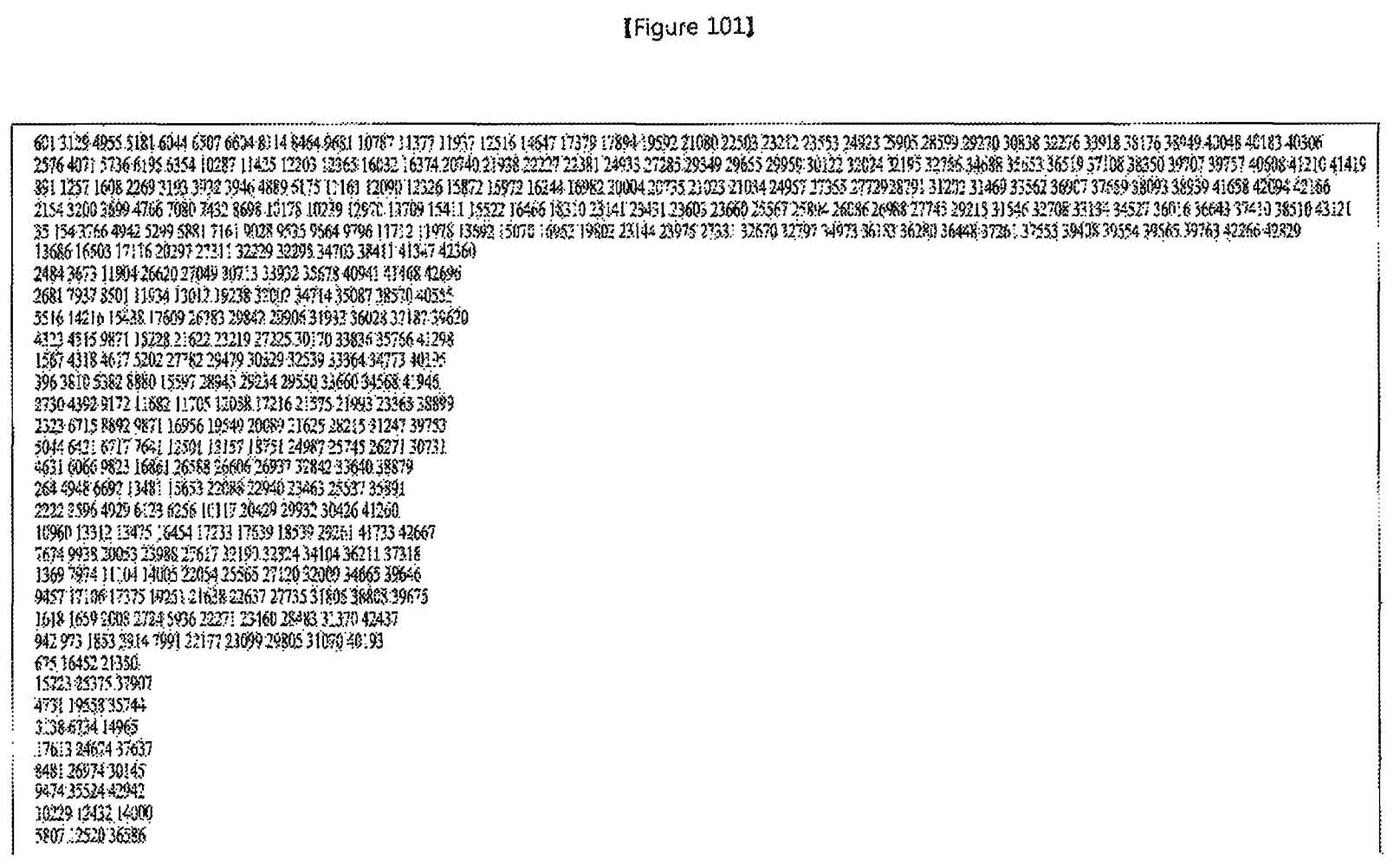

FIGS. 101 and 102 illustrates one of the embodiments of the $H_2$ matrix according to a code rate of 5/15.

Above 2 figures are parts of one table which represents $H_2$ matrix, but the table is divided into 2 figures due to lack of space.

FIG. 103 illustrates one of the embodiments of the degree distribution table according to a code rate of 5/15.

One of the embodiments according to a code rate of 6/15 will be described below.

FIGS. 104, 105 and 106 illustrates one of the embodiments of the $H_1$ matrix according to a code rate of 6/15.

Above 3 figures are parts of one table which represents $H_1$ matrix, but the table is divided into 3 figures due to lack of space.

Figure 108:
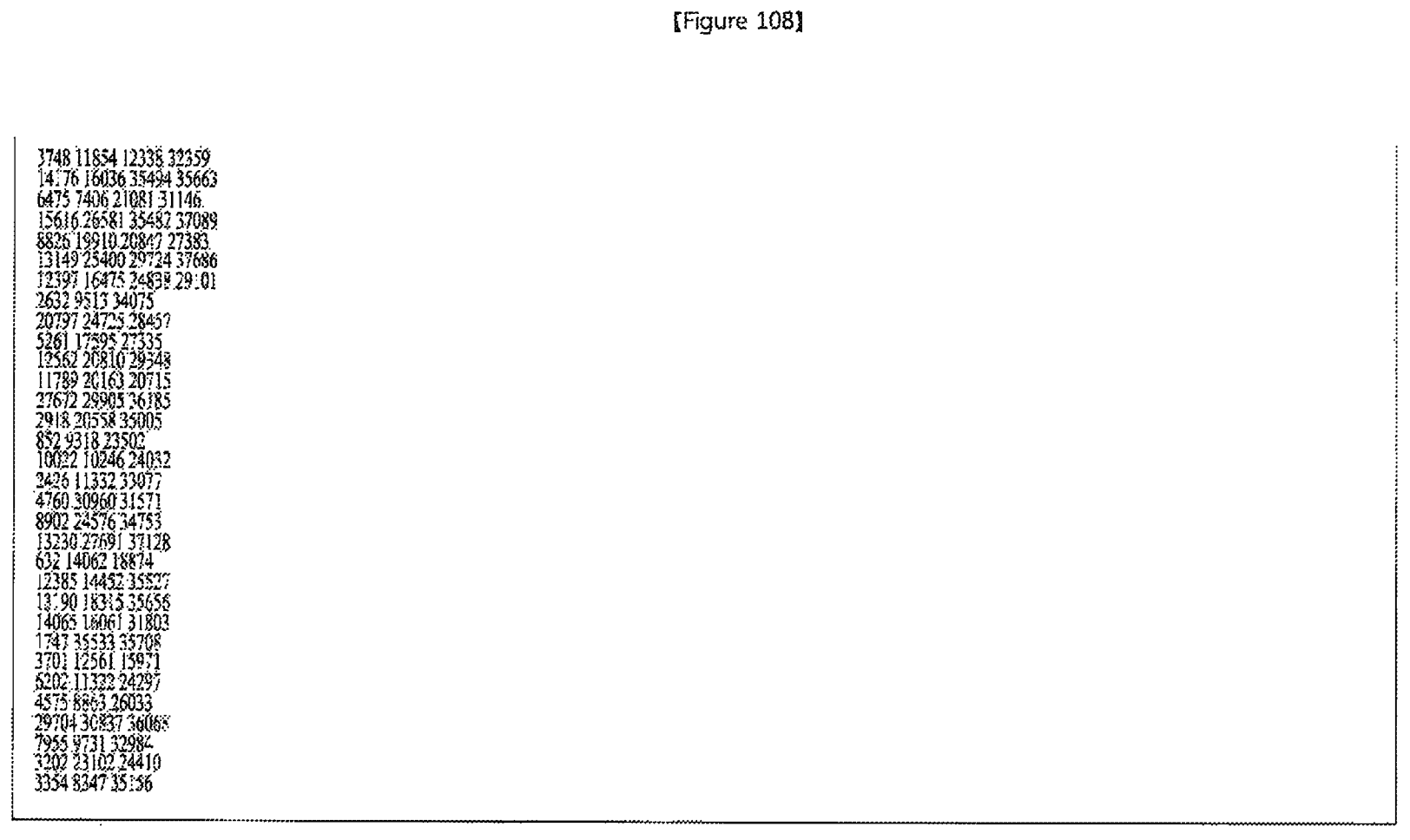

FIGS. 107 and 108 illustrates one of the embodiments of the $H_2$ matrix according to a code rate of 6/15.

Above 2 figures are parts of one table which represents $H_2$ matrix, but the table is divided into 2 figures due to lack of space.

FIG. 109 illustrates one of the embodiments of the degree distribution table according to a code rate of 6/15.

One of the embodiments according to a code rate of 12/15 will be described below.

Figure 110:
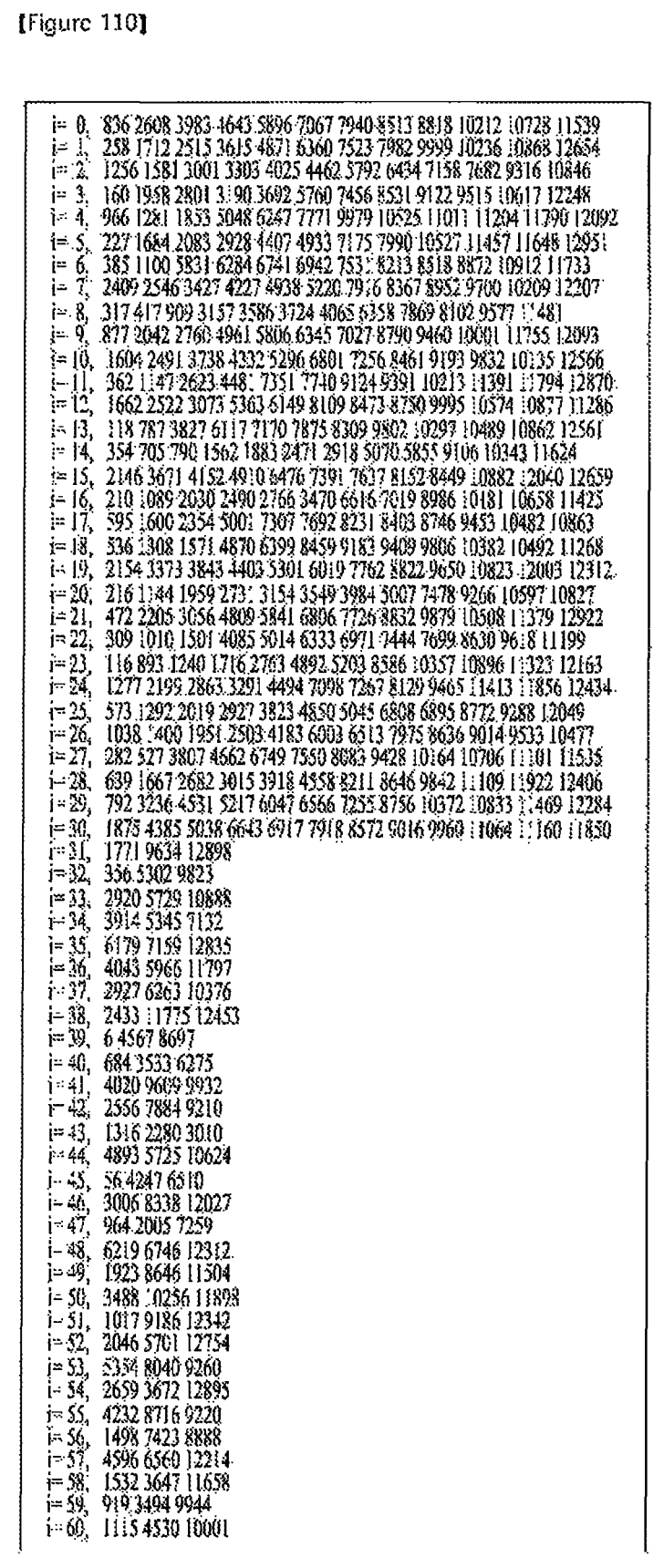
Figure 112:
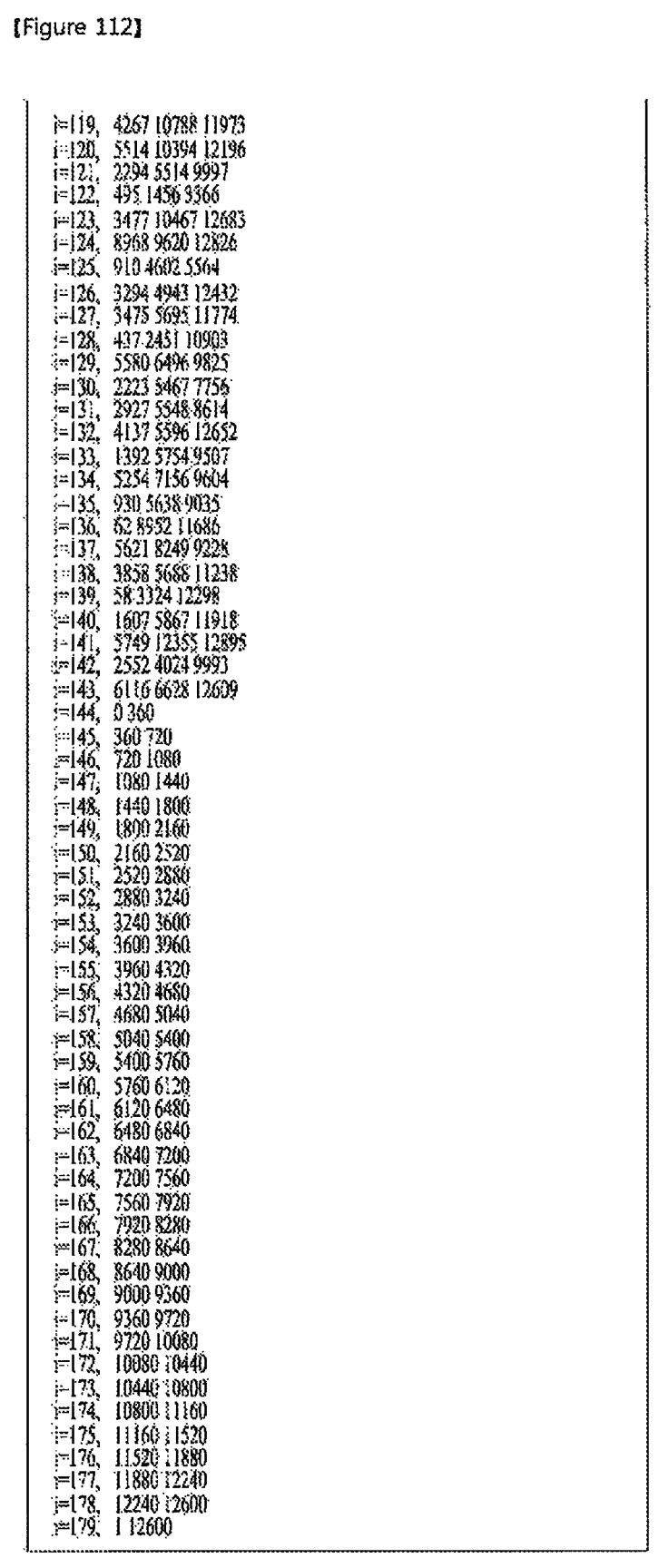

FIGS. 110, 111 and 112 illustrates one of the embodiments of the $H_1$ matrix according to a code rate of 12/15.

Above 3 figures are parts of one table which represents $H_1$ matrix, but the table is divided into 3 figures due to lack of space.

FIGS. 113 and 114 illustrates one of the embodiments of the $H_2$ matrix according to a code rate of 12/15.

Above 2 figures are parts of one table which represents $H_2$ matrix, but the table is divided into 2 figures due to lack of space.

FIG. 115 illustrates one of the embodiments of the degree distribution table according to a code rate of 12/15.

One of the embodiments according to a code rate of 12/15 will be described below.

Figure 116:
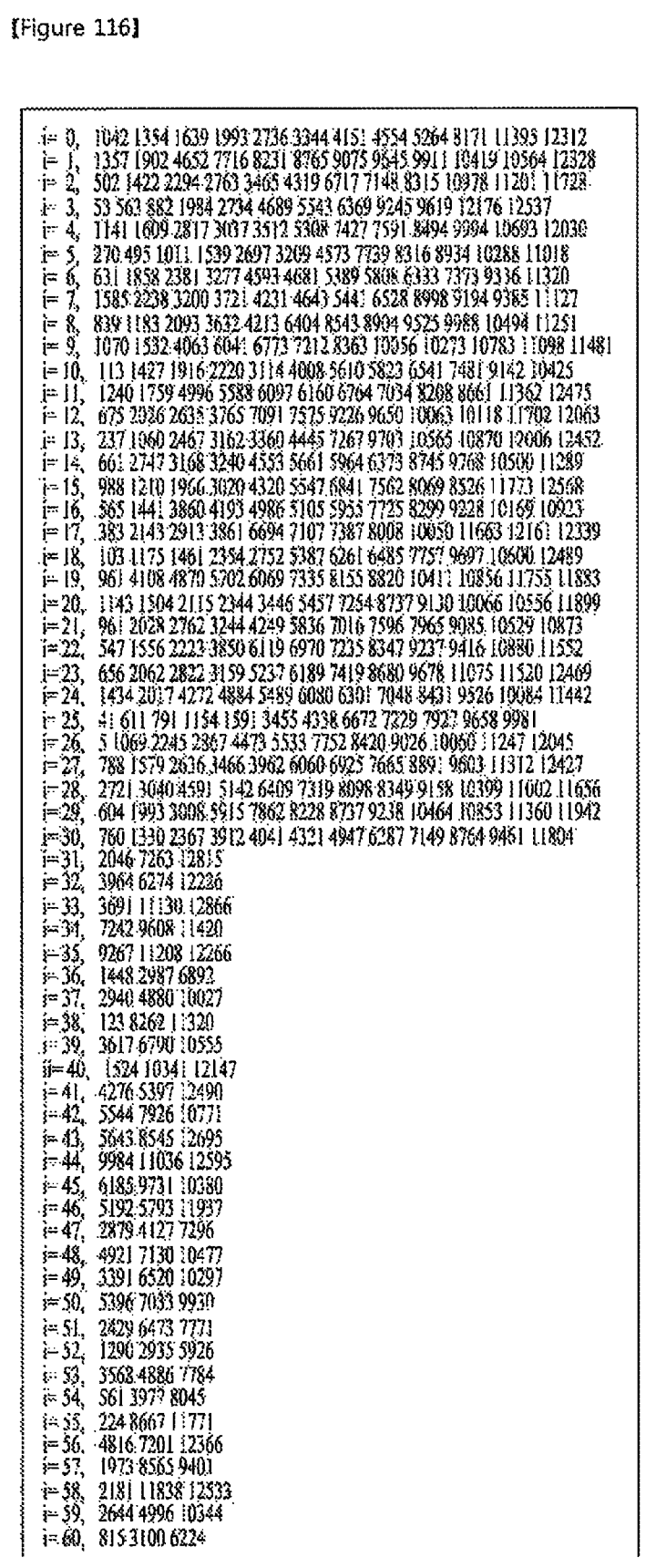
Figure 117:
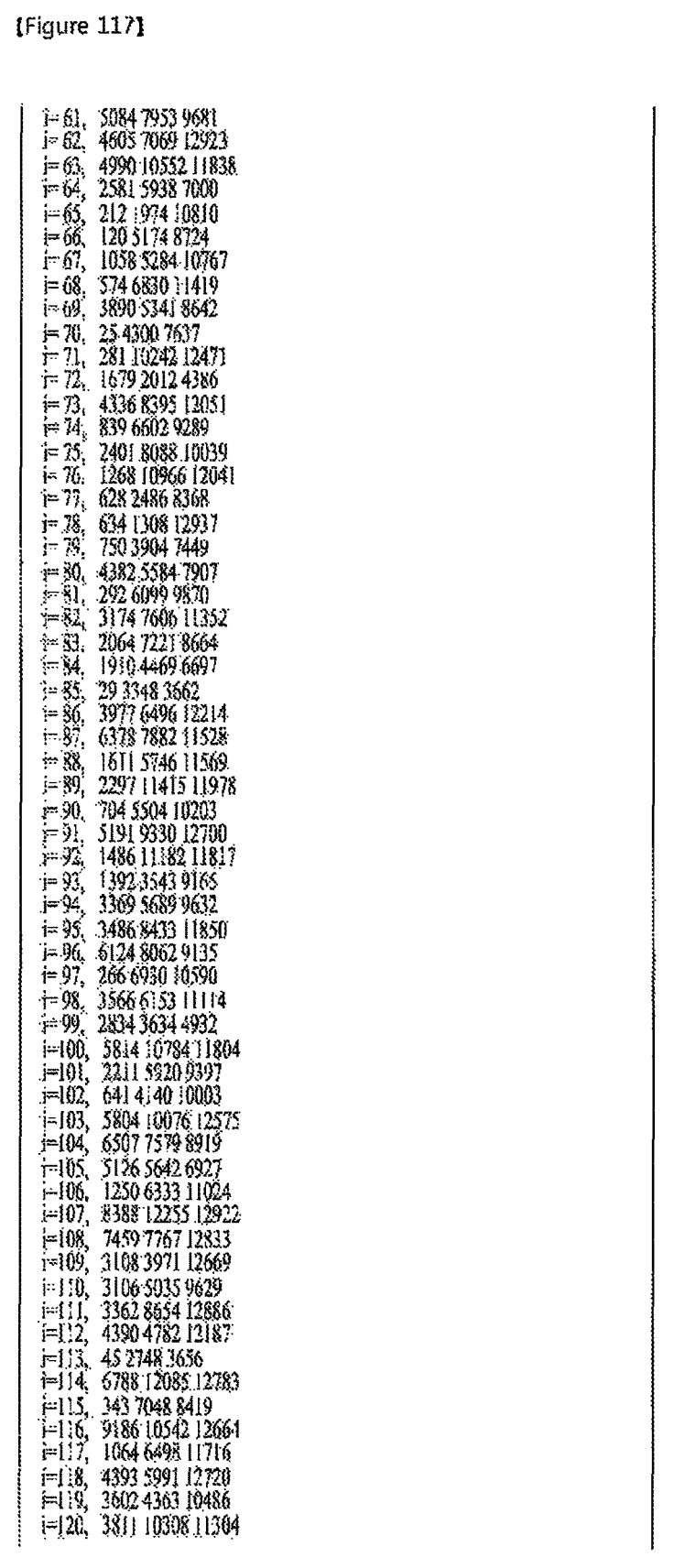

FIGS. 116, 117 and 118 illustrates one of the embodiments of the $H_1$ matrix according to a code rate of 12/15.

Above 3 figures are parts of one table which represents $H_1$ matrix, but the table is divided into 3 figures due to lack of space.

Figure 120:
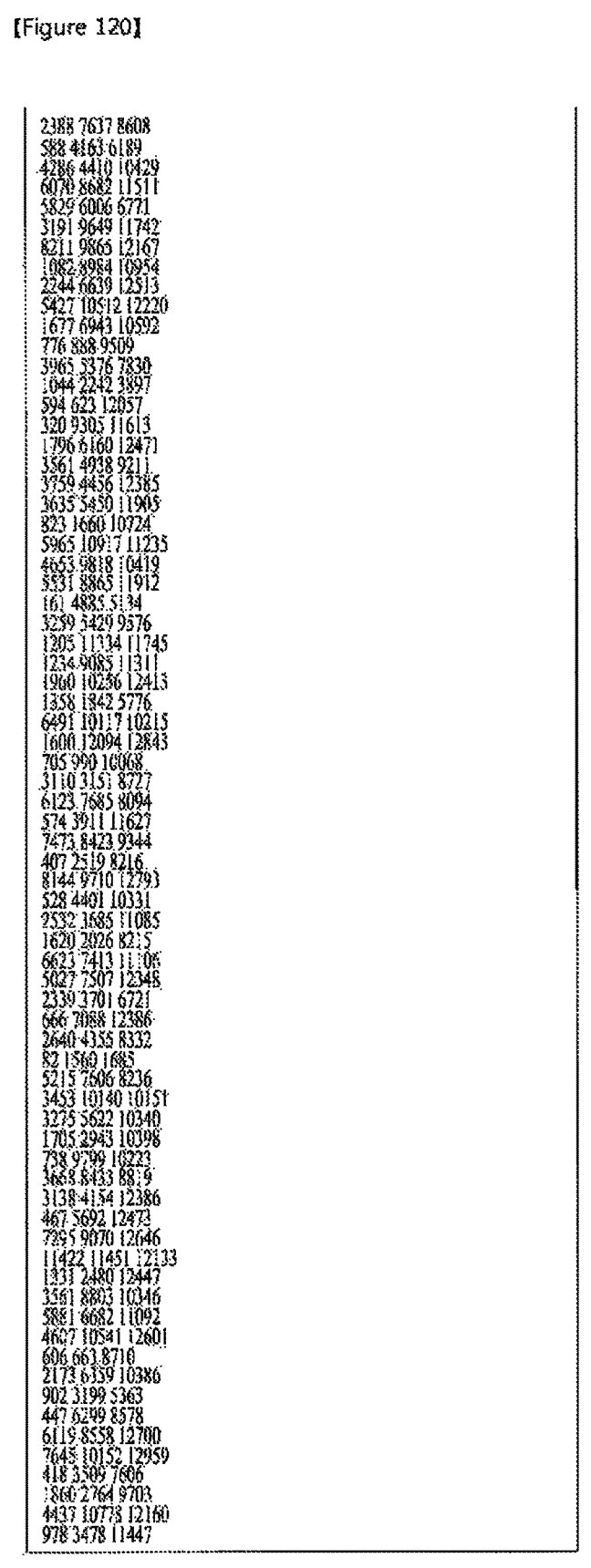

FIGS. 119 and 120 illustrates one of the embodiments of the $H_2$ matrix according to a code rate of 12/15.

Above 2 figures are parts of one table which represents $H_2$ matrix, but the table is divided into 2 figures due to lack of space.

FIG. 121 illustrates one of the embodiments of the degree distribution table according to a code rate of 12/15.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

MODE FOR INVENTION

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting broadcast signals by an apparatus for transmitting broadcast signals, the method comprising:

encoding Data Pipe (DP) data according to a 64800 bit codeword and a 10/15 code rate based on a parity check matrix, wherein the encoded DP data comprises information bits and parity bits;

Multi-Input Multi-Output (MIMO) encoding the encoded DP data;

building at least one signal frame by mapping the MIMO encoded DP data; and modulating data in the built signal frame by an Orthogonal Frequency Division Multiplexing (OFDM) method and transmitting the broadcast signals having the modulated data, wherein encoding the DP data comprises:

initializing the parity bits;

adding the information bits to the parity bits, wherein each 360 bit group of the information bits corresponds to each row of the parity check matrix, and wherein the parity check matrix is:

| | |
|---|---|
| 316 1271 3692 9495 12147 12849 14928 16671 16938 17864 19108 20502 21097 21115 | 1990 2726 10183 |
| 2341 2559 2643 2816 2865 5137 5331 7000 7523 8023 10439 10797 13208 15041 | 5763 12118 15467 |
| 5556 6858 7677 10162 10207 11349 12321 12398 14787 15743 15859 15952 19313 20879 | 503 10006 19564 |
| 349 573 910 2702 3654 6214 9246 9353 10638 11772 14447 14953 16620 19888 | 9839 11942 19472 |
| 204 1390 2887 3835 6230 6533 7443 7876 9299 10291 10896 13960 18287 20086 | 11205 13552 15389 |
| 541 2429 2838 7144 8523 8637 10490 10585 11074 12074 15762 16812 17900 18548 | 8841 13797 19697 |
| 733 1659 3838 5323 5805 7882 9429 10682 13697 16909 18846 19587 19592 20904 | 124 6053 18224 |
| 1134 2136 4631 4653 4718 5197 10410 11666 14996 15305 16048 17417 18960 20303 | 6477 14406 21146 |
| 734 1001 1283 4959 10016 10176 10973 11578 12051 15550 15915 19022 19430 20121 | 1224 8027 16011 |
| 745 4057 5855 9885 10594 10989 13156 13219 13351 13631 13685 14577 17713 20386 | 3046 4422 17717 |
| 968 1446 2130 2502 3092 3787 5323 8104 8418 9998 11681 13972 17747 17929 | 739 12308 17760 |
| 3020 3857 5275 5786 6319 8608 11943 14062 17144 17752 18001 18453 19311 21414 | 4014 4130 7835 |
| 709 747 1038 2181 5320 8292 10584 10859 13964 15009 15277 16953 20675 21509 | 2266 5652 11981 |
| 1663 3247 5003 5760 7186 7360 10346 14211 14717 14792 15155 16128 17355 17970 | 2711 7970 18317 |
| 516 578 1914 6147 9419 11148 11434 13289 13325 13332 19106 19257 20962 21556 | 2196 15229 17217 |
| 5009 5632 6531 9430 9886 10621 11765 13969 16178 16413 18110 18249 20616 20759 | 8636 13302 16764 |
| 457 2686 3318 4608 5620 5858 6480 7430 9602 12691 14664 18777 20152 20848 | 5612 15010 16657 |
| 33 2877 5334 6851 7907 8654 10688 15401 16123 17942 17969 18747 18931 20224 | 615 1249 4639 |
| 87 897 7636 8663 11425 12288 12672 14199 16435 17615 17950 18953 19667 20281 | 3821 12073 18506 |
| 1042 1832 2545 2719 2947 3672 3700 6249 6398 6833 11114 14283 17694 20477 | 1066 16522 21536 |
| 326 488 2662 2880 3009 5357 6587 8882 11604 14374 18781 19051 19057 20508 | 11307 18363 19740 |
| 854 1294 2436 2852 4903 6466 7761 9072 9564 10321 13638 15658 16946 19119 | 3240 8560 10391 |
| 194 899 1711 2408 2786 5391 7108 8079 8716 11453 17303 19484 20989 21389 | 3124 11424 20779 |
| 1631 3121 3994 5005 7810 8850 10315 10589 13407 17162 18624 18758 19311 20301 | 1604 8861 17394 |
| 736 2424 4792 5600 6370 10061 16053 16775 18600 | 2083 7400 8093 |
| 1254 8163 8876 9157 12141 14587 16545 17175 18191 | 3218 7454 9155 |
| 388 6641 8974 10607 10716 14477 16825 17191 18400 | 9855 15998 20533 |
| 5578 6082 6824 7360 7745 8655 11402 11665 12428 | 316 2850 20652 |
| 3603 8729 13463 14698 15210 19112 19550 20727 21052 | 5583 9768 10333 |
| 48 1732 3805 5158 15442 16909 19854 21071 21579 | 7147 7713 18339 |
| 11707 14014 21531 | 12607 17428 21418 |
| 1542 4133 4925 | 14216 16954 18164 |
| 10083 13505 21198 | 8477 15970 18488 |
| 14300 15765 16752 | 1632 8032 9751 |
| 778 1237 11215 | 4573 9080 13507 |
| 1325 3199 14534 | 11747 12441 13876 |
| 2007 14510 20599 | 1183 15605 16675 |
| 1996 5881 16429 | 4408 10264 17109 |
| 5111 15018 15980 | 5495 7882 12150 |
| 4989 10681 12810 | 1010 3763 5065 |
| 3763 10715 16515 | 9828 18054 21599 |
| 2259 10080 15642 | 6342 7353 15358 |
| 9032 11319 21305 | 6362 9462 19999 |
| 3915 15213 20884 | 7184 13693 17622 |
| 11150 15022 20201 | 4343 4654 10995 |
| 1147 6749 19625 | 7099 8466 18520 |
| 12139 12939 18870 | 11505 14395 15138 |
| 3840 4634 10244 | 6779 16691 18726 |
| 1018 10231 17720 | 7146 12644 20196 |
| 2708 13056 13393 | 5865 16728 19634 |
| 5781 11588 18888 | 4657 8714 21246 |
| 1345 2036 5252 | 4580 5279 18750 |
| 5908 8143 15141 | 3767 6620 18905 |
| 1804 13693 18640 | 9209 13093 17575 |
| 10433 13965 16950 | 12486 15875 19791 |
| 9568 10122 15945 | 8046 14636 17491 |
| 547 6722 14015 | 2120 4643 13206 |
| 321 12844 14095 | 6186 9675 12601 |
| 2632 10513 14936 | 784 5770 21585 |
| 6369 11995 20321 | |
| 9920 19136 21529 | |

updating a $k^{th}$ parity bit by summing with a $(k-1)^{th}$ parity bit in the parity bits.

2. The method of claim 1, further including:

constellation mapping the encoded DP data into at least one symbol, wherein the MIMO encoding is performed after the constellation mapping.

3. The method of claim 1, wherein addresses of the parity bits are represented as q(i,j,1), and wherein q(i,j,1)=q (i,j,0)+Q_ldpc*1 (mod 21600)

wherein q (i,j,0) is a value of a j-th entry in an i-th row of the parity check matrix, Q_ldpc is 60, 1 is an index of each information bit in the 360 bit group.

4. A method for receiving broadcast signals by an apparatus for receiving broadcast signals, the method comprising:

receiving broadcast signals having modulated data in signal frames and de-modulating the modulated data by an Orthogonal Frequency Division Multiplexing (OFDM) method;

parsing at least one signal frame by de-mapping Data Pipe (DP) data from the de-modulated data;

Multi-Input Multi-Output (MIMO) decoding the DP data; and decoding the MIMO decoded DP data according to a 64800 bit codeword and a 10/15 code rate based on a parity check matrix, wherein the MIMO decoded DP data includes information bits and parity bits being generated by:

initializing the parity bits;

adding the information bits to the parity bits, wherein each 360 bit group of the information bits corresponds to each row of the parity check matrix, and wherein the parity check matrix is:

| | |
|---|---|
| 316 1271 3692 9495 12147 12849 14928 16671 16938 17864 19108 20502 21097 21115 | 1990 2726 10183 |
| 2341 2559 2643 2816 2865 5137 5331 7000 7523 8023 10439 10797 13208 15041 | 5763 12118 15467 |
| 5556 6858 7677 10162 10207 11349 12321 12398 14787 15743 15859 15952 19313 20879 | 503 10006 19564 |
| 349 573 910 2702 3654 6214 9246 9353 10638 11772 14447 14953 16620 19888 | 9839 11942 19472 |
| 204 1390 2887 3835 6230 6533 7443 7876 9299 10291 10896 13960 18287 20086 | 11205 13552 15389 |
| 541 2429 2838 7144 8523 8637 10490 10585 11074 12074 15762 16812 17900 18548 | 8841 13797 19697 |
| 733 1659 3838 5323 5805 7882 9429 10682 13697 16909 18846 19587 19592 20904 | 124 6053 18224 |
| 1134 2136 4631 4653 4718 5197 10410 11666 14996 15305 16048 17417 18960 20303 | 6477 14406 21146 |
| 734 1001 1283 4959 10016 10176 10973 11578 12051 15550 15915 19022 19430 20121 | 1224 8027 16011 |
| 745 4057 5855 9885 10594 10989 13156 13219 13351 13631 13685 14577 17713 20386 | 3046 4422 17717 |
| 968 1446 2130 2502 3092 3787 5323 8104 8418 9998 11681 13972 17747 17929 | 739 12308 17760 |
| 3020 3857 5275 5786 6319 8608 11943 14062 17144 17752 18001 18453 19311 21414 | 4014 4130 7835 |
| 709 747 1038 2181 5320 8292 10584 10859 13964 15009 15277 16953 20675 21509 | 2266 5652 11981 |
| 1663 3247 5003 5760 7186 7360 10346 14211 14717 14792 15155 16128 17355 17970 | 2711 7970 18317 |
| 516 578 1914 6147 9419 11148 11434 13289 13325 13332 19106 19257 20962 21556 | 2196 15229 17217 |
| 5009 5632 6531 9430 9886 10621 11765 13969 16178 16413 18110 18249 20616 20759 | 8636 13302 16764 |
| 457 2686 3318 4608 5620 5858 6480 7430 9602 12691 14664 18777 20152 20848 | 5612 15010 16657 |
| 33 2877 5334 6851 7907 8654 10688 15401 16123 17942 17969 18747 18931 20224 | 615 1249 4639 |
| 87 897 7636 8663 11425 12288 12672 14199 16435 17615 17950 18953 19667 20281 | 3821 12073 18506 |
| 1042 1832 2545 2719 2947 3672 3700 6249 6398 6833 11114 14283 17694 20477 | 1066 16522 21536 |
| 326 488 2662 2880 3009 5357 6587 8882 11604 14374 18781 19051 19057 20508 | 11307 18363 19740 |
| 854 1294 2436 2852 4903 6466 7761 9072 9564 10321 13638 15658 16946 19119 | 3240 8560 10391 |
| 194 899 1711 2408 2786 5391 7108 8079 8716 11453 17303 19484 20989 21389 | 3124 11424 20779 |
| 1631 3121 3994 5005 7810 8850 10315 10589 13407 17162 18624 18758 19311 20301 | 1604 8861 17394 |
| 736 2424 4792 5600 6370 10061 16053 16775 18600 | 2083 7400 8093 |
| 1254 8163 8876 9157 12141 14587 16545 17175 18191 | 3218 7454 9155 |
| 388 6641 8974 10607 10716 14477 16825 17191 18400 | 9855 15998 20533 |
| 5578 6082 6824 7360 7745 8655 11402 11665 12428 | 316 2850 20652 |
| 3603 8729 13463 14698 15210 19112 19550 20727 21052 | 5583 9768 10333 |
| 48 1732 3805 5158 15442 16909 19854 21071 21579 | 7147 7713 18339 |
| 11707 14014 21531 | 12607 17428 21418 |
| 1542 4133 4925 | 14216 16954 18164 |
| 10083 13505 21198 | 8477 15970 18488 |
| 14300 15765 16752 | 1632 8032 9751 |
| 778 12371 1215 | 4573 9080 13507 |
| 1325 3199 14534 | 11747 12441 13876 |
| 2007 14510 20599 | 1183 15605 16675 |
| 1996 5881 16429 | 4408 10264 17109 |
| 5111 15018 15980 | 5495 7882 12150 |
| 4989 10681 12810 | 1010 3763 5065 |
| 3763 10715 16515 | 9828 18054 21599 |
| 2259 10080 15642 | 6342 7353 15358 |
| 9032 11319 21305 | 6362 9462 19999 |
| 3915 15213 20884 | 7184 13693 17622 |
| 11150 15022 20201 | 4343 4654 10995 |
| 1147 6749 19625 | 7099 8466 18520 |
| 12139 12939 18870 | 11505 14395 15138 |
| 3840 4634 10244 | 6779 16691 18726 |
| 1018 10231 17720 | 7146 12644 20196 |
| 2708 13056 13393 | 5865 16728 19634 |
| 5781 11588 18888 | 4657 8714 21246 |
| 1345 2036 5252 | 4580 5279 18750 |
| 5908 8143 15141 | 3767 6620 18905 |
| 1804 13693 18640 | 9209 13093 17575 |
| 10433 13965 16950 | 12486 15875 19791 |
| 9568 10122 15945 | 8046 14636 17491 |
| 547 6722 14015 | 2120 4643 13206 |
| 321 12844 14095 | 6186 9675 12601 |

-continued

| | |
|---|---|
| 2632 10513 14936 | 784 5770 21585 |
| 6369 11995 20321 | |
| 9920 19136 21529 | |

and updating a $k^{th}$ parity bit by summing with a $(k-1)^{th}$ parity bit.

5. The method of claim 4, further including:

constellation demapping the MIMO decoded DP data, wherein the MIMO decoding is performed before the constellation mapping.

6. The method of claim 4, wherein address of the parity bit is represented as q(i,j,1), and wherein q(i,j,1)=q (i,j,0)+Q_ldpc*1 (mod 21600)

wherein q (i,j,0) is a value of a j-th entry in an i-th row of the parity check matrix, Q_ldpc is 60, 1 is an index of each information bit in the 360 bit group.

* * * * *